US008387116B2

(12) United States Patent
Deguchi

(10) Patent No.: US 8,387,116 B2
(45) Date of Patent: Feb. 26, 2013

(54) ATTRIBUTE INFORMATION AUTHENTICATION APPARATUS, ATTRIBUTE INFORMATION AUTHENTICATION METHOD, AND STORAGE MEDIUM FOR STORING COMPUTER PROGRAM

(75) Inventor: Hikaru Deguchi, Tokyo (JP)

(73) Assignees: Mekiki Co., Ltd., Tokyo (JP); Mekiki Creates Co., Ltd., Tokyo (JP)

( * ) Notice: Subject to any disclaimer, the term of this patent is extended or adjusted under 35 U.S.C. 154(b) by 457 days.

(21) Appl. No.: 12/809,808

(22) PCT Filed: Oct. 14, 2008

(86) PCT No.: PCT/JP2008/068551
§ 371 (c)(1),
(2), (4) Date: Jun. 21, 2010

(87) PCT Pub. No.: WO2009/084303
PCT Pub. Date: Jul. 9, 2009

(65) Prior Publication Data
US 2010/0281520 A1    Nov. 4, 2010

(30) Foreign Application Priority Data

Dec. 28, 2007 (JP) ................................. 2007-341391

(51) Int. Cl.
*G06F 15/16* (2006.01)
*G06F 7/04* (2006.01)
(52) U.S. Cl. ................................. 726/3; 726/26; 726/27
(58) Field of Classification Search ........ 726/2; 713/164
See application file for complete search history.

(56) References Cited

U.S. PATENT DOCUMENTS 7,311,608 B1 * 12/2007 Danieli et al. .................. 463/42
7,822,631 B1 * 10/2010 Vander Mey et al. ........ 705/7.29
(Continued)

FOREIGN PATENT DOCUMENTS

JP    2002-279124 A    9/2002
JP    2004-046288 A    2/2004
(Continued)

OTHER PUBLICATIONS

Certified English translation of "An SNS Manual Approval System in Opposition (?) to the Web 2.0 Era," by The website of http://hyocom.jp/blog.php?key=1727, Nov. 2, 2006 (retrieval date of Jun. 27, 2008).

(Continued)

*Primary Examiner* — William Powers
(74) *Attorney, Agent, or Firm* — DLA Piper LLP (US)

(57) ABSTRACT

A present server transmits to a second user terminal attribute information authentication request information for requesting authentication of attribute information registered by a first user when a predetermined request is received from a first user terminal. Also, the server registers authenticated information in association with the attribute information of the first user when the authentication information, which indicates that the attribute information registered by the first user has been authenticated, has been received. When a request is made to view the attribute information of the first user, the existence of the authenticated information is determined, and if the authenticated information is registered, attribute authentication display information is generated and transmitted so as to be visually and identifiably displayed on the user terminal to indicate that authenticated information exists.

10 Claims, 32 Drawing Sheets

U.S. PATENT DOCUMENTS

| | | | |
|---|---|---|---|
| 7,886,000 B1 * | 2/2011 | Polis et al. | 709/203 |
| 7,945,862 B2 * | 5/2011 | Aldrich et al. | 715/751 |
| 8,082,353 B2 * | 12/2011 | Huber et al. | 709/229 |
| 2004/0011479 A1 * | 1/2004 | Bissolo | 160/223 |
| 2006/0173792 A1 * | 8/2006 | Glass | 705/75 |
| 2006/0173793 A1 * | 8/2006 | Glass | 705/75 |
| 2008/0282324 A1 * | 11/2008 | Hoal | 726/3 |

FOREIGN PATENT DOCUMENTS

| | | |
|---|---|---|
| JP | 2004-070480 A | 3/2004 |
| JP | 2004-132978 A | 4/2004 |
| JP | 2004-152193 A | 5/2004 |
| JP | 2005-092897 A | 4/2005 |
| JP | 2007-026154 A | 2/2007 |
| JP | 2007-228243 A | 9/2007 |
| JP | 2008-123436 A | 5/2008 |

OTHER PUBLICATIONS

International Search Report for PCT Patent App. No. PCT/JP2008/068551.

Japanese language International preliminary report on patentability dated Aug. 10, 2010 and its English language translation issued in corresponding PCT application PCT/JP2008/068551.

* cited by examiner

FIG. 1

2. RECEIVE ATTRIBUTE INFORMATION REGISTRATION REQUEST OR ATTRIBUTE INFORMATION AUTHENTICATION REQUEST FROM THE FIRST USER TERMINAL
    TRANSMIT THE ATTRIBUTE INFORMATION AUTHENTICATION REQUEST TO THE SECOND USER TERMINAL
5. RECEIVE THE AUTHENTICATION INFORMATION FROM THE SECOND USER TERMINAL
6. REGISTER THE AUTHENTICATED INFORMATION
7. MUTUALLY ASSOCIATE AND STORE THE FIRST USER IDENTIFICATION INFORMATION AND THE SECOND USER IDENTIFICATION INFORMATION
9. RECEIVE THE ATTRIBUTE INFORMATION VIEW REQUEST OF THE FIRST USER
10. EXTRACT THE ATTRIBUTE INFORMATION OF THE FIRST USER
11. CONFIRM THE EXISTENCE OF AUTHENTICATED INFORMATION REGISTERED IN ASSOCIATION WITH THE EXTRACTED ATTRIBUTE INFORMATION
12. GENERATE AND TRANSMIT ATTRIBUTE AUTHENTICATION DISPLAY INFORMATION TO THE THIRD USER TERMINAL TOGETHER WITH THE EXTRACTED ATTRIBUTE INFORMATION IN THE CASE THAT REGISTRATION OF THE AUTHENTICATED INFORMATION EXISTS (OR TRANSMIT THE EXTRACTED ATTRIBUTE INFORMATION TO THE THIRD USER TERMINAL IN THE CASE THAT REGISTRATION OF THE AUTHENTICATED INFORMATION DOES NOT EXIST)

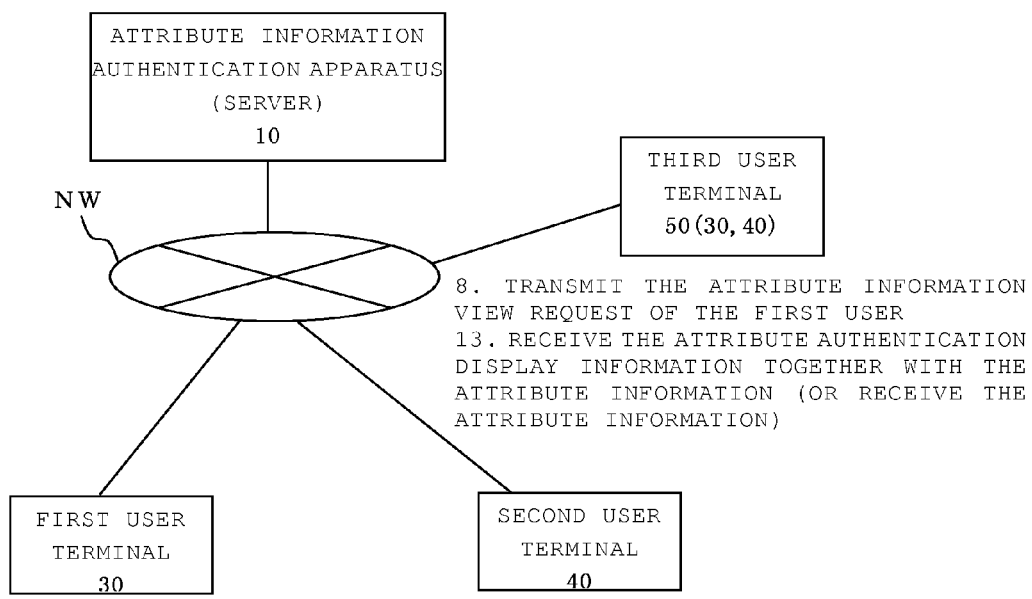

8. TRANSMIT THE ATTRIBUTE INFORMATION VIEW REQUEST OF THE FIRST USER
13. RECEIVE THE ATTRIBUTE AUTHENTICATION DISPLAY INFORMATION TOGETHER WITH THE ATTRIBUTE INFORMATION (OR RECEIVE THE ATTRIBUTE INFORMATION)

1. ACCESS THE ATTRIBUTE INFORMATION AUTHENTICATION WEBSITE AND TRANSMIT AN ATTRIBUTE INFORMATION REGISTRATION REQUEST OR AN ATTRIBUTE INFORMATION AUTHENTICATION REQUEST

3. RECEIVE THE ATTRIBUTE INFORMATION AUTHENTICATION REQUEST
4. TRANSMIT (RETURN) THE AUTHENTICATION INFORMATION.

FIG. 4

USER INFORMATION DATABASE (FIRST STORAGE DEVICE)

| USER ID | ATTRIBUTE INFORMATION | | | | | CONTACT ADDRESS INFORMATION (EMAIL ADDRESS) | AUTHENTICATED INFORMATION |
|---------|------|------|------|------|-----|------|------|
|         | REAL NAME | FACE PHOTOGRAPH | GENDER | BIRTHDAY | ... | | |
|         |      |      |      |      |     |      |      |

FIG. 5

AUTHENTICATION RELATIONSHIP INFORMATION STORAGE SECTION (SECOND STORAGE DEVICE)

| FIRST USER ID (AUTHENTICATEE) | SECOND USER ID (AUTHENTICATOR) |
|-------------------------------|-------------------------------|
|                               |                               |

FIG. 6

FRIENDSHIP INFORMATION STORAGE SECTION (THIRD STORAGE DEVICE)

| ID OF USER APPLYING FOR FRIENDSHIP | ID OF USER ACCEPTING FRIENDSHIP |
|------------------------------------|--------------------------------|
|                                    |                                |

FIG. 7

AUTHENTICATION HISTORY INFORMATION STORAGE SECTION (FOURTH STORAGE DEVICE)

| USER ID | DATE | REQUEST DETAILS | RESULTS |
|---------|------|-----------------|---------|
|         |      |                 |         |

FIG. 8

PROHIBITED CONDUCT INFORMATION STORAGE SECTION (FIFTH STORAGE DEVICE)

| PROHIBITED CONDUCT DETAILS ID | PROHIBITED CONDUCT DETAILS |
|-------------------------------|----------------------------|
|                               |                            |

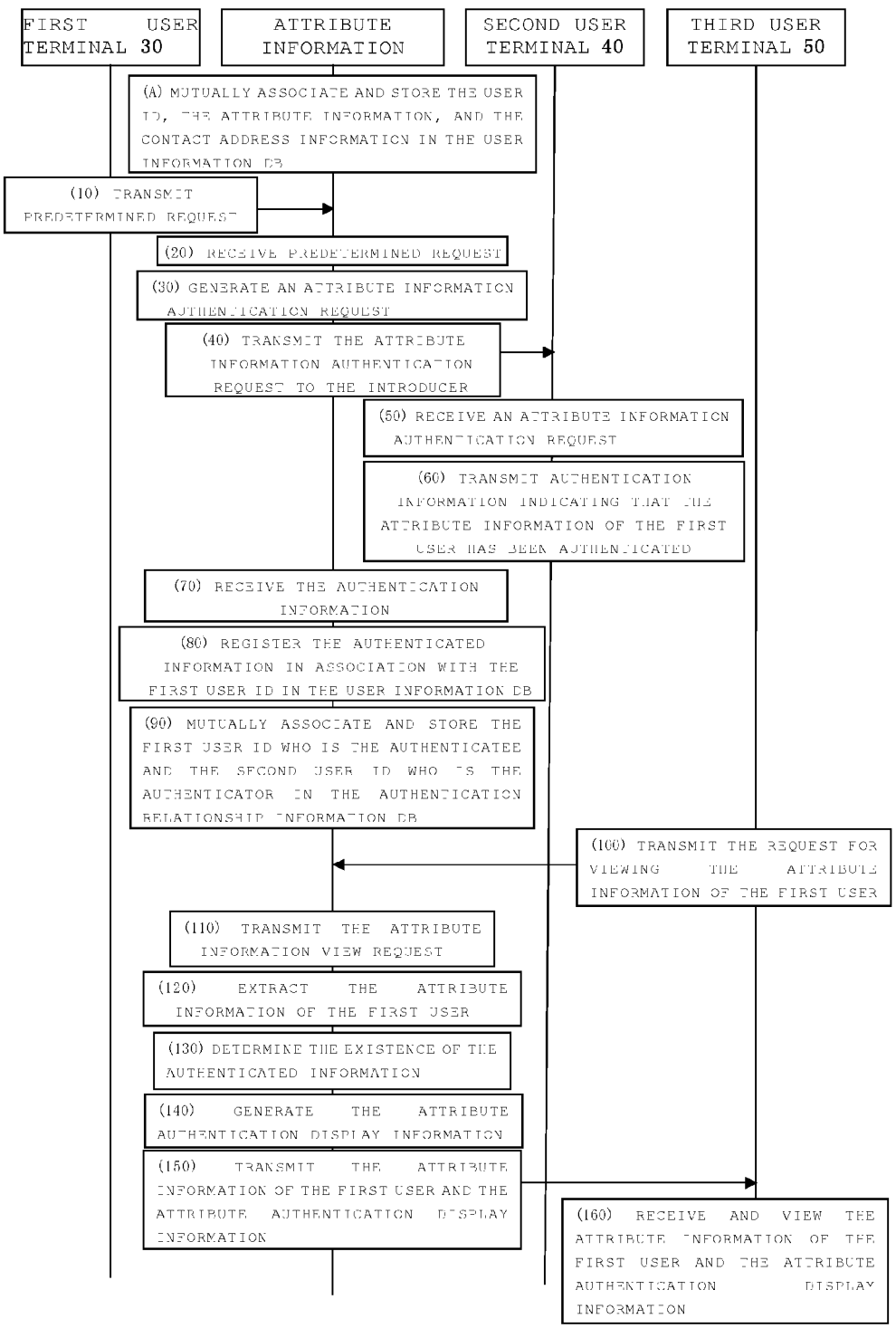

ATTRIBUTE INFORMATION AUTHENTICATION APPARATUS, ATTRIBUTE INFORMATION AUTHENTICATION METHOD, AND STORAGE MEDIUM FOR STORING COMPUTER PROGRAM

This application is a national phase entry under 35 U.S.C. §371 of PCT Patent Application No. PCT/JP2008/068551, filed on Oct. 14, 2008, which claims priority under 35 U.S.C. §119 to Japanese Patent Application No. 2007-341391, filed Dec. 28, 2007, both of which are incorporated by reference.

TECHNICAL FIELD

The present invention relates to an attribute information authentication apparatus, an attribute information authentication method, and a storage medium for storing an attribute information authentication program for use by at least two or more users whose attribute information for describing its own characteristics is registered on a network service website established on a communication network; and specifically relates to a technique for guaranteeing that a user safely and securely maintains and expands friendship with another user.

BACKGROUND ART

In recent years, there has been an increasing number of services for forming new friendships using community websites established on the Internet or other communication networks. Such services are referred to as social networking services (hereinafter referred to as "SNS services"). Characteristics such as name, address, birthday, hometown, alma mater (academic background), work (profession), email address, blood type, hobbies, preferred sports, and favorite foods are registered as attribute information of a user, and are used as an aid for forming new friendships.

With this SNS service, all or part of the attribute information is disclosed to other participants who have signed up for the SNS service and are forming friendships, by setting disclosure settings related to the attribute information registered during signup. The disclosure of attribute information facilitates the formation of new friendships when the range of the attribute information is increased, and when a greater amount of detail is registered, attribute information that is had in common is used as a connection that facilitates the formation of new and closer friendships.

SNS services are founded on the concept of building human networks based on existing human relationships and trusted relationships in the actual society of friends and acquaintances. Therefore, the registered attribute information must be factual as a condition for using an SNS service, as otherwise the human relationships and trusted relationships, i.e., the person-to-person connections, cannot be maintained.

Such an SNS service is a service that is accessed on a website as described above. Therefore, it is difficult to confirm personal identity using a driver license, passport, health insurance card, or the like as is performed by, e.g., financial institutions to open an account, or when purchasing a mobile phone, or in other such situations. Therefore, no form of personal identification is currently used.

As a result, pseudonyms and false information that do not match actual attribute information can be easily registered. Anonymity is maintained once false attribute information has been registered and it is not easy to identify the real person when misconduct has occurred. Therefore, by misusing the fact that the real person cannot be identified, users who carry out improper acts are sometimes permitted to slander and defame other people, to post vulgar images, or to carry out other improper activities that are contrary to good public conduct on the network service website.

There are also SNS services that cannot be used without an invitation from an existing participant who has previously registered attribute information and become a member, and there are services in which any number of unspecified persons can freely participate. Additionally, the registration of users who carry out improper activities under a pseudonym cannot be effectively removed, and there is a risk that the safe and secure maintenance and expansion of friendship relationships cannot be guaranteed.

In view of the above, a method has been proposed (see Patent Document 1) as a way to prevent impersonated contracts and other improper activities has been proposed. In the method, a confirmation terminal of an affiliated store or a confirmation terminal device at a sales finance company where the customer is present is used for providing information required to confirm intent and personal identify of a contract signatory by establishing a connection via a communication line and simultaneously transceiving audio, video, and the like in two directions.

Although for a different purpose, there has also been proposed a method (see Patent Document 2) in which a member who is introducing a new member inputs predetermined details that include the name and email address of the person being introduced, and an email containing instructions is automatically sent to the mail box of the person being introduced on the basis of the email address. The person being introduced reads the instruction email, confirms the name and other information thus inputted, makes changes if there is an error, and then adds attribute details such as address, telephone number, work address, and family.

However, the method described in Patent Document 1 is designed to prevent misconduct such as impersonation by a third party, and is not designed to prevent a person from registering false content with ill intent or the intention of carrying out improper activities.

Also, the method described in Patent Document 2 is designed so that a person can confirm and correct the details inputted by the person to be introduced, and is not designed to prevent a person from registering false content with ill intent or the intention of carrying out improper activities.

Techniques have thus been proposed for preventing misconduct such as impersonation by a third party. However, there is currently no proposed technique for preventing a person with ill intent from registering false content, and for guaranteeing the safe and secure maintenance and expansion of friendships with other participants.

[Patent Document 1] JP-A 2007-26154
[Patent Document 2] JP-A 2002-279124

DISCLOSURE OF THE INVENTION

Problems the Invention is Intended to Solve

The present invention was contrived in view of the above, and an object thereof is to prevent registration of false content, and to deter improper use that is contrary to good public conduct while guaranteeing the safe and secure maintenance and expansion of friendship relationships.

Means for Solving the Problems

The attribute information authentication apparatus of the present invention is a device for a second user to authenticate attribute information of a first user, a plurality of user terminals being connected via a communication network and used by users, whose attribute information expressing the characteristics of the users is registered as a condition for using a network service website established on a communication network, the device comprising a first storage device for mutually associating and storing user identification information for identifying the user, attribute information having at least one or more items registered by the user, and information for contacting the user terminal; an attribute information authentication request processing device for transmitting to the second user terminal used by the second user, attribute information registered by the first user and transmitted from the first user terminal used by the first user, as well as attribute information authentication request information for requesting authentication of the attribute information, when a predetermined request has been received from the first user terminal used by the first user; and an attribute information authentication processing device for registering authenticated information indicating that authentication information has been associated with the attribute information registered by the first user and received by the first storage device when the authentication information indicating that the attribute information registered by the first user has been authenticated has been received from the second user terminal in accordance with the transmission of the attribute information authentication request information via the attribute information authentication request processing device.

The attribute information authentication apparatus according to the present invention may furthermore comprise an attribute information view request processing device for referencing the first storage device and extracting predetermined attribute information on the basis of the first user identification information, when an attribute information view request has been received for requesting viewing of the attribute information having at least one or more items among the attribute information registered by the first user and the first user identification information specified by the first user using one of the user terminals after the authenticated information has been registered via the attribute information authentication processing device; determining the existence of authenticated information registered in association with the attribute information; generating attribute authentication display information for visually and identifiably displaying on the user terminal the fact that the authenticated information exists, when the authenticated information has been registered; transmitting to the user terminals the generated attribute authentication display information together with the extracted attribute information of the first user; and conversely transmitting the extracted attribute information of the first user to the user terminals when the authenticated information is not registered.

The attribute information authentication apparatus of the present invention may further comprise an invitation information processing device for receiving from the second user terminal a new user invitation request that includes the second user identification information, receiving invitation information that includes a message encouraging registration of attribute information in order to use the network service website, and information for contacting the user specified by the second user, and furthermore generating an invitation message and transmitting the invitation message to the first user terminal on the basis of the information for contacting the first user, where the user specified by the second user is the first user; and an attribute registration request receiving device for receiving as a predetermined request the registration request containing the first user attribute information from the first user terminal in accordance with the transmission of the invitation message via the invitation information processing device, wherein the attribute information authentication request processing device references the first storage device, specifies the information for contacting the second user on the basis of the second user identification information received by the invitation information processing device, and furthermore transmits to the second user terminal the attribute information authentication request on the basis of the contact address information, when the registration request has been received.

The attribute information authentication apparatus according to the present invention may further comprise an attribute authentication request receiving device for receiving as the predetermined request a request for authenticating attribute information of the first user from the first user terminal, and receiving attribute information authentication instructions containing second user identification information in which the user specified by the first user is the second user from among the users already using the network service website, wherein the attribute information authentication request processing device references the first storage device, specifies the information for contacting the second user on the basis of the second user identification information received by the attribute authentication request receiving device, and furthermore transmits the attribute information authentication request to the second user terminal on the basis of the contact address information, when the authentication request has been received.

The attribute information authentication apparatus according to the present invention may further comprise: a second storage device for mutually associating and storing the first user identification information as the authenticatee whose attribute information has been authenticated, and the second user identification information as the authenticator who authenticated the attribute information, in accordance with the registration of the authenticated information via the attribute information authentication processing device; and an attribute modification request receiving device for receiving from the first user terminal the first user identification information and an attribute modification request desiring registration modification of the attribute information stored in the first storage device, wherein the attribute information authentication request processing device references the second storage device and specifies the second user identification information as the authenticator of the attribute information of the first user that is associated and stored on the basis of the first user identification information in accordance with the receiving of the attribute modification request via the attribute modification request receiving device, references the first storage device and specifies the information for contacting the second user on the basis of the second user identification information, and furthermore transmits to the second user terminal the attribute information modification authentication request information for requesting authentication of the modification attribute information on the basis of the contact address information; and the attribute information authentication processing device maintains the authenticated information registered in the first storage device in association with the attribute information registered by the first user when re-authentication information, which indicates that the attribute information modified by the first user has been authenticated, has been received from the second user terminal in accordance with the transmission of attribute information modification and authentication request information via the attribute information authentication request processing device, and otherwise deletes the authenticated information registered in the first storage device in association with the attribute information registered by the first user when authentication refusal information indicating that the attribute information modified by the first user is not authenticated, or when the re-authorization information indicating that the attribute information modified by the first user has been authenticated within a predetermined period of time.

The attribute information authentication apparatus of the present invention may also be configured so that the attribute information authentication request processing means references the first storage device and determines the existence of the authenticated information registered in association with the attribute information of the second user on the basis of second user identification information when a predetermined request has been received from the first user terminal; transmits the attribute information authentication request to the second user terminal when the authenticated existing information has been registered; and otherwise transmits to the first user terminal an attribute authentication failure notification for providing notification that the second user does not have authorization to authenticate attribute information when the authenticated information has not been registered.

The attribute information authentication apparatus of the present invention further comprises a registration cancellation processing device for receiving the second user identification information from the second user terminal and a registration cancellation request requested by the second user to cancel the registration of attribute information stored in the first storage section, and deleting the registration of the attribute information stored in the first storage section on the basis of the second user identification information, wherein, in accordance with the deletion of the attribute information via the registration cancellation processing device, the attribute information authentication processing device references the second storage device, specifies the first user identification information stored in association with the second user identification information, furthermore references the first storage device, and deletes the authenticated information registered in association with the attribute information registered by the first user on the basis of the first user identification information.

The attribute information authentication apparatus of the present invention may further comprise a third storage device for mutually associating and storing identification information indicating a friendship between users; and a registration cancellation processing device for receiving from the second user terminal a friendship registration cancellation request containing the second user identification information and the first user identification information requesting registration cancellation of a friendship stored in the third storage section by the second user, and cancelling the registration of a friendship stored in the third storage section on the basis of the second user identification information, wherein the attribute information authentication processing device, in accordance with the friendship cancellation via the registration cancellation processing device, references the third storage device, specifies the first user identification information stored in association with the second user identification information, furthermore references the first storage device, and deletes the authenticated information registered in association with the attribute information registered by the first user on the basis of first user identification information.

The attribute information authentication method of the present invention is a method for a second user to authenticate attribute information of a first user, by using a computer having a first storage device for mutually associating and storing user identification information for identifying the user, attribute information having at least one or more items registered by the user, and information for contacting the user terminal, a plurality of user terminals being connected via a communication network and used by users, whose attribute information expressing the characteristics of the users is registered as a condition for using a network service website established on a communication network, the method comprising a step in which the attribute information authentication request processing device transmits attribute information registered by the first user and attribute information authentication request information for requesting authentication of the attribute information to the second user terminal used by the second user, when a predetermined request has been received from the first user terminal used by the first user; and a step in which the attribute information authentication processing device registers the authenticated information indicating that the authentication information has been associated with the attribute information registered by the first user and received in the first storage device, when the authentication information indicating that the attribute information registered by the first user has been authenticated is received from the second user terminal.

The storage medium for storing an attribute information authentication program of the present invention is a storage medium for storing a computer program for causing a computer to function as an apparatus for a second user to authenticate attribute information of a first user, by using a device having a first storage device capable of mutually associating and storing user identification information for identifying the user, attribute information having at least one or more items registered by the user, information for contacting the user terminal, and authenticated information indicating that the user has already been authenticated, a plurality of user terminals being connected via a communication network and used by users, whose attribute information expressing the characteristics of the users is registered as a condition for using a network service website established on a communication network, the apparatus comprising a device for transmitting to the second user terminal used by the second user, attribute information registered by the first user and transmitted from the first user terminal used by the first user, and attribute information authentication request information for requesting authentication of the attribute information, when a predetermined request has been received from the first user terminal used by the first user; and a device for registering the authenticated information indicating that the authentication information has been associated with the attribute information registered by the first user and received in the first storage device, when the authentication information indicating that the attribute information registered by the first user has been authenticated is received from the second user terminal, in accordance with the transmission of the attribute information authentication request information.

EFFECT OF THE INVENTION

The attribute information authentication apparatus of the present invention transmits attribute information registered by a first user to a second user terminal used by a second user, receives authentication information indicating that the attribute information has been authenticated from the second user terminal, and registers authenticated information indicating that the authentication information has been associated with the attribute information and received. Furthermore, since reliability cannot be obtained when objective authentication cannot be obtained in the case that a person attempts to falsely register his/her own attribute information, it is possible to encourage registration of correct attribute information without a pseudonym. Also, new friendships can be expanded in a safe and secure manner while developing amicable relationships because the reliability of the attribute information of the users can be objectively determined by the existence of the registration of authenticated information.

Therefore, in the present invention, it is possible to provide a technique for preventing registration of false content, and to deter improper use that is contrary to good public conduct while guaranteeing the safe and secure maintenance and expansion of friendly associations.

BEST MODE FOR CARRYING OUT THE INVENTION

An example of the attribute information authentication apparatus, the attribute information authentication method, and the storage medium for storing a computer program according to the present invention will be described below with reference to the drawings.

The present embodiment will be described using an example of the case in which a first user, whose attribute information expressing his/her characteristics is registered on an SNS service website available on a communication network, receives authentication from a second user that there is no error in the attribute information registration. The existence of the authentication is visually and identifiably displayed, whereby the reliability of the first user is improved, and support for building a new friendship is readily and effectively provided in a safe and secure manner.

FIG. 1 is a block diagram showing an example of an embodiment of the attribute information authentication system (hereinafter referred to as the "present system") using the attribute information authentication apparatus (hereinafter referred to as "the server") according to the present invention. Reference numeral 10 indicates the server.

The server 10 is a device to which at least a first user terminal 30, a second user terminal 40, or more user terminals are connected via a communication network NW so that information can be transceived, as shown in FIG. 1. The user terminals are used by users, whose attribute information expressing the his/her characteristics is registered as a condition for using an SNS service website established on a communication network.

Examples of the communication network NW include the Internet, a LAN (local area network), and other computer communication networks. The server 10, the first user terminal 30, and the second user terminal 40 are connected to the communication network NW via private line, a public switched telephone network (PSTN), a wireless telephone network, a CATV network, a satellite communication network, or another communication network.

The first user terminal 30 and the second user terminal 40 may be an information processing device capable of exchanging information with the server 10, and is implemented using, e.g., a personal computer having a browser, a PDA (personal digital assistant) having a data communication function, and a mobile phone.

The first user terminal 30 and the second user terminal 40 has a CPU (central processing unit) (not shown); a program storage section; a mouse, a keyboard, a key button, or another input device; a display or another output device; and an OS (operating system), a WWW browser, and the like.

In FIG. 1, only one first user terminal 30 and one second user terminal 40 are connected to the server 10 via the communication network NW, but the server 10 may be connected to a plurality of user terminals. The user terminal is the first user terminal 30 that a user uses when desiring attribute information authentication, and is the second user terminal 40 that a user uses when judging the authenticity of attribute information.

The server 10 is also a device connected to a third user terminal 50 via the communication network NW. The third user terminal 50 is referred to as a communication terminal used by either user, and is referred to as the third user terminal 50 in order to distinguish between the first user terminal 30 used by the first user, who is the to-be-authenticated person whose attribute information is to be authenticated, and the second user terminal 40 used by the second user, who is the authenticator who authenticates the attribute information. Therefore, the first user terminal 30 and the second user terminal 40 are included in the third user terminal 50.

Next, an overview of the attribute information authentication system of the present invention will be described with reference to FIG. 1.

A first user using the first user terminal 30 accesses the attribute information authentication website and transmits an attribute information registration request or an attribute information authentication request to the server 10, as shown in FIG. 1 (see 1.).

The server 10 receives the attribute information registration request or the attribute information authentication request and transmits the attribute information authentication request to the second user terminal 40 (see 2.)

The second user terminal 40 receives the attribute information authentication request (see 3.).

The second user terminal 40 subsequently transmits (returns) the authentication information indicating that the attribute information of the first user has been authenticated (see 4.).

The server 10 receives the authentication information from the second user terminal 40 (see 5.).

The server 10 registers the authenticated information in association with the attribute information registered by the first user (see 6.).

The server 10 mutually associates and stores the first user identification information (hereinafter referred to as "first user ID"), i.e., the authenticatee whose attribute information is to be authenticated; and the second user identification information (hereinafter referred to as "second user ID"), i.e., the authenticator who authenticated the attribute information (see 7.).

A third user using the third user terminal 50 (30, 40) accesses the attribute information authentication website, and transmits the request to view the first user attribute information to the server 10 (see 8.).

The server 10 receives the request to view the first user attribute information (see 9.).

The server 10 then extracts the attribute information of the first user (see 10.).

The server 10 determines the existence of the authenticated information registered in association with the extracted attribute information (see 11.).

When the registration of authenticated information exists, the server 10 generates and transmits attribute authentication display information to the third user terminal 50 (30, 40) together with the extracted attribute information (see 12.).

When the registration of the authenticated information does not exist, the extracted attribute information is transmitted to the third user terminal 50.

The third user terminal 50 (30, 40) receives the attribute information together with the attribute authentication display information, or receives only the attribute information (see 13.).

The correct attribute information is thereby registered without a pseudonym. The third user participating in the service can confirm the reliability of the attribute information of the first user on the basis of the existence of the attribute authentication display information, and can therefore expand new friendships in a safe and secure manner while developing amicable relationships with many users.

Next, the configuration of the server 10 will be described with reference to FIGS. 2 and 3.

FIG. 2 is a block diagram showing an example of an embodiment of the server 10; and FIG. 3 is a block diagram showing a detailed example of an embodiment of the server 10.

The server 10 basically has at least a user information database (DB) 1, an attribute information authentication request processing section 11, an attribute information authentication processing section 12, as shown in FIGS. 2 and 3. The server 10 also has an invitation information processing section 14, and an attribute registration request receiving section 15. The server 10 may furthermore have an attribute information view request processing section 13.

These functional blocks can be composed of a CPU (central processing unit), a program storage section, and the like contained in the server 10. The CPU controls the constituent elements of the server 10 in accordance with a program stored in the program storage section, and executes program processing. The program storage section is composed of a ROM (read only memory), a RAM (random access memory), and the like, and stores the various programs used by the server 10.

The attribute information authentication method (hereinafter referred to as the "present method") described below is carried out by executing an attribute information authentication program (hereinafter referred to as the "the program") according to the present invention in the server 10.

A computer (not shown) can be made to function in a similar manner to the server 10 by using a computer-readable recording medium (hereinafter referred to as the "present recording medium") in which the program is recorded. In other words, the computer (not shown) can execute the present method by reading and executing the program from the present recording medium.

The user information database DB1 is a device for mutually associating and storing user ID and attribute information composed of at least one item registered in advance by the user. This attribute information is information that includes the user's real name, face photograph, and responses to questions such as gender, birthday, hometown, alma mater, blood type, hobbies, special skills, and sports. Specifically, "X University" or "Graduated from X university" is used in response to the item about alma mater; "Type O" in response to the item of blood type; and "Listening to music" in response to the item of hobbies.

The attribute information for searching purposes may be inputted one by one for each item, or may be collectively inputted in a single process. When collectively inputted, search keywords may be inputted as thought up by the user, or may be inputted in a single frame using comma and spaces.

In the user information database DB1, information for contacting the user terminal is furthermore stored in mutual association with the user ID.

In the present invention, the user ID is issued and conferred when the user registers attribute information that expresses his/her own characteristics.

The user information database DB1 has a function for registering authenticated information received by the attribute information authentication processing section 12.

As used herein, the term "authenticated information" refers to information indicating that the authentication information of the user has been authenticated and that the authentication information has been received, and registration of the authenticated information is referred to as flagging.

FIG. 4 is a diagram showing an example of the information stored in the user information database DB1.

For example, in the user information database shown in FIG. 4, the database has a structure in which the user ID is an index, and the attribute information, contact address information, and authenticated information are included in a single record.

The attribute information authentication request processing section 11 carries out a process for transmitting attribute information authentication request information to the second user terminal 40 used by the second user when a predetermined request has been received by the first user terminal 30 being used by the first user. The attribute information authentication request information is used for requesting the attribute information registered by the first user and for requesting authentication of the attribute information.

As used herein, the term "predetermined request" specifically refers to a request for registration of attribute information received by a later-described attribute registration request receiving section 15, and to a request for authentication of the attribute information received by the attribute authentication request receiving section 16.

In this case, the attribute information authentication request processing section 11 may be composed of, e.g., a predetermined request receiving section 11a, and an attribute information authentication request transmitting section 11d.

The attribute information authentication processing section 12 registers authenticated information indicating that the authentication information has been received by the user information database DB1 in association with the attribute information registered by the first user when the authentication information, which indicates that the attribute information registered by the first user has been authenticated, has been received by the second user terminal 40 in accordance with the transmission of the attribute information authentication request information by the attribute information authentication request processing section 11.

In this case, the attribute information authentication processing section 12 may be composed of an authentication information receiving section 12a and an authenticated information registering section 12b.

The attribute information view request processing section 13 references the user information database DB1, extracts predetermined attribute information on the basis of the first user ID, and determines the existence of authenticated information registered in association with the attribute information, when an attribute information view request has been received for requesting viewing of the attribute information having at least one or more items among the attribute information registered by the first user and the first user ID specified by the first user from any of the user terminals 30, 40, 50 after the authenticated information has been registered via the attribute information authentication processing device 12. The attribute information view request processing section 13, furthermore, generates attribute authentication display information for visually and identifiably displaying on the user terminals 30, 40, 50 the fact that the authenticated information exists, when the authenticated information has been registered; transmits to the user terminals 30, 40, 50 the generated attribute authentication display information together with the extracted attribute information of the first user; and conversely transmits the extracted attribute information of the first user to the user terminals 30, 40, 50 when the authenticated information is not registered.

As used herein, the term "attribute authentication display information" may be, e.g., a graphic symbol such as a star, heart, or flower mark; or may be a reference numeral, or a numerical or graph display. The color of the attribute information displayed on the user terminals 30, 40, 50 may also be varied.

In this situation, the attribute information view request processing section 13 may be composed of an attribute information view request receiving section 13*a*, an attribute information extraction section 13*b*, an authenticated information existence determination section 13*c*, an attribute authentication display information generation section 13*d*, and an attribute information transmitting section 13*e*.

The invitation information processing section 14 receives a new user invitation request containing the second user ID from the second user terminal 40; receives invitation information that includes a message for prompting registration of the attribute information in order to use the network service website, and information for contacting the user specified by the second user; furthermore generates an invitation message; and transmits the invitation message to the first user terminal on the basis of the information for contacting the first user when the user specified by the second user is the first user.

In this case, the invitation information processing section 14 may be composed of an invitation information receiving section 14*a* and an invitation message transmitting section 14*b*.

The attribute registration request receiving section 15 receives a registration request as a predetermined request containing the attribute information of the first user from the first user terminal 30 in accordance with the transmission of the invitation message via the invitation information processing section 14.

In this configuration, the attribute information authentication request processing section 11 references the user information database DB1 when a registration request has been received via the attribute registration request receiving section 15, specifies the information for contacting the second user on the basis of the second user ID received via the invitation information processing section 14, and furthermore transmits the attribute information authentication request to the second user terminal 40 on the basis of the contact address information.

In this case, the attribute information authentication request processing section 11 may be composed of, e.g., a predetermined request receiving section 11*a*, a second user contact address specifying section 11*b*, and an attribute information authentication request transmitting section 11*d*.

Next, an example of the present method carried out by the server 10 described above will be described with reference to the drawings.

First, an outline of the basic attribute information authentication processing of the present method will be described with reference to FIG. 9.

FIG. 9 is a sequence diagram showing the basic processing flow of the attribute information authentication method according to the present invention.

Described in the present embodiment is the case in which the first user terminal 30 connected via a communication network NW downloads the home page of the SNS service website, and the second user is asked to authenticate that there is no error in the attribute information of the first user when a predetermined request has been transmitted from the home page; and also the case in which authenticated attribute information is displayed in a visually understandable manner when a viewing of the attribute information of the first user has been requested.

First, the server 10 mutually associates and stores in the user information database DB1 the user ID, the attribute information composed of at least one or more items registered in advance by the user, and the information for contacting the user terminal (see (A)).

Next, the first user actuates the first user terminal 30, connects to the server 10 via the communication network NW, and receives the predetermined request (see (10)).

The server 10 receives the predetermined request transmitted from the first user terminal 30 (see (20)).

The server 10 subsequently generates an attribute information authentication request for requesting authentication of the attribute information registered by the first user and that there is no error in the attribute information (see (30)).

In this case, the present method can be divided into the following two cases. The predetermined request noted above may refer to a registration request for carrying out authentication of attribute information of a new registrant during registration via an invitation from a user (existing registrant or member) whose attribute information has already been registered, to a user (unregistered person or nonmember) who does not have registered attribute information expressing his/her own characteristics, such registration being a condition for using the network service website establish on a communication network. The predetermined request noted above may also refer to an authentication request for a user (existing registrant or member) whose attribute information has already been registered to authenticate attribute information when so desired.

<First Embodiment>

First, a first embodiment will be described with reference to FIG. 10 for the case in which the predetermined request is an attribute information registration request in which a second user (existing registrant or member), whose registration for using the network service website established on a communication network has been completed, transmits notification to the first user as an invitation to the network service website; the first user, in accordance with the notification, registers attribute information that expresses his/her own characteristics as a condition for using the network service website; and requests that the second user as the introducing party authenticate the attribute information [of the first user] as a new registrant.

FIG. 10 is a sequence diagram showing the flow of attribute information registration request processing in the attribute information authentication method according to the present invention.

First, the second user actuates the second user terminal 40, connects to the server 10 via the communication network NW, accesses the SNS service website constructed on the server 10, and downloads the home page.

The second user accesses the SNS service website, inputs the user ID conferred in advance and a password set in advance, and then logs in. During login, the second user ID is stored temporarily.

The SNS service website can be expressed in a form such as that shown in, e.g., FIG. 11. FIG. 11 is a diagram showing an example of an SNS website login screen displayed on the display of the second user terminal 40 connected to the server 10. The SNS website login screen 100 displays instructions such as "Please input your ID and password and press the send button to login." Also displayed is a member login field composed of a user ID input field 101 for confirming that person logging in is a member who can use the system, and a password input field 102. Furthermore displayed on the SNS website login screen 100 is a "Send" button 109 for the login to be carried out using the user ID and password inputted in the member login field.

Therefore, users who invite a new user by using the SNS service website input the user ID in the user ID input field 101, input the password in the password input field 102, and thereafter select the "Send" button 109 to login.

When the "Send" button 109 has been selected on the SNS website login screen 100, the member is acknowledged to be registered as a result of authentication and is logged in, whereby a menu selection screen is displayed on the display of the second user terminal 40.

The menu selection screen can be expressed in a form such as that shown in, e.g., FIG. 12. FIG. 12 is a schematic view showing an example of a menu selection screen displayed on the display of the second user terminal 40 connected to the server 10. Displayed on the menu selection screen 110 are a "New user invitation" button 111 for inviting a new user, an "Attribute information authentication" button 112 for requesting authentication of attribute information, a "SNS registration cancellation" button 113 for stopping the use of (leaving) the SNS service, a "Misconduct notification" button 114 for providing notification that misconduct that violates the prohibited conduct details has taken place when using the SNS service, . . . , and an "End" button 119 for logging out of the SNS service website.

The menu selection screen may be displayed as a part of a later-described user attribute information display screen (the so-called "My Page") of each user.

Therefore, a user desiring to invite a new user selects the "New user invitation" button 111.

The second user terminal 40 thereby transmits a new user invitation request to the server 10 (see (1A)).

The server 10 receives the invitation request transmitted from the second user terminal 40 (see (2A)).

When a new user invitation request containing the second user ID is received, the server 10 subsequently transmits the invitation information input format to the second user terminal 40 (see (3A)). The invitation information input format is an input screen of a so-called invitation email that the second user transmits to the first user receiving the invitation.

The second user terminal 40 receives the invitation information input format transmitted by the server 10 (see (4A)). The second user terminal 40 subsequently accepts input to the invitation information input format (see (5A)).

In this situation, the invitation information input format displayed on the display of the second user terminal 40 and for which predetermined input has been completed can be expressed in a form such as that shown in, e.g., FIG. 13. FIG. 13 is a schematic view showing an example of an invitation email screen displayed on the display of the second user terminal connected to the server 10. Provided to the invitation email screen 120 are an invitation user name input field 121 for inputting the name of the user to be invited, an invitation email transmit destination input field 122 for inputting the email address of the user to be invited, a message input field 123 for inputting a message to the user to be invited, and a "Send" button 129 directing that the invitation mail be transmitted to the user to be invited.

In FIG. 13, the invitation user name input field 121 has "Ichiro Matsuoka", the invitation email transmit destination input field 122 has "m-ichiro@abc . . . .ne.jp", and the message input field 123 has "This is Ai. I am inviting you to SNS!"

Therefore, the user desiring to invite a new user selects the "New user invitation" button 111.

The second user terminal 40 thereby transmits the invitation information transmission request to the server 10 (see (6A)).

The server 10 receives the invitation information transmission request transmitted from the second user terminal 40 (see (7A)). Specifically, the server 10 receives the invitation information containing a message encouraging registration of attribute information in order to use the network service website, and the information for contacting the first user specified by the second user.

Next, the server 10 generates an invitation message and transmits the invitation message to the first user terminal 30 on the basis of the information for contacting the first user (see (8A)).

The first user terminal 30 receives the invitation message transmitted by the server 10 (see (9A)).

In this situation, the invitation message screen displayed on the display of the first user terminal 30 can be expressed in a form such as that shown in, e.g., FIG. 14. FIG. 14 is a diagram showing an example of an invitation message screen displayed on the display of the first user terminal 30 connected to the server 10. The invitation message screen 130 is provided with an invited user display section 131 for displaying the name of the first user invited by the second user, an explanation section 132 for explaining that [the first user] has been invited to the SNS service by the second user, a message display section 133 for displaying the message from the second user, and a registration address link button 134 for linking to the registration address when [the first user] receives an invitation from the second user and registers on the SNS service.

Therefore, the first user desiring to newly register selects (clicks) the registration address link button 134 and inputs predetermined attribute information.

When the first user completes inputting the predetermined attribute information, the first user terminal 30 selects the registration button (not shown) to thereby transmit to the server 10 the attribute registration request for requesting registration of attribute information (see (10A)).

The server 10 receives as the predetermined request the registration request containing the attribute information of the first user transmitted by the first user terminal 30 (see (20A)).

When the registration of the attribute information has been completed, the server 10 transmits the registration ID notification to the first user terminal 30 to provide notification that registration has been completed.

In this situation, the registration ID notification screen displayed on the display of the first user terminal 30 can be displayed in a form such as that shown in, e.g., FIG. 15. FIG. 15 is a diagram showing an example of a registration ID notification screen displayed on the display of the first user terminal 30 connected to the server 10. The registration ID notification screen 140 is provided with a registration ID notification field 141 for providing notification of the registered ID, and an SNS service website link button 142 linked to the home page of the SNS service website.

Displayed in FIG. 15 is a notification "Ichiro Matsuoka, your registration on the social networking website SNS has been completed", and "Your ID is m-ichiro@abc . . . .ne.jp" is displayed in the registration ID notification field 141. An SNS service website link button 142 such as "http://www.samurai.com/ . . . " is also provided.

Therefore, the first user selects (clicks) the SNS service website link button 142, whereby the SNS website login screen shown in FIG. 11 is displayed on the display of the first user terminal 30. [The first user] inputs "m-ichiro@abc . . . .ne.jp" to the user ID input field 101, inputs the predetermined password in the password input field 102, selects the "Send" button 109, and can thereby receive various services on the present SNS service website.

The server 10 generates an attribute information authentication request in the manner described above when a registration request is received (see (30)).

The server 10 subsequently transmits the generated attribute information authentication request to the second user terminal 40 used by the second user (see (40)).

The second user terminal 40 receives the attribute information authentication request transmitted by the server 10 (see (50)).

In this situation, the attribute information authentication request screen displayed on the display of the second user terminal 40 can be expressed in a form such as that shown in, e.g., FIG. 16. FIG. 16 is a diagram showing an example of an attribute information authentication request screen displayed on the display of the second user terminal 40 connected to the server 10. The attribute information authentication request screen 150 is provided with a name display field 151 for displaying the name of the first user seeking authentication of attribute information during new registration, a face photograph display field 152 for displaying a face photograph of the first user, a button 153 for viewing a detailed profile for confirming attribute information other than the name and face photograph of the first user, and an authentication request message field 154 for obtaining confirmation from the second user as to whether the attribute information of the first user is correct. Also, the attribute information authentication request screen 150 is provided with a "Confirmation" button 158 for authenticating the attribute information of the first user, and a "Hold" button 159 that does not authenticate the attribute information of the first user.

Therefore, the second user selects (clicks) the "Confirmation" button 158 when authentication of the attribute information of the first user is provided, and selects (clicks) the "Hold" button 159 in the case that the authentication is not provided.

The second user selects (clicks) the "Confirmation" button 158, whereby the second user terminal 40 transmits to the server 10 the authentication information indicating that the attribute information registered by the first user has been authenticated (see (60)).

The server 10 receives the authentication information transmitted by the second user terminal 40 (see (70)).

Next, the server 10 registers the authenticated information in the user information database DB1 in association with the attribute information registered by the first user when the authentication information attesting that there is no error in the attribute information registered by the first user has been received (see (80)).

In accordance with the registration of the authenticated information, the server 10 furthermore mutually associates and stores in an authentication relationship information database DB2 the ID of the first user as the authenticatee whose attribute information has been authenticated and the ID of the second user as the authenticator who authenticated the attribute information (see (90)).

The third user terminal 50 (30, 40) used by the either of the users transmits to the server 10 an attribute information view request for requesting viewing of the attribute information composed of at least one or more attribute information registered by the first user (see (100)).

The server 10 receives the attribute information view request transmitted from the third user terminal 50 (see (110)).

Next, the server 10 references the user information DB1 and extracts the attribute information of the first user on the basis of the first user ID contained in the attribute information view request when an attribute information view request has been received (see (120)).

The server 10 subsequently references the user information DB1 and determines the existence of the authenticated information registered in association with the attribute information (see (130)).

The server 10 generates attribute authentication display information for visually and identifiably displaying on the third user terminal 50 (30, 40) the fact that the authenticated information exists when the authenticated information has been registered in the user information DB1 (see (140)).

The server 10 transmits the generated attribute authentication display information together with the attribute information of the first user to the third user terminal 50 (30, 40) (see (150)). However, the attribute authentication display information is not generated when the authenticated information is not registered in the user information DB1, and the attribute information of the first user is transmitted to the third user terminal 50 (30, 40).

The third user terminal 50 (30, 40) receives the attribute information and the attribute authentication display information transmitted by the server 10 (see (160)).

In this situation, the first user attribute information display screen (the so-called "My Page" of the first user) displayed on the display of the third user terminal 50 (30, 40) after authentication can be expressed in a form such as than shown in, e.g., FIG. 17. FIG. 17 is a diagram showing an example of a first user attribute information display screen displayed on the display of the third user terminal 50 (30, 40) connected to the server 10. The first user attribute information display screen 160 is provided with a name display field 161 for displaying the name of the first user whose attribute information is to be confirmed, a face photograph display field 162 for displaying a face photograph of the first user, a button 163 for viewing a detailed profile for confirming attribute information other than the name and face photograph of the first user, a display field 164 for displaying attribute authentication display information, an attribute information modification button 165 for use when the first user desires to modify his/her own attribute information, a first user journal display field 166 for displaying the recent journal of the first user, a friend display list 167 for displaying friends registered in a friendship relation with the first user, a "View entire list" button 168 for displaying all friends registered in a friendship relation, including users who are not displayed in the friend display list 167, and a friend journal display field 169 for displaying the journal of friends registered in a friendship relation with the first user.

In FIG. 17, the attribute information of Ichiro Matsuoka, who is the first user, is authenticated; and a single star level of reliability is displayed in the display field 164. It is also possible to display the name of the authenticator who authenticated the attribute information of Ichiro Matsuoka together with the star as the attribute authentication display information, and to display information linking to the authenticator attribute information display screen (the so-called "My Page" of the authenticator) which allows the attribute information of the authenticator to be confirmed.

In the present embodiment, identification information (ID) is given to the first user when the server 10 has received the registration request containing the attribute information, and the first user ID and the attribute information of the first user are mutually associated and registered in the user information DB1. The network service website can thereby be used even before authentication of the attribute information has been obtained.

In the present embodiment, new user registration may be carried out and identification information (ID) given to the first user when the authentication of the attribute information is obtained from the authenticator; and the first user ID and the attribute information of the first user are mutually associated and registered in the user information DB1. The network service website can thereby be used only after authentication of the attribute information has been obtained, and participation of persons who are unable to register correct attribute information and are liable to commit misconduct can be prevented in advance.

In the present embodiment, when the server 10 has received a registration request containing the attribute information, identification information (ID) is given to the first user, and the server 10 mutually associates and temporarily registers the first user ID and the attribute information of the first user in the user information DB1 conditioned upon receiving authentication information within a predetermined period of time. The server 10 formally registers the attribute information of the first user thus temporarily registered when authentication information has been received within a predetermined length of time, and deletes the registration of the attribute information of the first user thus temporarily registered when the authentication information is not received within a predetermined length of time. Therefore, the network service website can be used before authentication of the attribute information is obtained under the condition that registration will be deleted later, or use of the network service website is prohibited until registration is formally completed, thereby making it possible to prevent in advance the participation of persons who cannot obtain authentication of attribute information and are liable to commit misconduct.

Next, an example of the detailed operation of the server 10 in attribute information registration request processing such as that described above will be described with reference to FIG. 18. FIG. 18 is a flowchart showing the flow of attribute information registration request processing in the server 10.

First, the invitation information processing section 14 determines whether a new user invitation request containing the second user ID has been received from the second user terminal 40 by the invitation information receiving section 14a (S11).

As a result, when the invitation information processing section 14 has received the invitation request (Y), the invitation information processing section 14 then transmits (returns) an invitation information input format to the second user terminal 40 using the invitation message transmitting section 14b (S12).

On the other hand, when the invitation information processing section 14 has not received the invitation request (N), the invitation information processing section 14 repeats the determination of whether a new user invitation request containing the second user ID has been received from the second user terminal 40 (S11).

The invitation information processing section 14 subsequently determines (S13) whether invitation information has been received by the invitation information receiving section 14a from the second user terminal 40. The invitation information contains a message encouraging registration of attribute information that allows the use of the network service website and the information for contacting the user specified by the second user.

As a result, when the invitation information processing section 14 has received the invitation information (Y), the invitation information processing section 14 then generates an invitation message and transmits (S14) invitation message to the first user terminal 30 via the invitation message transmitting section 14b on the basis of the information for contacting the first user, wherein the user specified by the second user is the first user.

On the other hand, when the invitation information processing section 14 has not received the invitation information (N), the attribute registration request receiving section 15 subsequently determines whether the attribute registration request has been received (S15).

As a result, when the attribute registration request receiving section 15 has received the attribute registration request (Y), the attribute information authentication request processing section 11 then receives the attribute registration request in the predetermined request receiving section 11a and generates an attribute information authentication request for requesting authentication of the attribute information registered by the first user and that there is no error in the attribute information (S16).

The attribute information authentication request processing section 11 transmits (S17) the attribute information authentication request via the attribute information authentication request transmitting section 11d to the second user terminal 40 used by the second user.

On the other hand, when the attribute registration request receiving section 15 has not received the attribute registration request (N), the attribute information authentication processing section 12 then determines via the authentication information receiving section 12a whether authentication information indicating that the attribute information registered by the first user has been authenticated has been received (S18) from the second user terminal 40.

As a result, when the attribute information authentication processing section 12 has received the authentication information (Y), the attribute information authentication processing section 12 then registers the authenticated information via the authenticated information registering section 12b in the user information DB1 in association with the attribute information registered by the first user (S19).

The attribute information authentication processing section 12 mutually associates and stores, by way of the authenticated information registering section 12b, the ID of the first user, who is the authenticatee whose attribute information has been authenticated, and the ID of the second user, who is the authenticator that authenticated the attribute information, in the authentication relationship information DB2 (S20).

The series of operations in the server 10 is thereby completed (END).

On the other hand, when the attribute information authentication processing section 12 has not received the authentication information (N), the series of operations in the server 10 is directly completed (END).

In the present embodiment as described above, the registration of correct attribute information can be encouraged without anonymity and the inability to obtain objective authentication, even were a new subscriber to attempt to register false attribute information, because the attribute information of a new subscriber is authenticated when the new subscriber will participate in the network service website. Therefore, the participation (registration of a participant) of those liable to misconduct themselves is prevented in advance.

A detailed example of the operation of the server 10 in the attribute information view request processing subsequently carried out in the attribute information registration request processing described above is next described with reference to FIG. 19. FIG. 19 is a flowchart showing an example of attribute information view request processing in the server 10.

First, the attribute information view request processing section 13 determines (S51) whether the attribute information view request has been received from the third user terminal 50 via the attribute information view request receiving section 13a. The attribute information view request is used for requesting viewing of the first user ID for specifying the first user and attribute information composed of at least one or more items among the attribute information registered by the first user.

As a result, when the attribute information view request processing section 13 has received the attribute information view request (Y), the attribute information view request processing section 13 then references the user information DB1 and extracts predetermined attribute information via the attribute information extraction section 13b on the basis of the first user ID (S52).

On the other hand, when the attribute information view request processing section 13 has not received the attribute information view request, the attribute information view request processing section 13 repeats (S51) the process for determining whether an attribute information view request has been received from the third user terminal 50.

Next, the attribute information view request processing section 13 determines via the authenticated information existence determination section 13c the existence of authenticated information registered in association with the attribute information (S53).

As a result, when the attribute information view request processing section 13 has determined that authenticated information has been registered (Y), the attribute information view request processing section 13 then generates attribute authentication display information in the attribute authentication display information generation section 13d in order to visually and identifiably display on the third user terminal 50 the fact that authenticated information exists (S54).

The attribute information view request processing section 13 furthermore transmits (S55) the extracted attribute information of the first user and the generated attribute authentication display information to the third user terminal 50 via the attribute information transmitting section 13e.

On the other hand, when the attribute information view request processing section 13 cannot determine that authenticated information has been registered, the attribute information view request processing section 13 transmits (S55) the extracted attribute information of the first user to the third user terminal 50 via the attribute information transmitting section 13e.

In the present embodiment as described above, new friendly associations can be maintained/expanded in a safe and secure manner while amicable relationships can be developed with many users because the reliability of the user attribute information can be objectively known when viewing the attribute information registered by users by confirming the existence of the attribute authentication display information in which another user has authenticated that the attribute information is without error.

Also possible in the present embodiment is a configuration in which the attribute information authentication processing section 12 registers the authenticated information in the user information DB1 in accordance with the receiving of the authentication information attested by a different second user, and the attribute information view request processing section 13 generates attribute authentication display information that has been ranked in accordance with the number of instances of authenticated information registered in the user information DB1.

In this case, the attribute authentication display information signifies that, e.g., the number of stars has increased, the color of the star has changed, or the mark or color has changed for a fixed number of instances of authenticated information, in accordance with the number of instances of authenticated information.

In the present invention, a usage history information storage section may be provided for mutually associating and storing the user ID, the usage date of the network service website, and the usage details; and the attribute information authentication processing section 12 may used for modifying the ranking of authenticated information registered in the user information DB1 in accordance with the network service website usage frequency stored in the usage history information storage section.

Such a configuration encourages the active use of the network service website, increases the trustworthiness of users, and can serve as a measure of safe and secure expansion of friendly associations.

<Second Embodiment>

Next, a second embodiment will be described with reference to FIG. 20 for the case in which the predetermined request is an attribute information authentication request in which a first user (existing registrant or member), whose registration for using the network service website established on a communication network has been completed, requests authentication of attribute information from a second user with a registered friendship on the network service website.

FIG. 20 is a sequence diagram showing the flow of attribute information authentication request processing in the attribute information authentication method according to the present invention.

In the present embodiment, the server 10 has an attribute authentication request receiving section 16 in lieu of the invitation information processing section 14 and the attribute registration request receiving section 15, or in addition to the invitation information processing section 14 and the attribute registration request receiving section 15.

The attribute authentication request receiving section 16 carries out processing for receiving the authentication request for the attribute information of the first user as the predetermined request from the first user terminal 30, and receiving attribute information authentication instructions containing the second user ID in which the user specified by the first user from among the users already using the network service website is the second user.

In this case, when an authentication request has been received by the attribute authentication request receiving section 16, the attribute information authentication request processing section 11 references the user information DB1, specifies the information for contacting the second user on the basis of the second user ID received by the attribute authentication request receiving section 16, and furthermore carries out processing for transmitting the attribute information authentication request to the second user terminal 40 on the basis of the contact address information.

In this case, the attribute information authentication request processing section 11 may be composed of, e.g., a predetermined request receiving section 11a, a second user contact address specifying section 11*b*, and an attribute information authentication request transmitting section 11*d*.

The portions that are different from the first embodiment described above are mainly described in the present embodiment. Therefore, the descriptions of the constituent elements that are the same as those of the first embodiment described above will be omitted, and as such are the same unless a particular description is provided. The same applies to each embodiment following the present embodiment.

First, the server 10 mutually associates and stores in the user information database DB1 the attribute information composed of at least one or more items registered in advance by the user, and the information for contacting the user terminal, as shown in FIG. 20 (see (A)).

Next, the first user actuates the first user terminal 30, connects to the server 10 via the communication network NW, accesses the SNS service website constructed in the server 10, and downloads the home page.

The first user visits the SNS service website and inputs the user ID provided in advance and the password set in advance to log in. During login, the first user ID is temporarily stored.

The SNS service website can be expressed in a form such as that shown in, e.g., FIG. 11.

Therefore, the first user inputs the user ID in the user ID input field 101, inputs the password in the password input field 102, and thereafter selects the "Send" button 109 to login.

When the "Send" button 109 has been selected on the SNS website login screen 100, the member is acknowledged to be registered as a result of authentication and is logged in, whereby a menu selection screen such as that shown in FIG. 12 is then displayed on the display of the first user terminal 30.

At this point, the first user selects the "Attribute information authentication" button 112.

The first user terminal 30 thereby transmits the attribute information authentication request to the server 10 (see (10B)).

The server 10 receives the authentication request as the predetermined request transmitted from the first user terminal 30 (see (20B)).

When the authentication request is received, the server 10 then transmits the attribute information authentication instruction input format to the first user terminal 30 (see (21B)).

The first user terminal 30 receives the attribute information authentication instruction input format transmitted from the server 10 (see (22B)).

The first user terminal 30 then accepts input to the attribute information authentication instruction input format (see (23B)).

In this situation, the attribute information authentication instruction input format screen for which predetermined input has been completed and which is displayed on the first user terminal 30 can be expressed in a form such as that shown in, e.g., FIG. 21. FIG. 21 is a diagram showing an example of an attribute information authentication instruction screen displayed on the display of the first user terminal 30 connected to the server 10. The attribute information authentication instruction screen 170 is provided with an authentication user name input field 171 for accepting as input the name of the user to whom the authentication request is made, a message input field 172 for inputting a message to a user to whom the authentication request is made, and a "Send" button 179 for instructing that the attribute information authentication request is to be transmitted to the user to whom the authentication request is made.

In FIG. 21, the authentication user name input field 171 has "Ueo Ai", and the message input field 172 has "This is Matsuoka. Sorry I haven't contacted you for awhile. Please authenticate that my attributes are without error."

Therefore, the first user selects the "Send" button 179 when the predetermined input has been completed.

The first user terminal 30 thereby transmits the attribute information authentication instructions to the server 10 (see (24B)).

The server 10 receives the attribute information authentication instructions transmitted from the first user terminal 30 (see (25B)). Specifically, the server 10 receives the attribute information authentication instructions containing the second user ID in which the user specified by the first user from among the users already using the network service website is the second user.

Next, when the attribute information authentication instructions have been received, the server 10 references the user information DB1 and specifies the information for contacting the second user on the basis of the received second user ID (see (26B)).

The server 10 subsequently generates an attribute information authentication request in the manner described above (see (30)).

The process is thereafter the same as that of the first embodiment.

Next, a detailed example of the operation of the server 10 in the attribute information authentication request processing such as that described above will be described with reference to FIG. 22. FIG. 22 is a flowchart showing the flow attribute information authentication request processing in the server 10.

First, the attribute authentication request receiving section 16 determines whether an attribute authentication request for requesting authentication of the attribute information of the first user has been received from the first user terminal 30 (S31).

As a result, when the attribute authentication request receiving section 16 has received the attribute authentication request (Y), the attribute information authentication request processing section 11 then receives the attribute authentication request via the predetermined request receiving section 11*a* and transmits (returns) an attribute information authentication instruction form to the first user terminal 30 (S32).

On the other hand, when the attribute authentication request receiving section 16 has not received the attribute authentication request (N), the attribute authentication request receiving section 16 repeats the determination of whether an attribute authentication request has been received from the first user terminal 30 (S31).

The attribute information authentication request processing section 11 subsequently determines (S33) whether the attribute information authentication instructions have been received from the first user terminal 30 via the predetermined request receiving section 11*a*. The attribute information authentication instructions contain the second user ID in which the user specified by the first user from among the users already using the network service website is the second user.

As a result, when the attribute information authentication request processing section 11 has received the attribute information authentication instructions (Y), the attribute information authentication request processing section 11 then references the user information DB1 and, via the second user contact address specifying section 11*b*, specifies (S34) the information for contacting the second user on the basis of the second user ID contained in the attribute information authentication instructions thus received.

The attribute information authentication request processing section 11 then generates an attribute information authentication request in the predetermined request receiving section 11a in order to request authentication of the attribute information registered by the first user and verify there is no error in the attribute information (S35).

The attribute information authentication request processing section 11 transmits the attribute information authentication request to the specified second user terminal 40 used by the second user via the attribute information authentication request transmitting section 11d (S36).

On the other hand, when the attribute information authentication request processing section 11 has not received the attribute information authentication instructions (N), the attribute information authentication processing section 12 then determines (S37) whether the authentication information, which indicates that the attribute information registered by the first user has been authenticated, has been received from the second user terminal 40 via the authentication information receiving section 12a.

As a result, when the attribute information authentication processing section 12 has received the authentication information (Y), the attribute information authentication processing section 12 then registers via the authenticated information registering section 12b the authenticated information indicating that the authentication information has been associated with the attribute information registered by the first user and received in the user information DB1 (S38).

The attribute information authentication processing section 12 furthermore mutually associates and stores, by way of the authenticated information registering section 12b, the ID of the first user, who is the authenticatee whose attribute information has been authenticated, and the ID of the second user, who is the authenticator that authenticated the attribute information, in the authentication relationship information DB2 (S39).

The series of operations in the server 10 is thereby completed (END).

In the present embodiment as described above, it is therefore possible to distinguish disreputable participants who cannot objectively obtain authentication because the attribute information can be authenticated even when [a user] is already participating in the network service website.

<Third Embodiment>

Next, a third embodiment will be described with reference to FIG. 23 for the case of authenticating modified attribute information when the first user, whose authentication of the attribute information has already been obtained from the second user, has modified registered attribute information; and re-authentication has been obtained from the second user who authenticated the attribute information of the first user.

FIG. 23 is a sequence diagram showing the flow of attribute information modification and authentication request processing in the attribute information authentication method according to the present invention.

In the present embodiment, the server 10 furthermore has an authentication relationship information database (DB) 2 and an attribute modification request receiving section 17.

The authentication relationship information DB2 is a device for mutually associating and storing the ID of the first user, who is the authenticatee whose attribute information has been authenticated, and the ID of the second user, who is the authenticator that authenticated the attribute information.

As used herein, the term "authentication" refers to attesting that there is no error in the attribute information to be registered.

FIG. 5 is a diagram showing an example of information stored in the authentication relationship information DB2.

For example, in the authentication relationship information database shown in FIG. 5, the database has a structure in which the first user ID and the second user ID constitute a single record.

The attribute modification request receiving section 17 receives from the first user terminal 30 the first user ID and the attribute modification request for requesting modification and registration of the attribute information stored in the user information DB1, and also receives the modified attribute information.

The attribute modification request is used for requesting the modification of the content of attribute information that has already been registered.

In this configuration, the attribute information authentication request processing section 11 has a function for referencing the authentication relationship information DB2 in accordance with the receiving of the attribute modification request in the attribute modification request receiving section 17; specifying the ID of the second user, who is the authenticator of the attribute information of the first user, the ID of the second user being associated and stored on the basis of the first user ID; referencing the user information DB1 and specifying the information for contacting the second user on the basis of the second user ID; and transmitting to the second user terminal 40 the attribute information modification and authentication request information for requesting the authentication of the modified attribute information on the basis of the contact address information.

The authentication of the attribute modification request may be performed with limitation to a request for modifying, e.g., the real name and/or face photograph rather than all of the attribute information.

The attribute information authentication processing section 12 has a function for maintaining the authenticated information, which is registered in the user information DB1 in association with the attribute information registered by the first user, when the re-authentication information indicating that the attribute information modified by the first user has been authenticated has been received from the second user terminal 40 in accordance with the transmitting of the attribute information modification and authentication request information in the attribute information authentication request processing section 11; and conversely deleting the authenticated information registered in the user information DB1 in association with the attribute information registered by the first user when the attribute authentication refusal information indicating that the attribute information modified by the first user is not authenticated to be without error, or when the re-authorization information indicating that the attribute information modified by the first user has been authenticated within a predetermined period of time.

In this case, the attribute information authentication processing section 12 may be composed of an attribute re-authentication information receiving section 12c and an authenticated information maintaining/deleting section 12d.

First, it is presumed that the server 10 has completed processing for receiving the authentication information for attesting that the attribute information registered by the first user is without error; registering the authenticated information in the user information DB1 in association with the attribute information registered by the first user; and mutually associating and storing in the authentication relationship information DB2 the ID of the first user, who is the authenticatee whose attribute information has been authenticated, and the ID of the second user, who is the authenticator that authenticated the attribute information, as shown in FIG. 23.

Next, the first user actuates the first user terminal 30, connects to the server 10 via the communication network NW, accesses the SNS service website constructed in the server 10, and downloads the home page.

The first user visits the SNS service website and inputs the user ID provided in advance and the password set in advance to log in. During login, the first user ID is temporarily stored.

The SNS service website can be expressed in a form such as that shown in, e.g., FIG. 11.

Therefore, the first user inputs the user ID in the user ID input field 101, inputs the password in the password input field 102, and thereafter selects the "Send" button 109 to login.

When the "Send" button 109 has been selected on the SNS website login screen 100, the member is acknowledged to be registered as a result of authentication and is logged in, whereby a first user attribute information display screen (the so-called "My Page" of the first user) such as that shown in FIG. 17 is then displayed on the display of the first user terminal 30.

At this point, the first user selects the attribute information modification button 165.

The first user terminal 30 thereby transmits the attribute modification request for requesting modification to the registration of the attribute information (see (200)).

The server 10 receives the attribute modification request transmitted from the first user terminal 30 (see (210)).

When the attribute modification request is received, the server 10 then transmits the attribute information list to the first user terminal 30 (see (220)).

The first user terminal 30 receives the attribute information list transmitted from the server 10 and inputs the modifications to the attribute information (see (230)).

The first user terminal 30 then transmits the modified attribute information to the server 10 (see (240)).

The server 10 receives the modified attribute information transmitted from the first user terminal 30 (see (250)). Specifically, the server 10 receives the first user ID and the modified attribute information.

Next, when the modified attribute information has been received, the server 10 references the authentication relationship information DB2, and specifies the ID of the second user, who is the authenticator of the attribute information of the first user, the second user ID being associated and stored on the basis of the first user ID (see (260)).

The server 10 then references the user information DB1 and specifies the information for contacting the second user on the basis of the specified second user ID (see (270)).

The server 10 furthermore generates attribute information modification and authentication request information for requesting the authentication of the modified attribute information on the basis of the received modified attribute information (see (280)).

The server 10 transmits the generated attribute information modification and authentication request information to the second user terminal 40 on the basis of the information for contacting the specified second user (see (290)).

The second user terminal 40 receives the attribute information modification and authentication request information transmitted from the server 10 (see (300)).

In this case, the attribute information modification and authentication request screen displayed on the display of the second user terminal 40 can be expressed in a form such as that shown in, e.g., FIG. 16. Therefore, the second user selects (clicks) the "Confirmation" button 158 when the modified attribute information of the first user is to be authenticated, and selects (clicks) the "Hold" button 159 when the attribute information is not to be authenticated.

The second user selects (clicks) the "Confirmation" button 158, whereby the second user terminal 40 transmits to the server 10 the authentication information indicating that the modified attribute information of the first user has been authenticated (see (310A)).

On the other hand, when the second user selects (clicks) the "Hold" button 159, the second user terminal 40 transmits to the server 10 the authentication refusal information indicating that the modified attribute information of the first user is not authenticated (see (310B)).

Next, the server 10 receives the authentication information from the second user terminal 40 indicating that the modified attribute information of the first user has been authenticated (see (320A)).

Alternatively, the server 10 receives the authentication refusal information from the second user terminal 40 indicating that the attribute information modified by the first user has not been authenticated (see (320B)).

When the authentication information has been received, the server 10 maintains the authenticated information registered in the user information DB1 in association with the attribute information registered by the first user (see (330A)).

On the other hand, when the authentication refusal information has been received, the server 10 deletes the authenticated information registered in the user information DB1 in association with the attribute information registered by the first user (see (330B)).

In the present embodiment, when re-authentication information for attesting that there is no error in the attribute information modified by the first user has been not received from the second user terminal 40 within a predetermined period of time, the authenticated information registered in the user information DB1 in association with the attribute information registered by the first user may be deleted.

Next, a detailed example of the operation of the server 10 in the attribute information modification and authentication request processing such as that described above will be described with reference to FIG. 24. FIG. 24 is a flowchart showing the flow of attribute information modification and authentication request processing in the server 10.

First, the attribute modification request receiving section 17 determines whether the first user ID and an attribute modification request for requesting modification of the registration of attribute information stored in the user information DB1 have been received from the first user terminal 30 (S61).

As a result, when the attribute modification request receiving section 17 has received the attribute modification request (Y), the attribute information authentication request processing section 11 then receives the attribute modification request via the predetermined request receiving section 11a and transmits (returns) an attribute information list to the first user terminal 30 (S62).

On the other hand, when the attribute modification request receiving section 17 has not received an attribute modification request (N), the attribute modification request receiving section 17 repeats the determination of whether an attribute modification request has been received from the first user terminal 30 (S61).

The attribute information authentication request processing section 11 then determines whether the modified attribute information based on the attribute modification request has been received in the predetermined request receiving section 11a (S63).

As a result, when the attribute modification request receiving section 17 has received the modified attribute information (Y), the attribute information authentication request processing section 11 then references the authentication relationship information DB2 by way of the second user contact address specifying section 11*b* and specifies the ID of the second user, who is the authenticator of the attribute information of the first user, the second user ID being associated and stored on the basis of the first user ID (S64).

The attribute information authentication request processing section 11 then references the user information DB1 and specifies the information for contacting the second user via the second user contact address specifying section 11*b* on the basis of the second user ID (S65).

The attribute information authentication request processing section 11 furthermore generates, via the predetermined request receiving section 11*a*, an attribute information modification and authentication request for requesting the attribute information modified by the first user as well as authentication that there is no error in the attribute information (S66).

The attribute information authentication request processing section 11 transmits the generated attribute information modification and authentication request to the second user terminal 40 used by the second user via an attribute information modification and authentication request transmitting section 11*f* on the basis of the specified contact address information (S67).

On the other hand, when the attribute information authentication request processing section 11 has not received the modified attribute information (N), the attribute information authentication processing section 12, in accordance with the transmission of the attribute information modification and authentication request in the attribute information authentication request processing section 11, subsequently determines via the attribute re-authentication information receiving section 12*c* whether re-authentication information, which indicates that the attribute information modified by the first user has been authenticated, or whether the attribute authentication refusal information, which is not authenticated because there is an error in the attribute information modified by the first user, has been received (S68).

As a result, when the attribute information authentication processing section 12 has received the re-authentication information (Y), the attribute information authentication processing section 12, via the authenticated information maintaining/deleting section 12*d*, subsequently maintains the authenticated information registered in the user information DB1 in association with the attribute information registered by the first user (S69).

The series of operations in the server 10 is thereby completed (END).

On the other hand, when the attribute information authentication processing section 12 has not received the attribute authentication refusal information (N), the attribute information authentication processing section 12 deletes, via the authenticated information maintaining/deleting section 12*d*, the authenticated information registered in the user information DB1 in association with the attribute information registered by the first user (S70).

The series of operations in the server 10 is thereby completed (END).

In the present embodiment as described above, it is possible to maintain a situation in which friendly associations are expanded in a safe and secure manner by correctly registering and authenticating attribute information only initially in order to participate in the network service website, and it is thereafter possible to prevent improper modification of attribute information.

<Fourth Embodiment>

Next, a fourth embodiment will be described with reference to FIG. 25 for the case in which the reliability of authentication by the second user is improved by provided the second user with predetermined conditions for authenticating the attribute information of the first user.

FIG. 25 is a sequence diagram showing the flow of the authenticator judging process in the attribute information authentication method according to the present invention.

In the present embodiment, when the attribute information authentication request processing section 11 has received a predetermined request (i.e., a registration request received via the attribute registration request receiving section 15, or an authentication request received via the attribute authentication request receiving section 16) from the first user terminal 30, [the attribute information authentication request processing section 11] has a function for referencing the user information DB1, and determining the existence of the authenticated information registered in association with the attribute information of the second user on the basis of second user ID; transmitting the attribute information authentication request to the second user terminal 40 when the authenticated information has been registered; and otherwise transmitting to the first user terminal 30 an attribute authentication failure notification for providing notification that the second user does not have authorization to authenticate attribute information when the authenticated information has not been registered.

In this case, the attribute information authentication request processing section 11 may be composed of, e.g., a predetermined request receiving section 11*a*, an authenticated information existence determination section 11*c*, an attribute information authentication request transmitting section 11*d*, and an attribute authentication failure notification transmitting section 11*e*.

First, the server 10 mutually associates and stores in the user information database DB1 the user ID, the attribute information composed of at least one or more items registered in advance by the user, and the information for contacting the user terminal, as shown in FIG. 25 (see (A)).

It is presumed that the server 10 has completed processing in which the authenticated information for attesting that the attribute information registered by the second user is without error has been registered in the user information DB1 in association with the attribute information registered by the second user.

Next, the first user actuates the first user terminal 30, connects to the server 10 via the communication network NW, and receives the predetermined request (see (10)).

The server 10 receives the predetermined request (a registration request or an authentication request) transmitted from the first user terminal 30 (see (20)). Processing to this point is the same flow as the embodiments described above.

The server 10 references the user information DB1 and determines the existence of registration of authenticated information registered in accordance with the attribute information of the second user on the basis of the second user ID (see (27)).

When the authenticated information that authenticates the attribute information of the second user is registered in the user information DB1, the server 10 then generates attribute information authentication request information for requesting the attribute information registered by the first user and authentication of the attribute information (see (30A)).

On the other hand, the server 10 generates an attribute authentication failure notification for providing notification that the second user does not have authorization to authenticate attribute information when the authenticated information for authenticating the attribute information of the second user has not been registered in the user information DB1 (see (30B)).

The server 10 transmits the generated attribute information authentication request information to the second user terminal 40 (see 40A)) or transmits the generated attribute authentication failure notification to the first user terminal 30 (see (40B)).

Processing thereafter is also the same flow as the embodiments described above.

Next, a detailed example of the operation of the server 10 in the authenticator judging process such as that described above will be described with reference to FIG. 26. FIG. 26 is a flowchart showing an example of the attribute information authenticator judging process in the server 10.

First, the attribute information authentication request processing section 11 determines, via the predetermined request receiving section 11a, whether the predetermined request has been received from the first user terminal 30 (S81).

As a result, when the attribute information authentication request processing section 11 has received the predetermined request (Y), the attribute information authentication request processing section 11 then references the user information DB1 and determines, via the authenticated information existence determination section 11c, whether the authenticated information is registered in association with the attribute information of the second user on the basis of the second user ID (S82).

On the other hand, when the attribute information authentication request processing section 11 has not received the predetermined request (N), the attribute information authentication request processing section 11 repeats the determination of whether the predetermined request has been received (S81).

When the attribute information authentication request processing section 11 has determined that the authenticated information has been registered in association with the attribute information of the second user (Y), the attribute information authentication request processing section 11 then generates, via the predetermined request receiving section 11a, attribute information authentication request information for requesting the attribute information registered or modified by the first user, as well as authentication of the attribute information (S83).

The attribute information authentication request processing section 11 transmits the generated attribute information authentication request information to the second user terminal 40 via the attribute information authentication request transmitting section 11d (S84).

The series of operations in the server 10 is thereby completed (END).

On the other hand, when the attribute information authentication request processing section 11 cannot determine that the authenticated information is registered in association with the attribute information of the second user (N), the attribute information authentication request processing section 11 generates, via the predetermined request receiving section 11a, an attribute authentication failure notification for providing notification that the second user does not have authorization to authenticate attribute information (S85).

The attribute information authentication request processing section 11 transmits the generated attribute authentication failure notification to the first user terminal 30 via the attribute authentication failure notification transmitting section 11e (S86).

The series of operations in the server 10 is thereby completed (END).

In the present embodiment as described above, the reliability of authentication by the second user can be increased because a user whose own attribute information has been authenticated authenticates the attribute information. Therefore, users whose own attribute information is not authenticated cannot invite persons who are not participating on the network service website and cannot authenticate the attribute information of other users. Therefore, the reliability of users who participate in the network service can be guaranteed.

<Fifth Embodiment>

Next, a fifth embodiment will be described with reference to FIG. 27 for the case in which a second user who authenticated the attribute information of the first user has cancelled registration for using the network service. In such a case, the authentication of the attribute information of all first users authenticated by the second user is deleted (erased), whereby the safety of other users participating in the network service is guaranteed by ensuring that authenticated information that enhances the reliability of the attribute information of the first user is not allowed to remain in the case of false modification to the attribute information of the first user, and a second user for confirming the veracity of the attribute information and authenticating a modification does not exist.

FIG. 27 is a sequence diagram showing the flow of registration cancellation processing in the attribute information authentication method according to the present invention.

In the present embodiment, the server 10 furthermore has a registration cancellation processing section 18.

The registration cancellation processing section 18 receives from the second user terminal 40 the second user ID and the registration cancellation requested by the second user for requesting the registration cancellation of the attribute information stored in the user information DB1; and deletes the registration of the attribute information stored in the user information DB1 on the basis of the second user ID.

In this case, the registration cancellation processing section 18 may be composed of a registration cancellation request receiving section 18a and an attribute information registration deleting section 18b.

In this case, the attribute information authentication processing section 12 has a function for referencing the authentication relationship information DB2 in accordance with the deletion of the attribute information in the registration cancellation processing section 18, specifying the first user ID stored in association with the second user ID, furthermore referencing the user information DB1, and deleting the authenticated information registered in association with the attribute information registered by the first user on the basis of the first user ID.

In this case, the attribute information authentication processing section 12 may be composed of an authenticated information maintaining/deleting section 12d and a first user specifying section 12e.

First, it is presumed that the server 10 has completed processing in which the first user ID of the first user, who sought and obtained the authentication of his/her own attribute information from the second user, and the second user ID of the second user, who authenticated that there is no error in the attribute information registered by the first user, are mutually associated and stored in the authentication relationship information DB2, as shown in FIG. 27.

Next, the second user actuates the second user terminal 40, connects to the server 10 via the communication network NW, accesses the SNS service website constructed on the server 10, and downloads the home page.

The second user accesses the SNS service website, inputs the user ID provided in advance and a password set in advance, and then logs in. During login, the second user ID is stored temporarily.

The SNS service website can be expressed in a form such as that shown in, e.g., FIG. 11.

Therefore, the second user inputs the user ID in the user ID input field 101, inputs the password in the password input field 102, and thereafter selects the "Send" button 109 to login.

When the "Send" button 109 has been selected on the SNS website login screen 100, the member is acknowledged to be registered as a result of authentication and is logged in, whereby a menu selection screen such as that shown in FIG. 12 is then displayed on the display of the second user terminal 40.

In this case, the second user selects the "SNS registration cancellation" button 113.

The second user terminal 40 thereby transmits to the server 10 the second user ID and the registration cancellation request requested by second user in order to cancel the registration the attribute information stored in the user information DB1 (see (400)).

The server 10 receives the registration cancellation request transmitted from the second user terminal 40 (see (410)).

Next, the server 10 specifies the second user ID contained in the registration cancellation request (see (420)).

The server 10 then deletes the attribute information of the second user stored in the user information DB1 on the basis of the specified second user ID, and cancels the registration (see (430)).

The server 10 furthermore references the authentication relationship information DB2 and specifies the first user ID stored in association with the second user ID (see (440)).

The server 10 references the user information DB1 on the basis of the specified first user ID and deletes the authenticated information registered in association with the attribute information registered by the first user (see (450)).

Next, a detailed example of the operation of the server 10 in the registration cancellation processing such as that described above will be described with reference to FIG. 28. FIG. 28 is a flowchart showing an example of registration cancellation processing in the server 10.

First, the registration cancellation processing section 18 determines, via the registration cancellation request receiving section 18*a*, whether the second user ID and the registration cancellation request used by the second user for requesting the registration cancellation of the attribute information stored in the user information DB1, have been received from the second user terminal 40 (S91).

As a result, when the registration cancellation processing section 18 has received the registration cancellation request (Y), the registration cancellation processing section 18 then specifies via the attribute information registration deleting section 18*b* the second user ID contained in the registration cancellation request (S92).

On the other hand, when the registration cancellation processing section 18 has not received a registration cancellation request (N), the registration cancellation processing section 18 repeats determination of whether the registration cancellation request has been received from the second user terminal 40 (S91).

The registration cancellation processing section 18 then deletes, via the attribute information registration deleting section 18*b*, the registration of the attribute information of the second user stored in the user information DB1 on the basis of specified second user ID (S93).

The attribute information authentication processing section 12 references the authentication relationship information DB2 via the first user specifying section 12*e* in accordance with the deletion of the attribute information in the registration cancellation processing section 18, and specifies the first user ID stored in association with the second user ID, i.e., the first user whose attribute information was authenticated by the second user (S94).

The attribute information authentication processing section 12 references the user information DB1 on the basis of the specified first user ID and, via the authenticated information maintaining/deleting section 12*d*, deletes the authenticated information registered in association with the attribute information registered by the first user (S95).

The series of operations in the server 10 is thereby completed (END).

In the present embodiment as described above, the authentication of the attribute information of all the first users authenticated by the second user is deleted when the second user who confirmed the veracity of the attribute information cancels [his/her own] registration. Therefore, the safety of other users participating in the network service is guaranteed in the case that false modification has been made to the attribute information of the first user because authenticated information that enhances the reliability of the attribute information of the first user is not registered after the second user is no longer present.

<Sixth Embodiment>

Next, a sixth embodiment will be described with reference to FIG. 29 for the case in which the second user, who authenticated the attribute information of the first user, cancels the friendship with the first user. In such a case, the authentication of the attribute information of all first users authenticated by the second user is deleted (erased), whereby the safety of other users participating in the network service is guaranteed by ensuring that authenticated information that enhances the reliability of the attribute information of the first user is not allowed to remain, even when false modification has been made to the attribute information of the first user, and a second user for confirming the veracity of the attribute information and authenticating a modification does not exist.

FIG. 29 is a sequence diagram showing the flow of friendship registration cancellation processing in the attribute information authentication method according to the present invention.

In the present embodiment, the server 10 furthermore has a friendship information database (DB) 3 and a registration cancellation processing section 19.

The friendship information database DB3 is a device for showing that there is friendship between users and is used for mutually associating and storing identification information. As used herein, the term "friendship" refers to transmitting a message indicating the desire to register a friendship from a user terminal of one of the users to the user terminal of another user, and receiving from the user terminal of the other user a message indicating agreement with the message transmitted by the user terminal of the transmitting user.

FIG. 6 is a diagram showing an example of the database structure stored in the friendship information DB3.

For example, in the friendship information database shown in FIG. 6, the database has a structure in which the first user ID and the second user ID constitute a single record.

The registration cancellation processing section 19 receives from the second user terminal 40 a friendship registration cancellation request that contains the second user ID, as well as the first user ID of which the second user is requesting registration cancellation of the friendship stored in the friendship information DB3; and cancels the registration of the friendship stored in the friendship information DB3 on the basis of the second user ID.

In this case, the registration cancellation processing section 19 may be composed of a friendship registration cancellation request receiving section 19*a* and a friendship registration cancellation section 19*b*.

In this case, the attribute information authentication processing section 12 also has a function for referencing the friendship information DB3 and specifying the first user ID stored in association with the second user ID in accordance with the cancellation of the friendship in the registration cancellation processing section 19; and furthermore referencing the user information DB1 and cancelling the authenticated information registered in association with the attribute information registered by the first user on the basis of the first user ID.

In this case, the attribute information authentication processing section 12 may be composed of an authenticated information maintaining/deleting section 12*d* and a first user specifying section 12*e*.

First, the server 10 mutually associates and stores in the friendship information DB3 identification information (ID) indicating friendship between users, as shown in FIG. 30 (see (B)).

Next, the second user actuates the second user terminal 40, connects to the server 10 via the communication network NW, accesses the SNS service website constructed on the server 10, and downloads the home page.

The second user accesses the SNS service website, inputs the user ID provided in advance and a password set in advance, and then logs in. During login, the second user ID is stored temporarily.

The SNS service website can be expressed in a form such as that shown in, e.g., FIG. 11.

Therefore, the second user inputs the user ID in the user ID input field 101, inputs the password in the password input field 102, and thereafter selects the "Send" button 109 to login.

When the "Send" button 109 has been selected on the SNS website login screen 100, the member is acknowledged to be registered as a result of authentication and is logged in, whereby a first user attribute information display screen (a so-called "My Page" of the first user) such as that shown in FIG. 17 is then displayed on the display of the first user terminal 30.

In this case, the first user selects the "View entire list" button 168.

The second user terminal 40 thereby transmits to the server 10 the second user ID and the friendship registration cancellation request requested by second user in order to cancel the registration the attribute information stored in the friendship information DB3 (see (500)).

The server 10 receives the friendship registration cancellation request transmitted from the second user terminal 40 (see (510)).

Next, the server 10 displays all friends registered in friendship with the second user, and transmits to the second user terminal 40 the friendship registration list for accepting the registration cancellation instructions (see (520)).

The second user terminal 40 receives the friendship registration list transmitted from the server 10 (see (530)).

In this case, the friendship registration list screen displayed on the display of the second user terminal 40 can be expressed in a form such as that shown in, e.g., FIG. 30. FIG. 30 is diagram showing an example of a friendship registration list screen displayed on the display of the second user terminal 40 connected to the server 10. The friendship registration list screen 180 is provided with a face photograph display field 191 for displaying the face photographs of friends registered in friendship with the second user, a button 192 for viewing a profile for confirming the attribute information of friends, and a button 193 for cancelling the friendship for which the second user desires to cancel friendship registration.

Displayed on the friendship registration list screen 180 in FIG. 30 are face photograph display field 181A for displaying the face photograph of a first friend registered in a friendship with the second user, a button 182A for viewing the profile for confirming the attribute information of the first friend, and a button 183A for cancelling the friendship for which the second user desires to cancel friendship registration. Also displayed are face photograph display field 181B for displaying the face photograph of a second friend registered in a friendship with the second user, a button 182B for viewing the profile for confirming the attribute information of the second friend, and a button 183B for cancelling the friendship for which the second user desires to cancel friendship registration. Also displayed are face photograph display field 181C for displaying the face photograph of a third friend registered in a friendship with the second user, a button 182C for viewing the profile for confirming the attribute information of the third friend, and a button 183C for cancelling the friendship for which the second user desires to cancel friendship registration. Also displayed are face photograph display field 181D for displaying the face photograph of a fourth friend registered in a friendship with the second user, a button 182D for viewing the profile for confirming the attribute information of the fourth friend, and a button 183D for cancelling the friendship for which the second user desires to cancel friendship registration. Also displayed are face photograph display field 181E for displaying the face photograph of a fifth friend registered in a friendship with the second user, a button 182E for viewing the profile for confirming the attribute information of the fifth friend, and a button 183E for cancelling the friendship for which the second user desires to cancel friendship registration.

The second user terminal 40 accepts the selection of the button 193 for cancelling the friendship for which the second user desires to cancel friendship registration, and transmits the request cancellation user information to the server 10 (see (540)).

The server 10 receives the registration cancellation user information transmitted from the second user terminal 40 (see (550)).

Next, the server 10 specifies the user ID of the registration-cancelled user as the subject of registration cancellation (see (560)).

The server 10 references the user information DB1 on the basis of specified user ID and deletes the authenticated information registered in association with the attribute information registered by the first user (see (570)).

Next, a detailed example of the operation of the server 10 in the friendship registration cancellation processing such as that described above will be described with reference to FIG. 31. FIG. 31 is a flowchart showing an example of friendship registration cancellation processing in the server 10.

First, the registration cancellation processing section 19 determines whether the second user ID as well as a friendship registration cancellation request made by the second user for requesting cancellation of the friendship registration stored in the friendship information DB3 have been received from the second user terminal 40 via the friendship registration cancellation request receiving section 19a (S101).

As a result, when the registration cancellation processing section 19 has received the friendship registration cancellation request (Y), the registration cancellation processing section 19, via the friendship registration cancellation request receiving section 19a, subsequently references the friendship information DB3, specifies the user in friendship with the second user on the basis of the second user ID thus received, and transmits (returns) a friendship registration list to the second user terminal 40 (S102).

On the other hand, when the registration cancellation processing section 19 has not received a friendship registration cancellation request (N), the registration cancellation processing section 19 repeats the determination of whether the friendship registration cancellation request has been received from the second user terminal 40 (S101).

The registration cancellation processing section 19 subsequently determines whether registration cancellation user information (e.g., the user ID) has been received from the second user terminal 40 via the friendship registration cancellation request receiving section 19a (see S103).

As a result, when the registration cancellation processing section 19 has received the registration cancellation user information (Y), the registration cancellation processing section 19, via the friendship registration cancellation section 19b, subsequently cancels the registration of the friendship stored in the friendship information DB3 on the basis of the second user ID and the registration cancellation user information.

The attribute information authentication processing section 12 references the authentication relationship information DB2 via the first user specifying section 12e on the basis of the registration cancellation user information thus received and, in accordance with the cancellation of the friendship in the registration cancellation processing section 19, determines if there is an authentication relationship with user whose registration is to be cancelled, i.e., determines whether the user is in a friendship in which second user has authenticated that the attribute information is without error (S104).

On the other hand, when the registration cancellation processing section 19 has not received the registration cancellation user information, the series of operations in the server 10 is directly completed (END).

As a result, when the attribute information authentication processing section 12 has determined that the user whose registration is to be cancelled is the user in an authentication relationship (Y), [the attribute information authentication processing section 12] subsequently references the friendship information DB3 via the first user specifying section 12e, specifies the first user ID stored in association with the second user ID, furthermore references the user information DB1 on the basis of the specified first user ID, and deletes, via the authenticated information maintaining/deleting section 12d, the authenticated information registered in association with the attribute information registered by the first user (S105).

The series of operations in the server 10 is thereby completed (END).

On the other hand, when the attribute information authentication processing section 12 has determined that the user whose registration is to be cancelled is not a user in an authentication relationship (N), the series of operations in the server 10 is directly completed (END).

In the present embodiment as described above, the authentication of the attribute information of the first user authenticated by the second user is deleted in the case that the friendship with the second user who confirmed the veracity of the attribute information has been cancelled, whereby the safety of other users participating in the network service is guaranteed because authenticated information that enhances the reliability of the attribute information of the first user is not registered, even when false modification has been made thereafter to the attribute information of the first user. ps <Seventh Embodiment>

Next, a seventh embodiment will be described with reference to FIG. 32 for the case in which the first user has made a request for authentication of attribute information and a decision whether to approve authentication is made by referencing the authentication history, which contains a record of the authentication conditions by other past users.

FIG. 32 is a sequence diagram showing the flow of authentication history view processing in the attribute information authentication method according to the present invention.

In the present embodiment, the server 10 furthermore has an authentication history information database (DB) 4 and a history information view section 20.

The authentication history information database DB4 is a device for mutually associating and storing user IDs, details about attribute information authentication requests or attribute information modification and authentication requests, dates of such requests, and the results of such requests (existence of authentication).

FIG. 7 is a diagram showing an example of the information stored in the authentication history information DB4.

For example, in the authentication history information database shown in FIG. 7, the database has a structure in which the user ID, date, request details, and results constitute a single record.

When a history information view request has been received from the second user terminal 40 requesting viewing of the past attribute information authentication and modification history of the first user in conjunction with transmission of the attribute information authentication request to the second user terminal 40, the history information view processing section 20 references the authentication history information DB4; extracts the history information composed of the details of the attribute information authentication request or the attribute information modification and authentication request on the basis of the first user ID, the date of the request, and the results of the request; and transmits the history information to the second user terminal 40.

In this case, the history information view processing section 20 may be composed of a history information view request receiving section 20a, a history information extracting section 20b, and a history information transmitting section 20c.

First, the server 10 mutually associates and stores in the authentication history information DB4 the user ID, the details of the attribute information authentication request or the attribute information modification and authentication request, the transmission date of the request, and the results of the request (authenticated or not; or modified or not), as shown in FIG. 32 (see (C)).

The same processing as that in the embodiments described above is carried out up to the server 10 transmitting the attribute information authentication request to the second user terminal 40 (see (600)) and the second user terminal 40 receiving the attribute information authentication request transmitted from the server 10 (see (610)).

Next, the second user terminal 40 displays the attribute information authentication request screen 150 displayed in, e.g., FIG. 16, on the display, showing the attribute information authentication request that has been received.

At this point, the second user selects the button 153 for viewing a detailed profile.

The second user terminal 40 thereby transmits the history information view request for requesting viewing of the past attribute information authentication and modification history of the first user (see (620)).

The server 10 receives the history information view request transmitted from the second user terminal 40 (see (630)).

Next, the server 10 specifies the first user ID contained in the history information view request (see (640)).

The server 10 then references the authentication history information DB4 and extracts the history information composed of the details of the attribute information authentication request or the attribute information modification and authentication request on the basis of the first user ID, the date of the request, and the results of the request (see (650)).

The server 10 transmits the extracted history information to the second user terminal 40 (see (660)).

The second user terminal 40 receives the history information transmitted from the server 10 and the second user views the history information (see (670)).

In this case, the history information screen displayed on the display of the second user terminal 40 can be expressed in a form such as that shown in, e.g., FIG. 33. FIG. 33 is a diagram showing an example of a history information screen displayed on the display of the second user terminal 40 connected to the server 10. The history information screen 190 is provided with an authentication history information display section 191 for associating and displaying the date of the attribute information authentication request or the attribute information modification and authentication request, the details of the request, and the results of the request. Also, the history information screen 190 is provided with a "Close" button 199 for directing that the screen be closed.

In FIG. 33, the authentication history information display section 191 is displaying an attribute authentication request dated Jan. 15, 2007 and information that authentication was approved (authentication OK); an attribute authentication request dated Jan. 31, 2007 and information that authentication was approved (authentication OK); an attribute modification and authentication request dated Apr. 1, 2007 and information that the authentication was refused (authentication NG); and an attribute modification and authentication request dated Apr. 1, 2007 and information that the authentication was approved (authentication OK).

The second user determines whether the attribute information of the first user is authenticated on the basis of the history information, selects the "Close" button 199 provided to the history information screen 200 to thereby return to the attribute information authentication request screen 150 shown in FIG. 16, and then selects the "Confirmation" button 158 or the "Hold" button 159.

Next, a detailed example of the operation of the server 10 in the authentication history view processing such as that described above will be described with reference to FIG. 34. FIG. 34 is a flowchart showing an example of authentication history view processing in the server 10.

First, the history information view section 20 determines whether a history information view request for requesting viewing of the past attribute information authentication and modification history of the first user has been received from the second user terminal 40 via the history information view request receiving section 20a in accordance with the transmission of the attribute information authentication request to the second user terminal 40 (S111).

As a result, when the history information view processing section 20 has received a history information view request (Y), the history information view processing section 20 then specifies the ID of the first user, who is the authenticatee user requesting authentication of attribute information, by way of the history information extracting section 20b (S112).

On the other hand, when the history information view processing section 20 has not received the history information view request (N), the history information view processing section 20 repeats the determination of whether the history information view request has been received (S111).

The history information view processing section 20 then references the authentication history information DB4 on the basis of specified first user ID and extracts, via the history information extracting section 20b, the history information composed of the details of the attribute information authentication request or the attribute information modification and authentication request, the date of the request, and the result of the request (S113).

The history information view processing section 20 transmits the extracted history information to the second user terminal 40 via the history information transmitting section 20c (S114).

The series of operations in the server 10 is thereby completed (END).

In the present embodiment as described above, it is possible to refer to the evaluation of other users not known to a user. Therefore, it is possible to prevent in advance the erroneous evaluation of users who have been denied authentication and that are likely not to observe proper conduct, and to guarantee the safety of other users participating in the network service.

<Eighth Embodiment>

Next, an eighth embodiment will be described with reference to FIGS. 35 and 37 for the case in which the first user, whose attribute information has been authenticated by the second user, has carried out an act forbidden by the network service. In such a case, the authentication of the attribute information of the first user authenticated by the second user is deleted (removed), whereby authenticated information that enhances the reliability of the attribute information of the first user is not allowed to remain, and the safety of the other users participating in the network service is guaranteed.

FIG. 35 is a sequence diagram showing the flow of first misconduct notification processing in the attribute information authentication method according to the present invention. FIG. 37 is a sequence diagram showing the flow of second misconduct notification processing in the attribute information authentication method according to the present invention.

In this case, the first notification of misconduct is the case in which the second user who has carried out authentication of attribute information provides notification of misconduct from the second user terminal 40; and the second notification of misconduct is the case in which neither the first user nor the second user, but rather a third user, provides notification of misconduct from the third user terminal 50.

In the present embodiment, the server 10 furthermore has a prohibited conditions information database (DB) 5, a misconduct notification receiving section 21, and a misconduct processing section 22.

The prohibited conditions information database DB5 is a device for storing prohibited conduct details in the use of the network service website.

FIG. 8 is diagram showing an example of the information stored in the prohibited conditions information DB5.

For example, in the prohibited conditions information database shown in FIG. 8, the database has a structure in which the prohibited conditions identification information (hereinafter referred to as "prohibited conditions ID") and the prohibition details constitute a single record.

The misconduct notification receiving section 21 receives the misconduct notification containing the user ID and the specified prohibition details stored in the prohibited conditions information DB5.

The misconduct processing section 22 references the user information DB1 and deletes the authenticated information registered in association with the attribute information of the user on the basis of the user ID in accordance with the reception of the notification in the misconduct notification receiving section 21.

The first misconduct notification will first be described.

First, the server 10 stores the prohibited conduct details in the use of the network service website in the prohibited conditions information DB5, as shown in FIG. 35 (see (D)).

Next, when the second user using the second user terminal 40 has become aware that the first user, whose attribute information the second user has authenticated, has committed misconduct prohibited in the use of the network service website, the second user actuates the second user terminal 40, connects to the server 10 via the communication network NW, accesses the SNS service website constructed on the server 10, and downloads the home page.

The second user visits the SNS service website, inputs the user ID conferred in advance and a password set in advance, and then logs in. During login, the second user ID is stored temporarily.

The network service website can be expressed in a form such as shown in, e.g., FIG. 11.

Therefore, the second user inputs the user ID in the user ID input field 101, inputs the password in the password input field 102, and thereafter selects the "Send" button 109 to login.

When the "Send" button 109 has been selected on the SNS website login screen 100, the member is acknowledged to be registered as a result of authentication and is logged in, whereby a menu selection screen such as that shown in FIG. 12 is then displayed on the display of the second user terminal 40.

At this point, the second user selects the "Misconduct notification" button 114.

The second user terminal 40 thereby transmits the misconduct notification request to the server 10 (see (700A)).

The server 10 receives the misconduct notification request transmitted from the second user terminal 40 (see (710A)).

Next, the server 10 transmits (returns) a misconduct notification receipt form to the second user terminal 40 (see (720A)).

The second user terminal 40 receives the misconduct notification receipt form transmitted from the server 10 (see (730A)).

In this case, the misconduct notification receipt form displayed on the display of the second user terminal 40 can be expressed in a form such as shown in, e.g., FIG. 36. FIG. 36 is a diagram showing an example of a misconduct notification screen displayed on the display of the second user terminal 40 connected to the server 10. The misconduct notification screen 200 is provided with a misconduct user ID input field 201 for accepting as input the user ID of the first user who has committed a misconduct, a prohibited conduct details display field 202 for displaying the misconduct prohibited on the network service, and check boxes 203A, 203B, 203C, ... provided in corresponding fashion to the prohibited conduct details displayed in the prohibited conduct details display field 202. The misconduct notification screen 200 is also provided with a "Send" button 209 for transmitting the misconduct notification information.

Therefore, the second user inputs the prohibited conduct details in the misconduct notification receipt form by selecting (clicking) and placing a check in the check boxes 203 provided in corresponding fashion to the prohibited conduct details that apply to the misconduct committed by the first user (see (740A)).

With the "Send" button 209 having been selected, the second user terminal 40 transmits to the server 10 the misconduct notification information containing the ID of the first user who has committed a misconduct, as well as the specified information of the prohibited conduct details (see (750A)).

The server 10 receives the misconduct notification information transmitted from the second user terminal 40 (see (760A)).

Next, the server 10 specifies the ID of the first user who is the misconduct user contained in the notification information (see (770A)).

The server 10 furthermore references the user information DB1 on the basis of the first user ID, and determines the existence of the registration of the authenticated information registered in association with attribute information of the first user (see (780A)).

The server 10 then deletes the authenticated information of the first user in the case that the authenticated information registered in association with the attribute information of the first user exists (see (790A)).

Next, the second misconduct notification will be described.

First, the server 10 stores the prohibited conduct details in the use of the network service website in the prohibited conditions information DB5, as shown in FIG. 37 (see (D)).

Next, when the third user using the third user terminal 50 has become aware that a specified user has committed misconduct prohibited in the use of the network service website, the third user actuates the third user terminal 50, connects to the server 10 via the communication network NW, accesses the SNS service website constructed on the server 10, and downloads the home page.

The third user visits the SNS service website, inputs the user ID conferred in advance and a password set in advance, and then logs in. During login, the third user ID is stored temporarily.

The SNS service website can be expressed in a form such as shown in, e.g., FIG. 11.

Therefore, the third user inputs the user ID in the user ID input field 101, inputs the password in the password input field 102, and thereafter selects the "Send" button 109 to login.

When the "Send" button 109 has been selected on the SNS website login screen 100, the member is acknowledged to be registered as a result of authentication and is logged in, whereby a menu selection screen such as that shown in FIG. 12 is then displayed on the display of the third user terminal 50.

At this point, the third user selects the "Misconduct notification" button 114.

The third user terminal 50 thereby transmits the misconduct notification request to the server 10 (see (700B)).

The server 10 receives the misconduct notification request transmitted from the third user terminal 50 (see (710B)).

Next, the server 10 transmits (returns) a misconduct notification receipt form to the third user terminal 50 (see (720B)).

The third user terminal 50 receives the misconduct notification receipt form transmitted from the server 10 (see (730B)).

In this case, the misconduct notification receipt form displayed on the display of the third user terminal 50 can be expressed in a form such as shown in, e.g., FIG. 36.

Therefore, the third user inputs the prohibited conduct details in the misconduct notification receipt form by selecting (clicking) and placing a check in the check boxes 203 provided in corresponding fashion to the prohibited conduct details that apply to the misconduct committed by the specified user (see (740B)).

With the "Send" button 209 having been selected, the third user terminal 50 transmits to the server 10 the misconduct notification information containing the ID of the user who has committed a misconduct, as well as the specified information of the prohibited conduct details (see (750B)).

The server 10 receives the misconduct notification information transmitted from the third user terminal 50 (see (760B)).

Next, the server 10 specifies the user ID of the user who committed the misconduct contained in the notification information (see (770B)).

Next, the server 10 references the user information DB1 on the basis of the specified user ID and determines the existence of the registration of the authenticated information registered in association with the attribute information of the specified user (see (780B)).

The server 10 then deletes the authenticated information of the specified user in the case that the authenticated information registered in association with the attribute information of the specified user exists (see (790B)).

The server 10 references the authentication relationship information database DB2 on the basis of the specified user ID and specifies the ID of the authenticating-user who authenticated the user who has committed a misconduct and who has been registered in association therewith (see (800B)).

The server 10 references the user information DB1 and deletes the authenticated information registered in association with the attribute information of the specified authenticating-user ID (see (810B)).

Next, a detailed example of the operation of the server 10 in the misconduct notification processing such as that described above will be described with reference to FIG. 38. FIG. 38 is a flowchart showing an example of misconduct notification processing in the attribute information authentication apparatus of the present invention.

First, the misconduct notification receiving section 21 determines whether a misconduct notification has been received (S121).

As a result, when the misconduct notification receiving section 21 has received the misconduct notification (Y), the misconduct processing section 22 then specifies the user ID of the user who has committed a misconduct contained in the notification information (S122).

On the other hand, when the misconduct notification receiving section 21 has not received the misconduct notification (N), the misconduct notification receiving section 21 repeats determination of whether the misconduct notification has been received (S121).

Next, the misconduct processing section 22 references the user information DB1 on the basis of the specified user ID, and determines the existence of registration of authenticated information registered in association with the attribute information of the specified user (S123).

As a result, when the misconduct processing section 22 has determined (Y) that the authenticated information is registered in association with the attribute information of the specified user, the misconduct processing section 22 then deletes the authenticated information (S124).

The misconduct processing section 22 furthermore references the authentication information database DB2 on the basis of the specified user ID and specifies the ID of the authenticating-user who authenticated the user who has committed a misconduct and who has been registered in association therewith (see (S125)).

On the other hand, when the misconduct processing section 22 cannot determine (N) that the authenticated information is registered in association with the attribute information of the specified user ID, the misconduct processing section 22 references the authentication relationship information database DB2 on the basis of the specified user ID and specifies the ID of the authenticating-user who authenticated the user who has committed a misconduct and who has been registered in association therewith (S125).

The misconduct processing section 22 then references the user information DB1 and deletes the authenticated information registered in association with the attribute information of the specified authenticating-user ID (S126).

The series of operations in the server 10 is thereby completed (END).

In the present embodiment as described above, when it has been found that a misconduct prohibited on the network service has been committed, a misconduct notification is received from the second user who authenticated the attribute information of the first user, or even from a third user rather than the first or second users, whereby the safety of other users participating in the network service can be guaranteed by deleting the authenticated information for authenticating the attribute information of the first user who committed the misconduct.

In the present embodiment, in the case that there has been a notification of misconduct from a user other than the authenticating-user who authenticated the user who committed the misconduct, the misconduct processing section 22 furthermore references the friendship information DB3 and specifies the second user ID stored in association with the first user ID of the first user whose registration of authenticated information has been deleted. The misconduct processing section 22 may reference the user information DB1 and delete the authenticated information registered in association with the attribute information of the second user on the basis of second user ID.

The second user who authenticated the attribute information of the first user who committed the misconduct is thereby made to take complicit responsibility, thereby making it possible to reduce insincere authentication of attribute information of users, and the safety of other users participating in the network service can be improved.

BRIEF DESCRIPTION OF THE DRAWINGS

FIG. 1 is a diagram showing an overview of the attribute information authentication system in which the attribute information authentication apparatus according to the present invention is used;

FIG. 4 is an example of the database structure stored in the user information storage section provided to the attribute information authentication apparatus according to the present invention;

FIG. 5 is an example of the database structure stored in the authentication relationship information storage section provided to the attribute information authentication apparatus according to the present invention;

FIG. 6 is an example of the database structure stored in the friendship information storage section provided to the attribute information authentication apparatus according to the present invention;

FIG. 7 is an example of the database structure stored in the authentication history information storage section provided to the attribute information authentication apparatus according to the present invention;

FIG. 8 is an example of the database structure stored in the prohibited conditions information storage section provided to the attribute information authentication apparatus according to the present invention;

FIG. 9 is a sequence diagram showing the basic processing flow of the attribute information authentication method according to the present invention;

KEY

Figure 2:
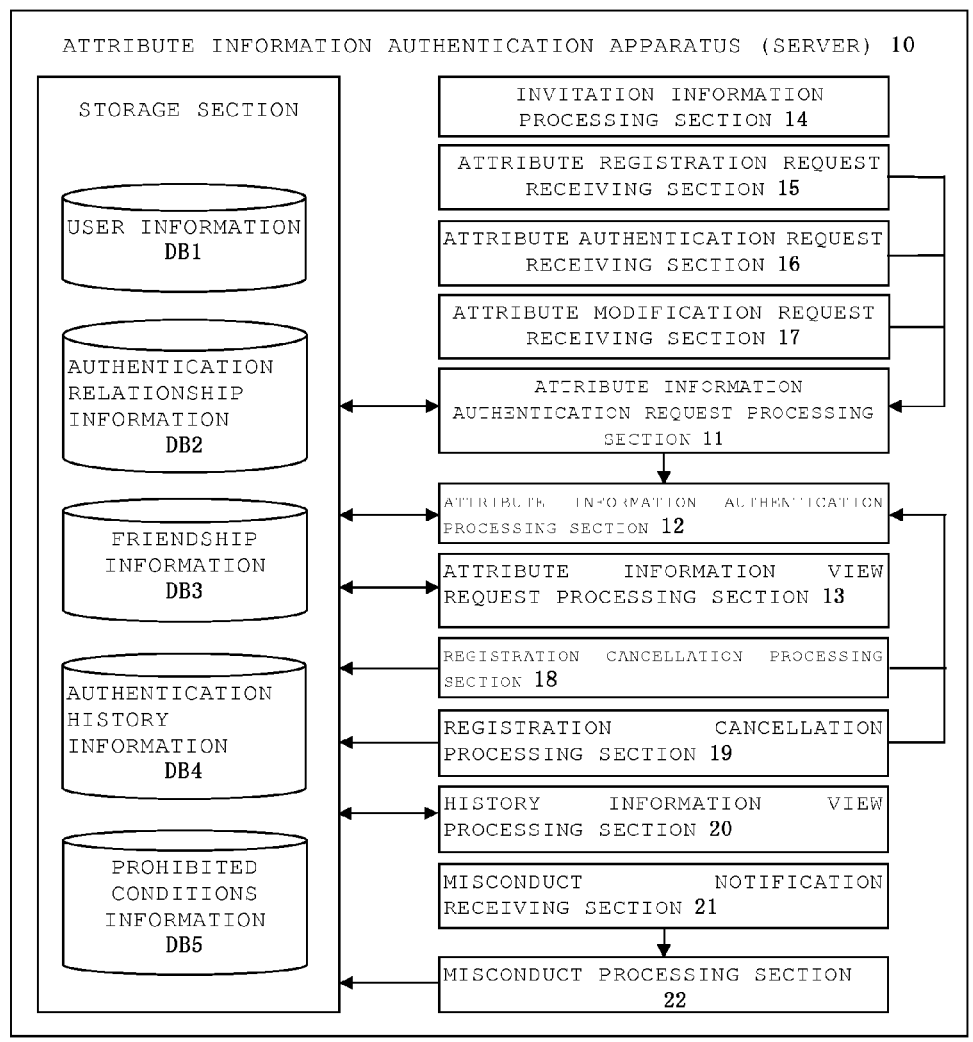
FIG. 2 is a block diagram showing an example of an embodiment of the attribute information authentication apparatus according to the present invention.
Figure 3:
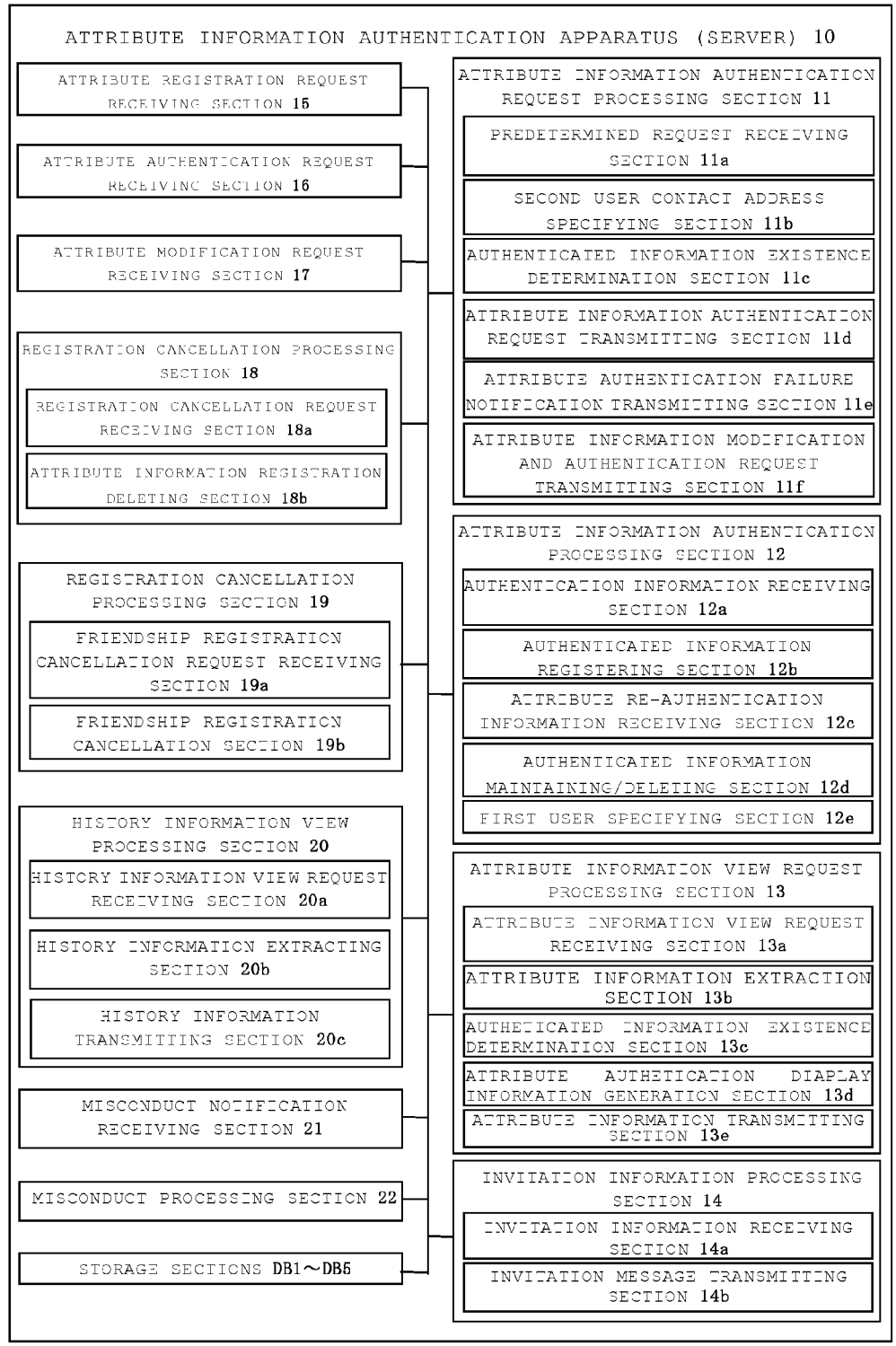
FIG. 3 is a block diagram showing a detailed example of an embodiment of the attribute information authentication apparatus according to the present invention.
Figure 10:
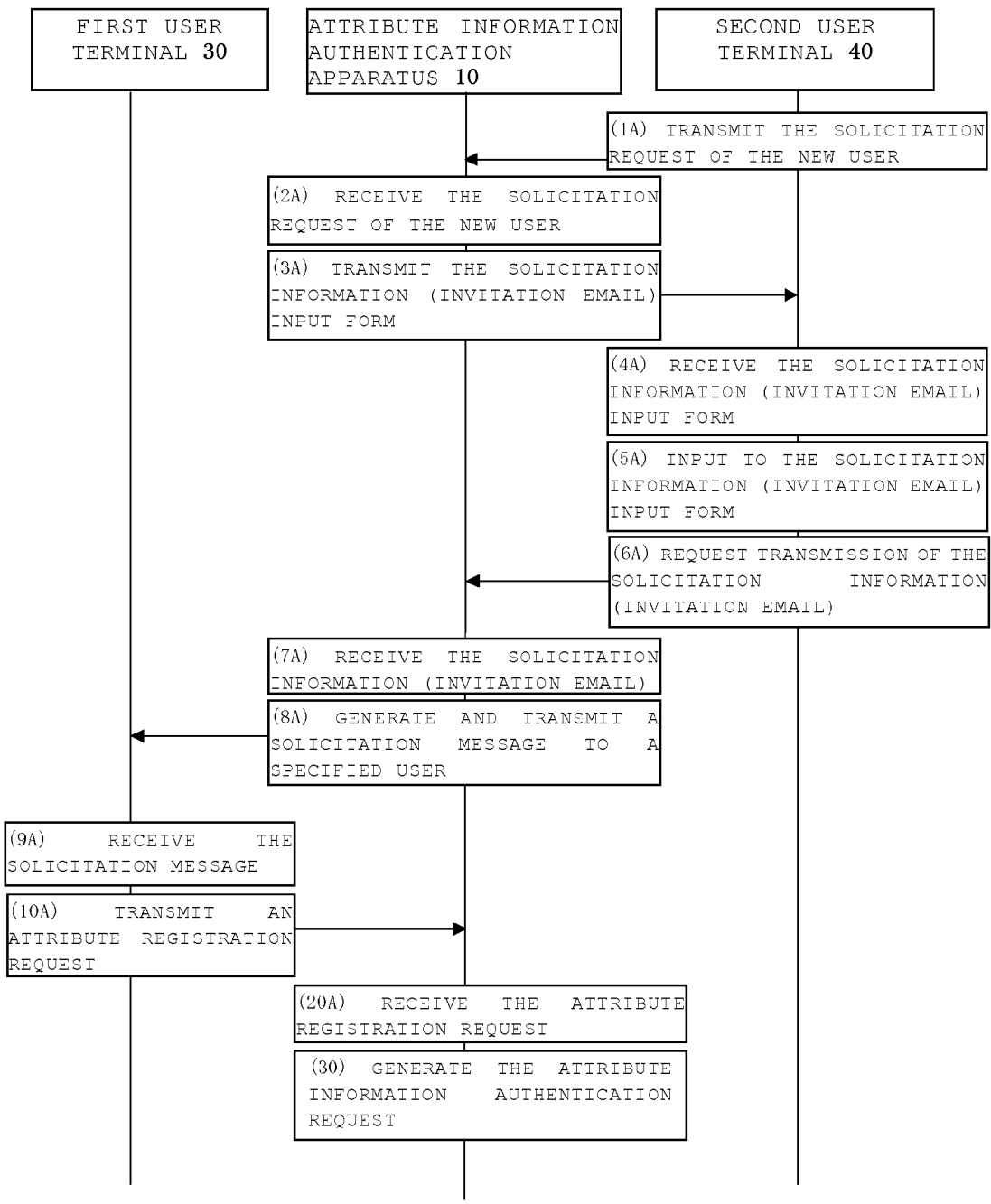
FIG. 10 is a sequence diagram showing the flow of attribute information registration request processing in the attribute information authentication method according to the present invention.
Figure 11:
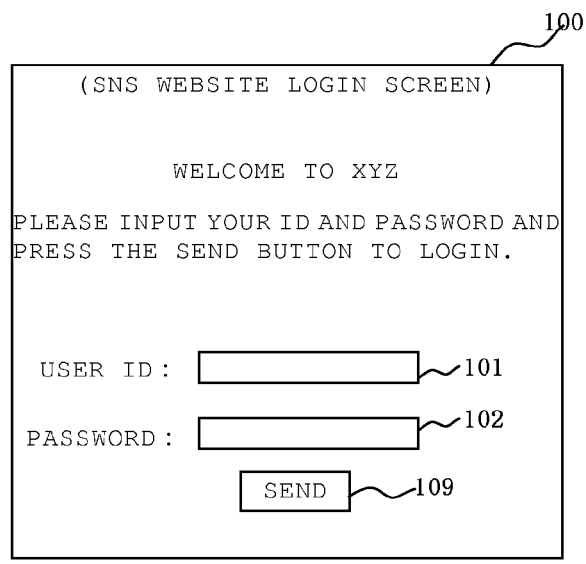
FIG. 11 is a schematic view showing an example of an SNS website login screen displayed on the display of the second user terminal connected to the attribute information authentication apparatus according to the present invention.
Figure 12:
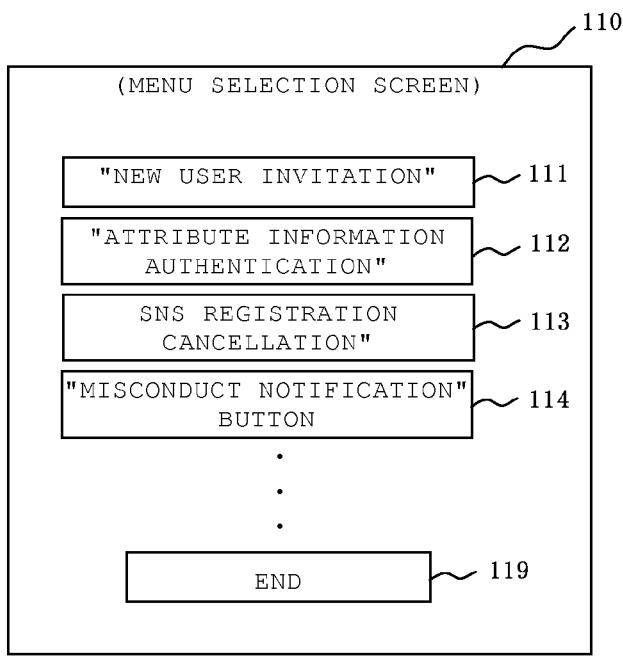
FIG. 12 is a schematic view showing an example of a menu selection screen displayed on the display of the second user terminal connected to the attribute information authentication apparatus according to the present invention.
Figure 13:
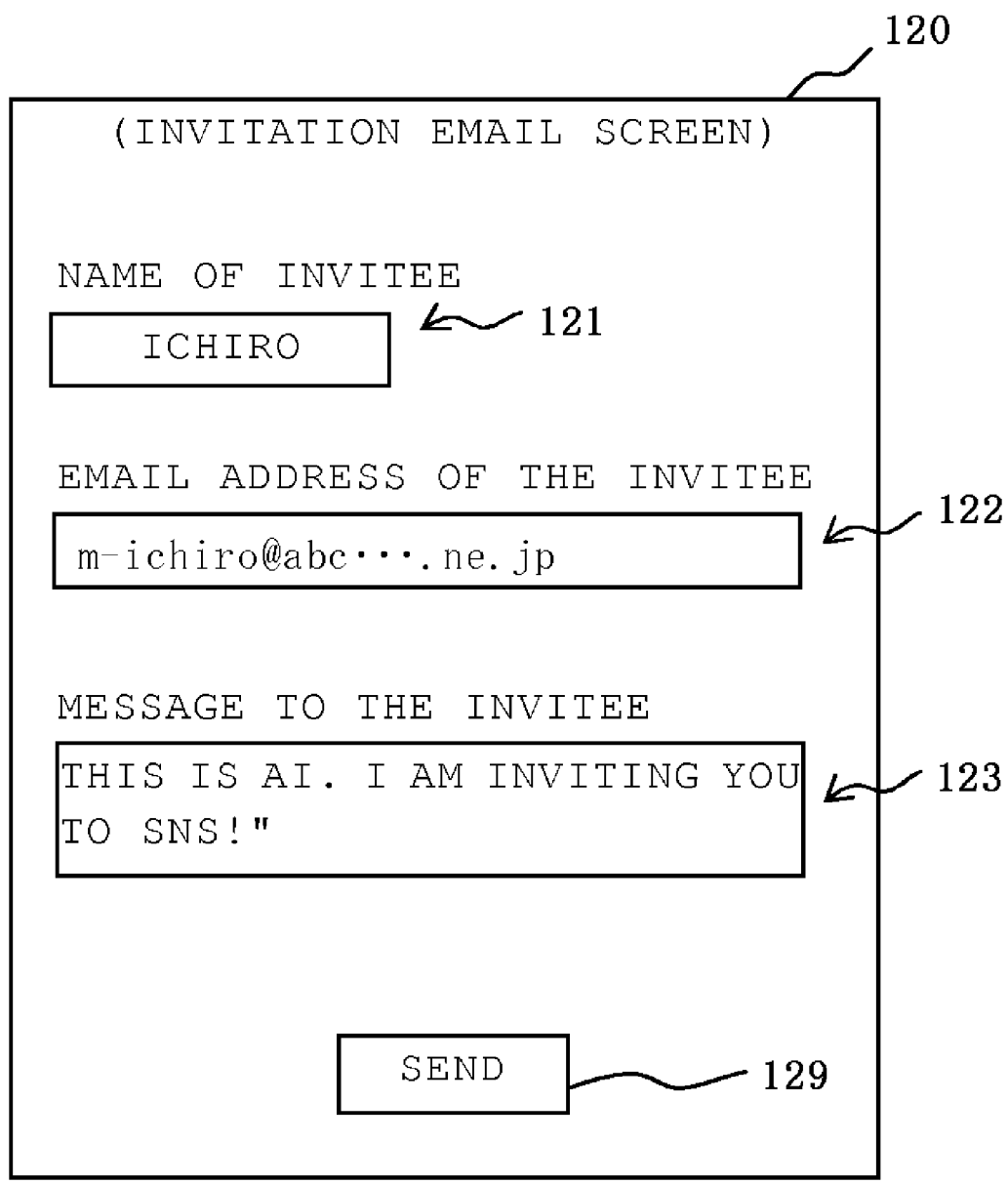
FIG. 13 is a schematic view showing an example of an invitation email screen displayed on the display of the second user terminal connected to the attribute information authentication apparatus according to the present invention.
Figure 14:
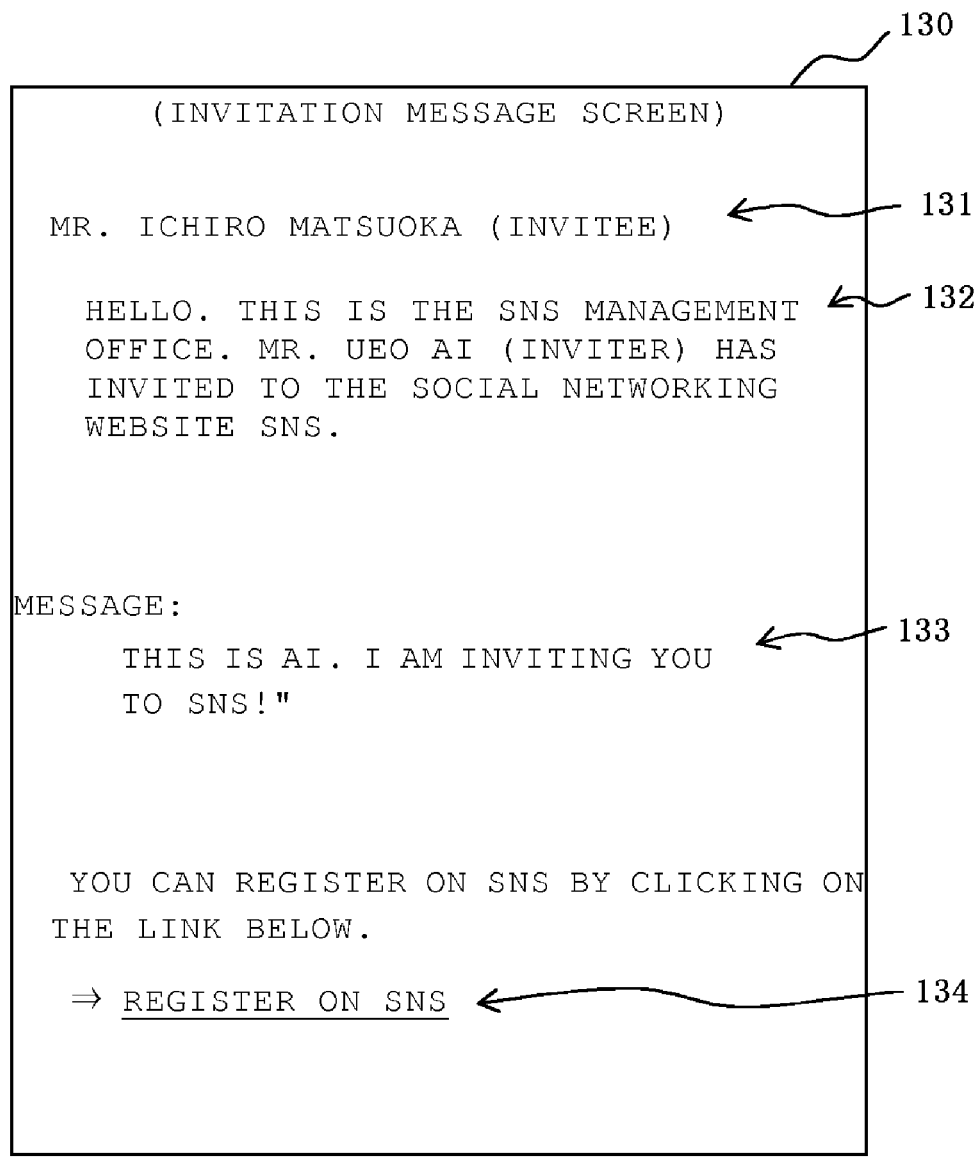
FIG. 14 is a schematic view showing an example of an invitation message screen displayed on the display of the first user terminal connected to the attribute information authentication apparatus according to the present invention.
Figure 15:
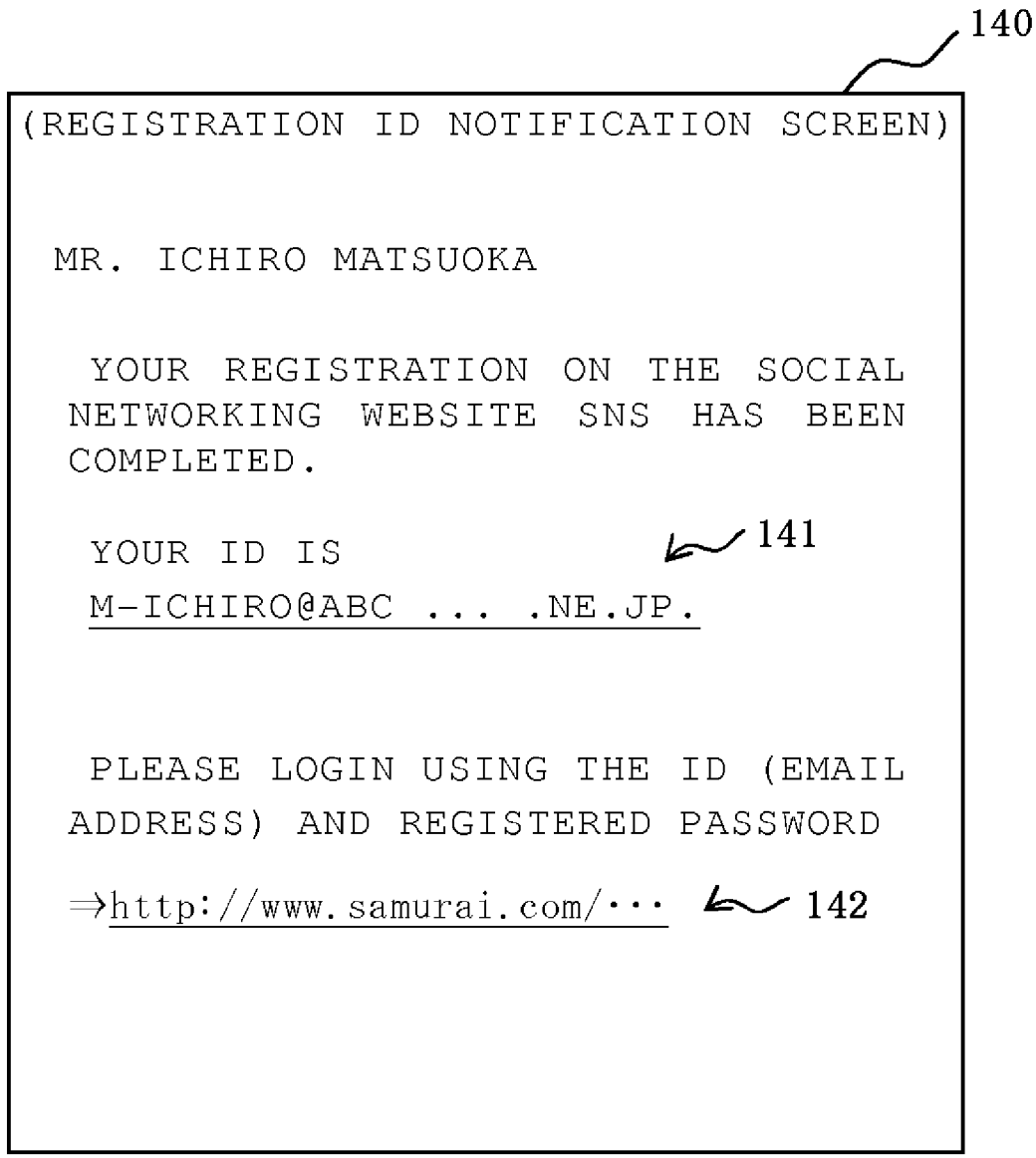
FIG. 15 is a schematic view showing an example of a registration ID notification screen displayed on the display of the first user terminal connected to the attribute information authentication apparatus according to the present invention.
Figure 16:
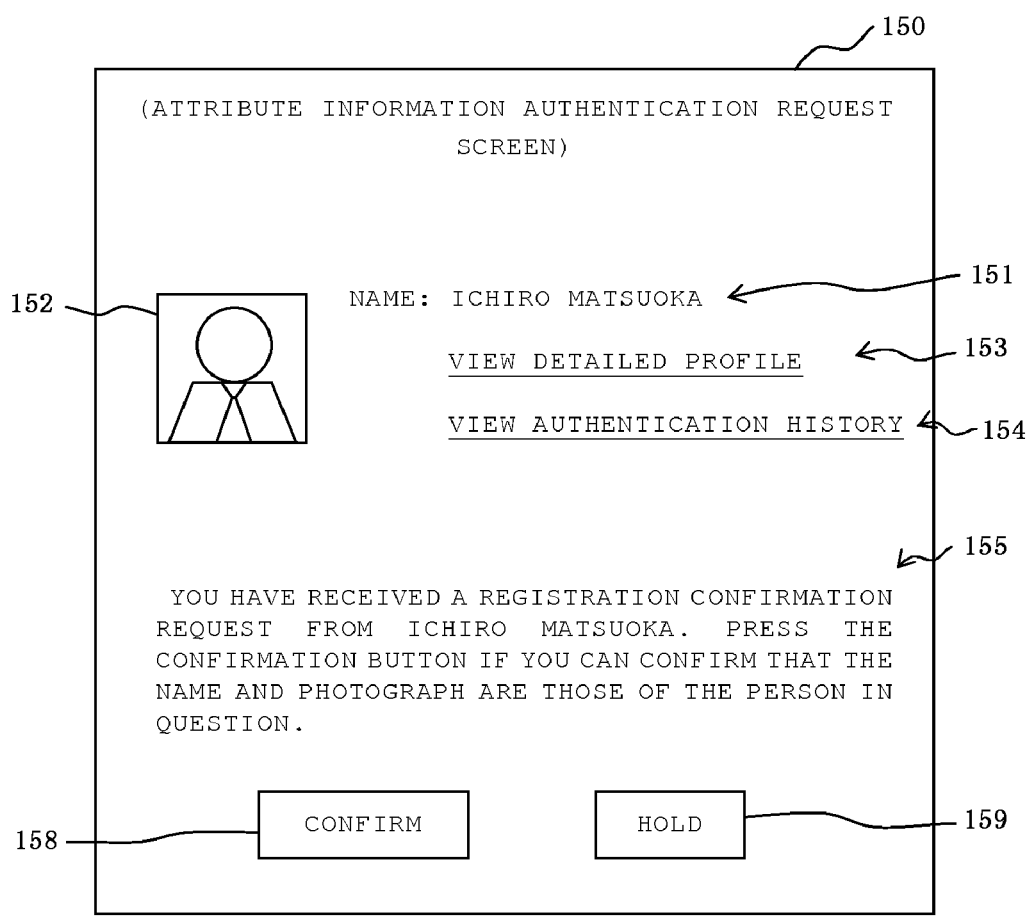
FIG. 16 is a schematic view showing an example of an attribute information authentication request screen displayed on the display of the second user terminal connected to the attribute information authentication apparatus according to the present invention.
Figure 17:
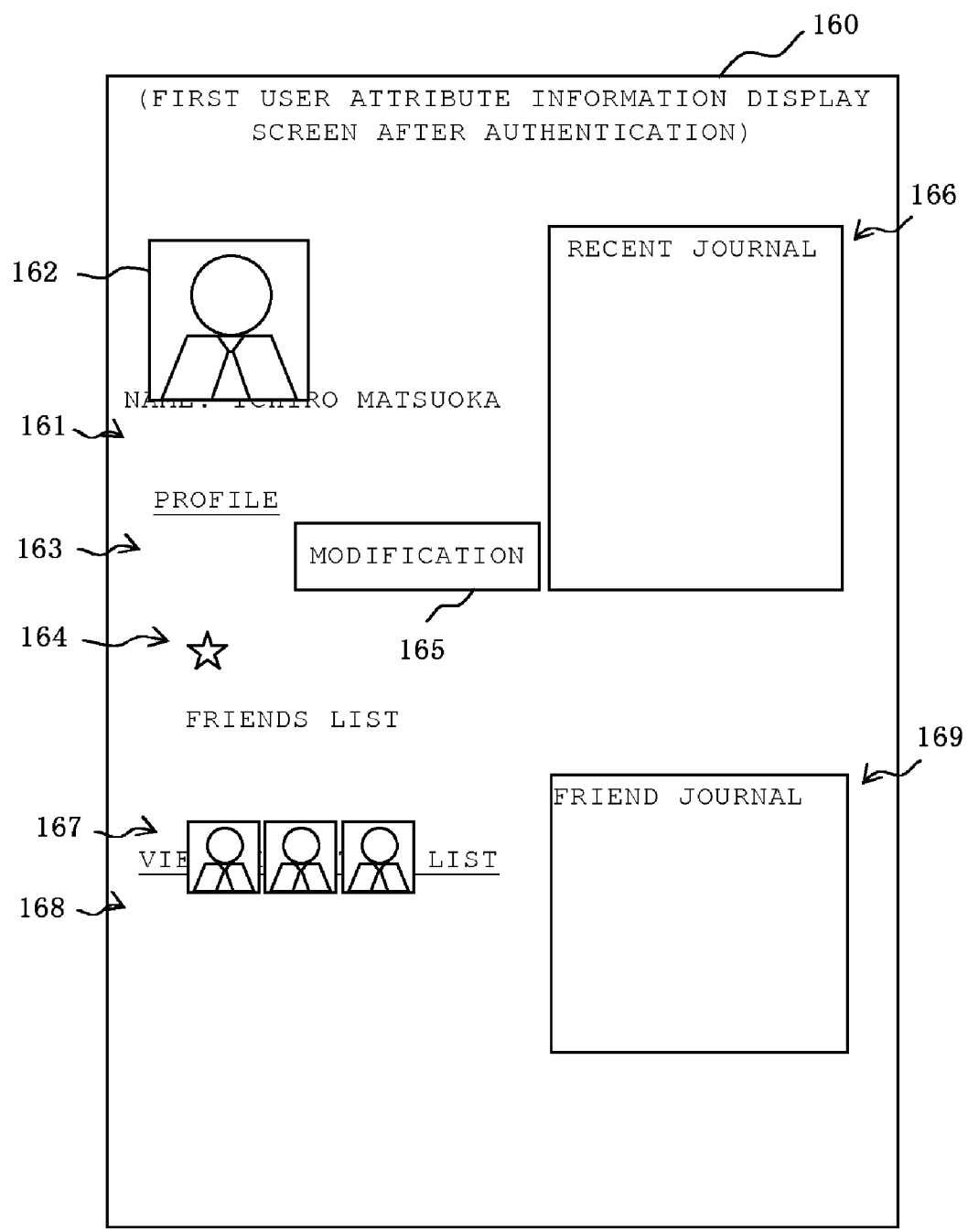
FIG. 17 is a schematic view showing an example of a first user attribute information display screen after authentication as displayed on the display of the third user terminal connected to the attribute information authentication apparatus according to the present invention.
Figure 18:
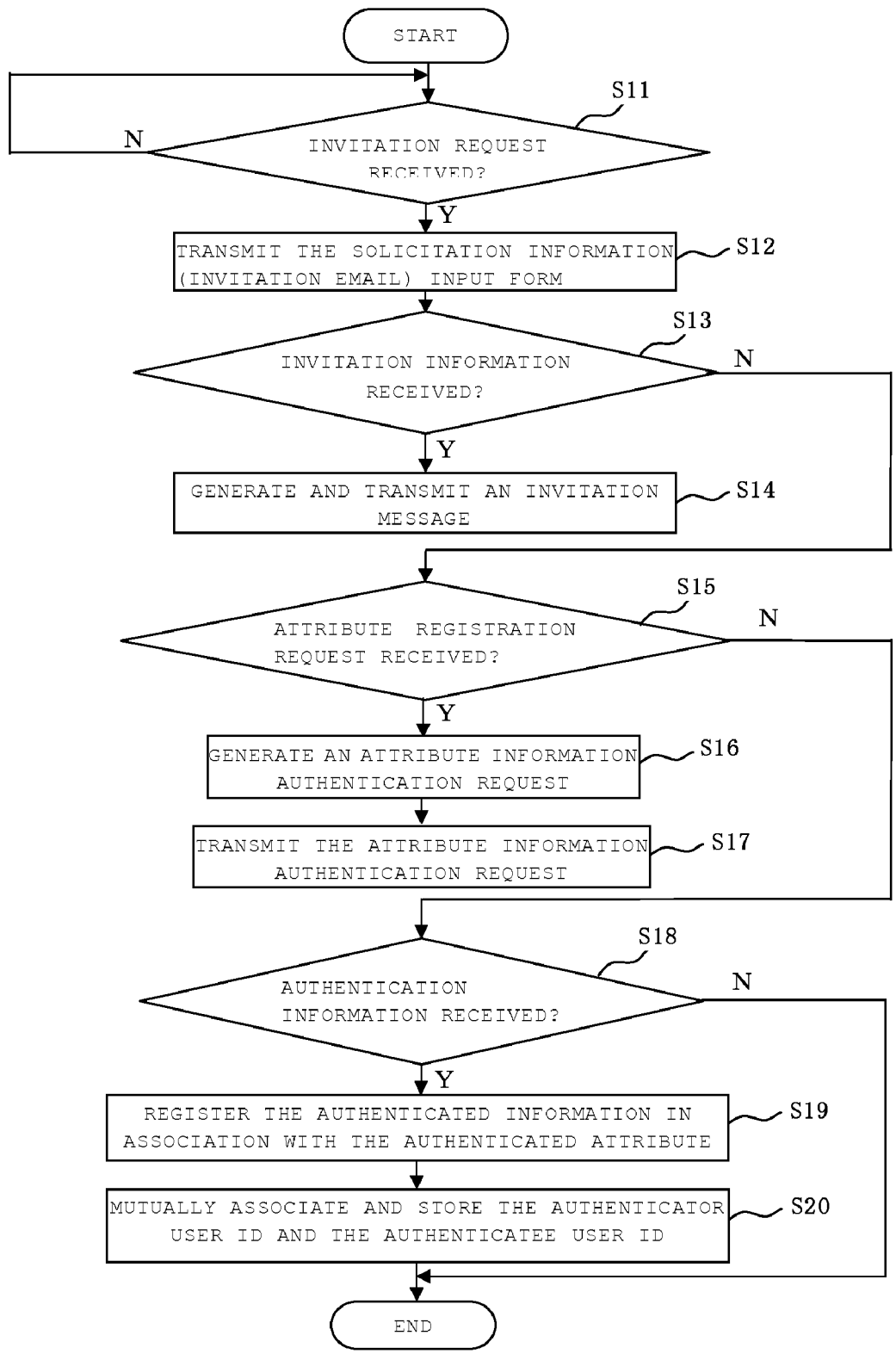
FIG. 18 is a flowchart showing an example of attribute information registration request processing in the attribute information authentication apparatus according to the present invention.
Figure 19:
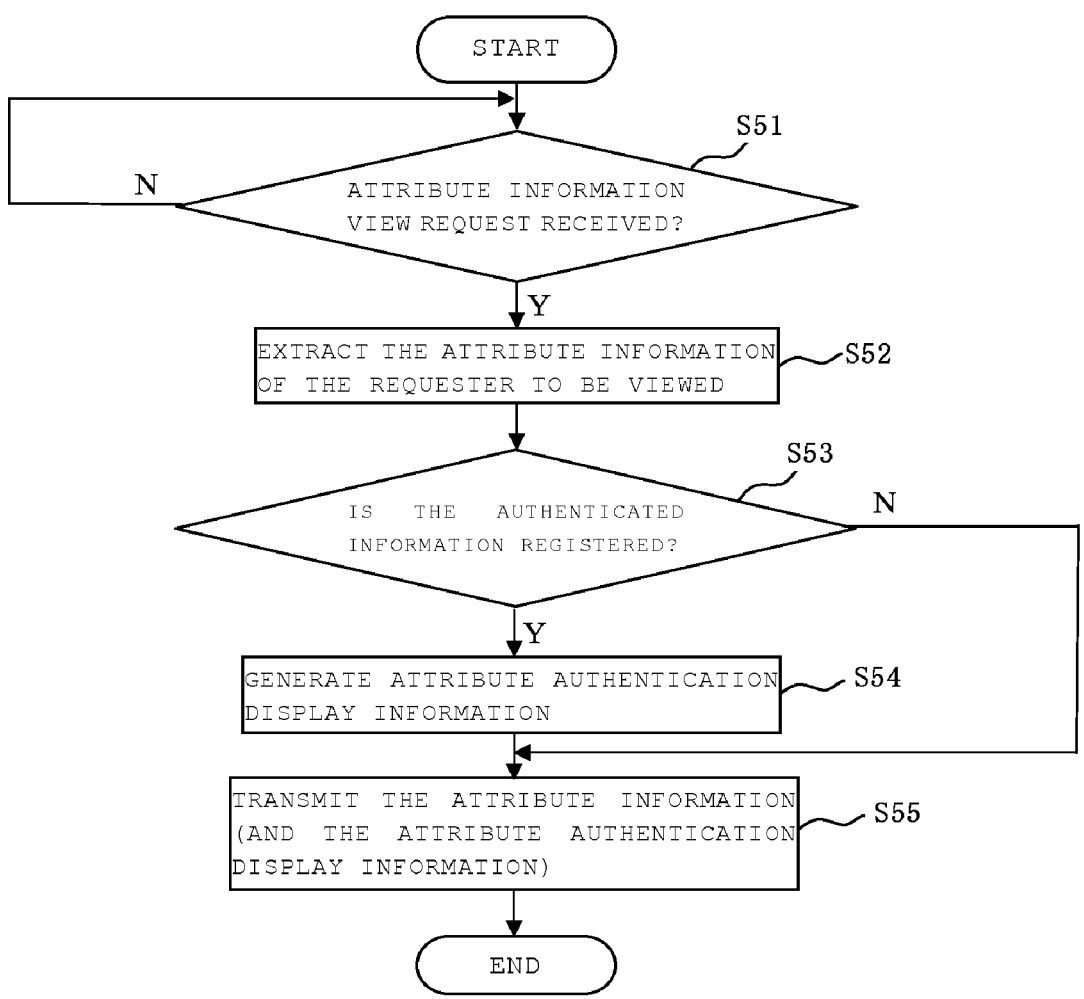
FIG. 19 is a flowchart showing an example of attribute information view request processing in the attribute information authentication apparatus according to the present invention.
Figure 20:
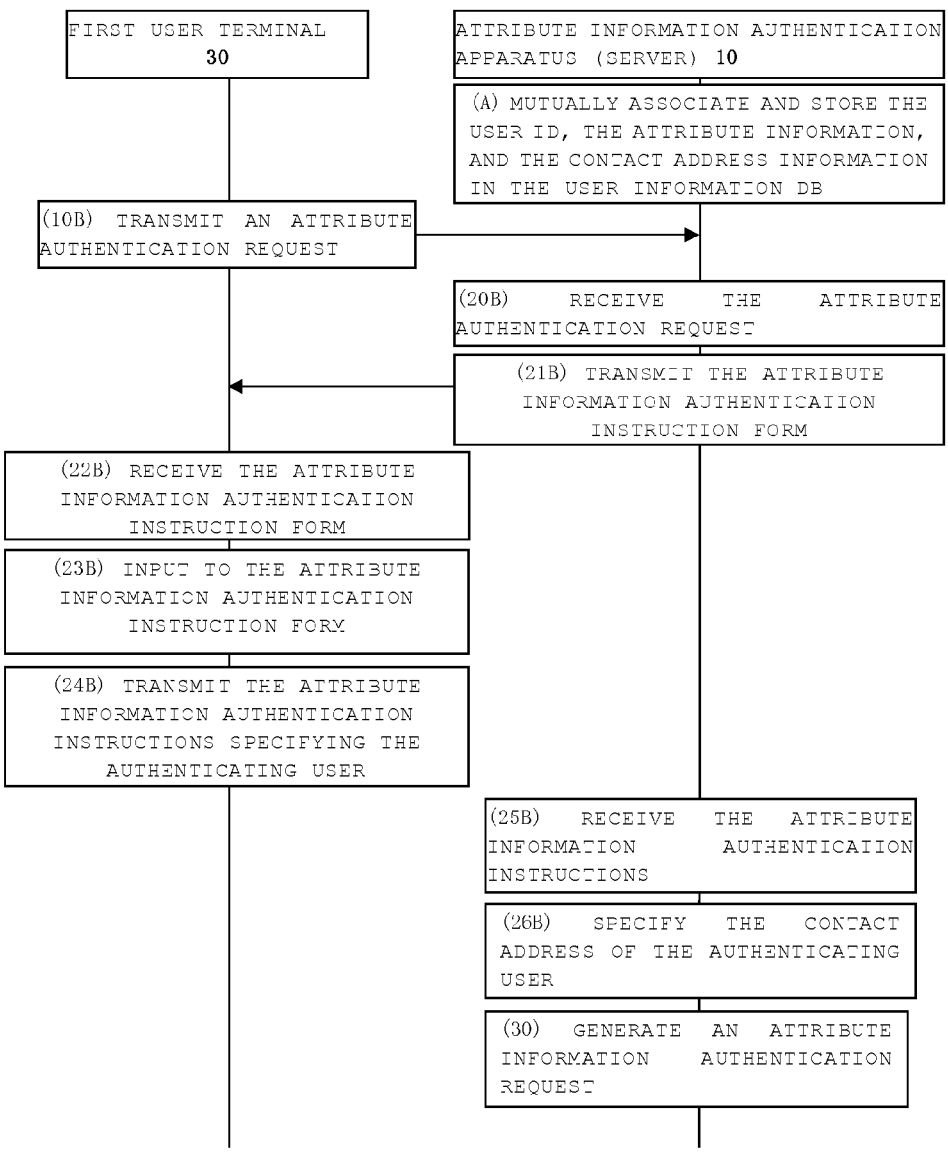
FIG. 20 is a sequence diagram showing the flow of attribute information authentication request processing in the attribute information authentication method according to the present invention.
Figure 21:
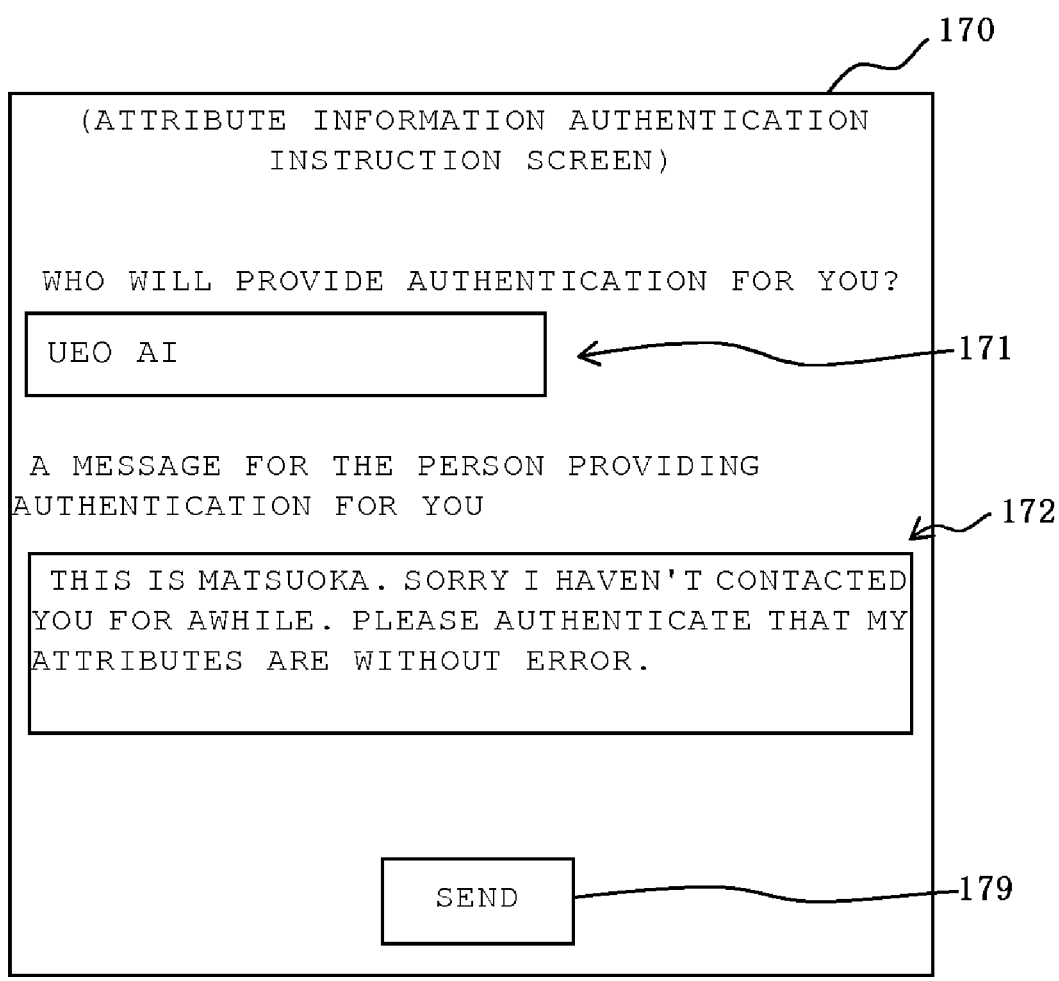
FIG. 21 is a schematic view showing an example of an attribute information authentication instruction screen displayed on the display of the first user terminal connected to the attribute information authentication apparatus according to the present invention.
Figure 22:
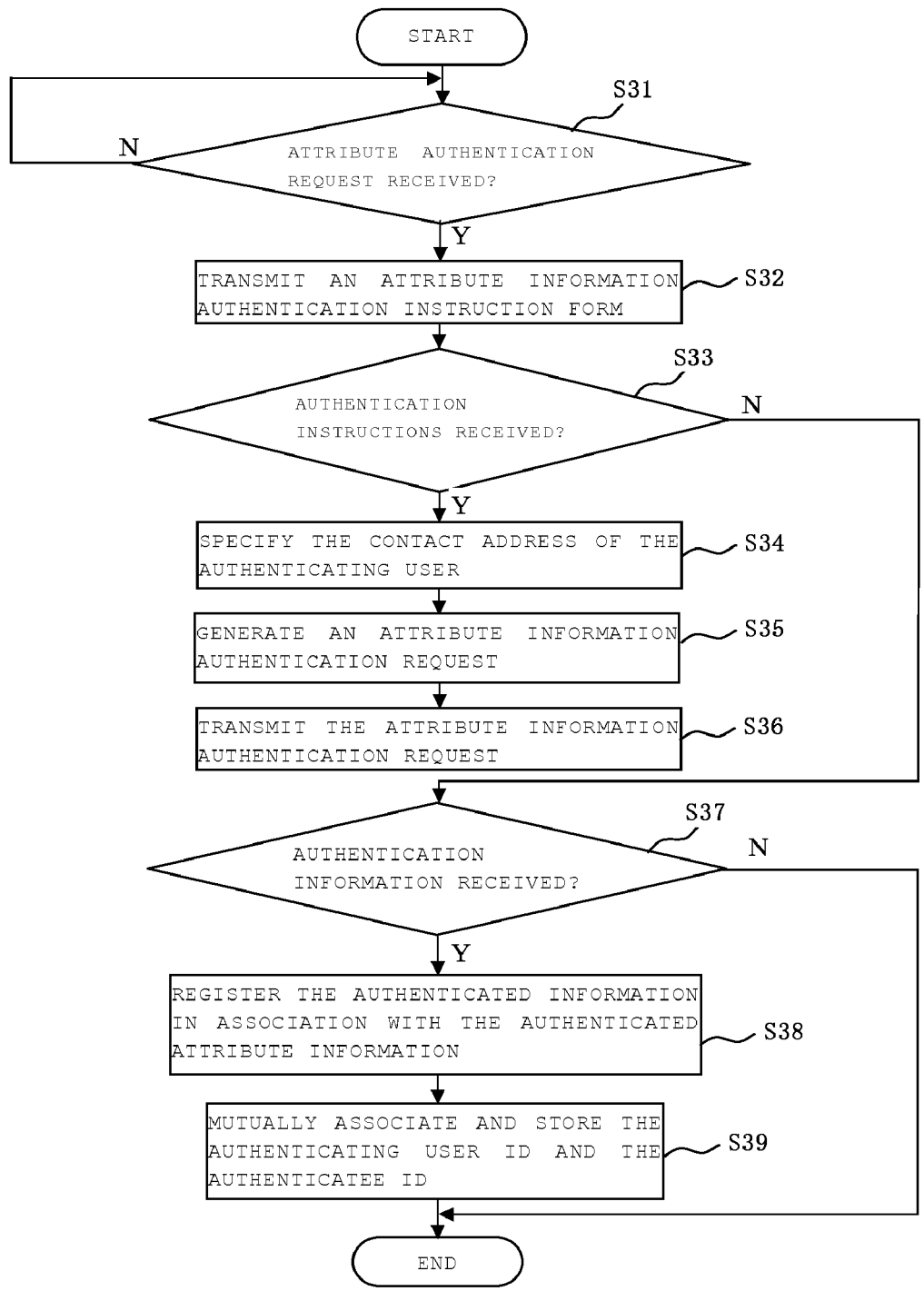
FIG. 22 is a flowchart showing an example of the attribute information authentication request processing in the attribute information authentication apparatus according to the present invention.
Figure 23:
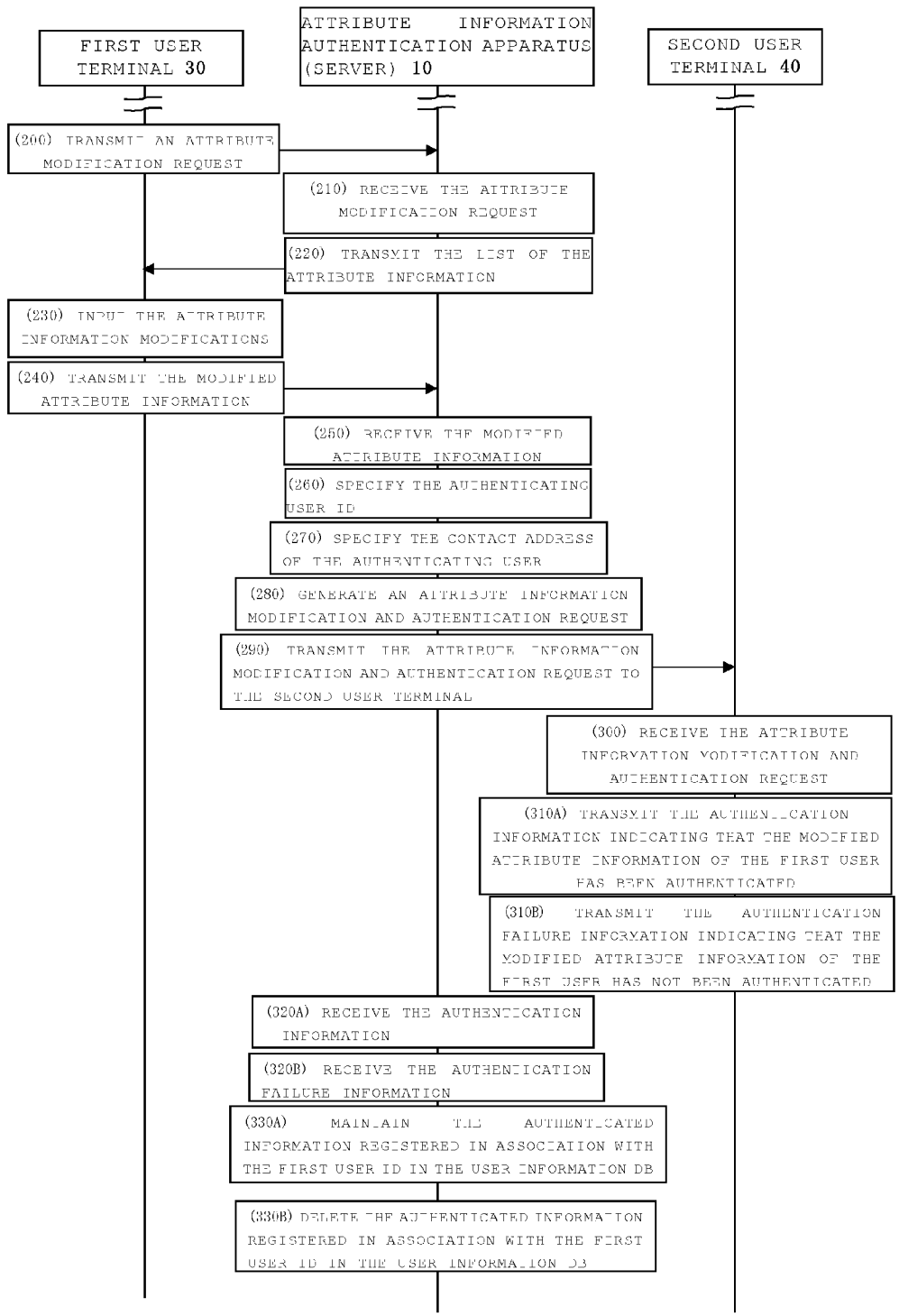
FIG. 23 is a sequence diagram showing the flow of attribute information modification and authentication request processing in the attribute information authentication method according to the present invention.
Figure 24:
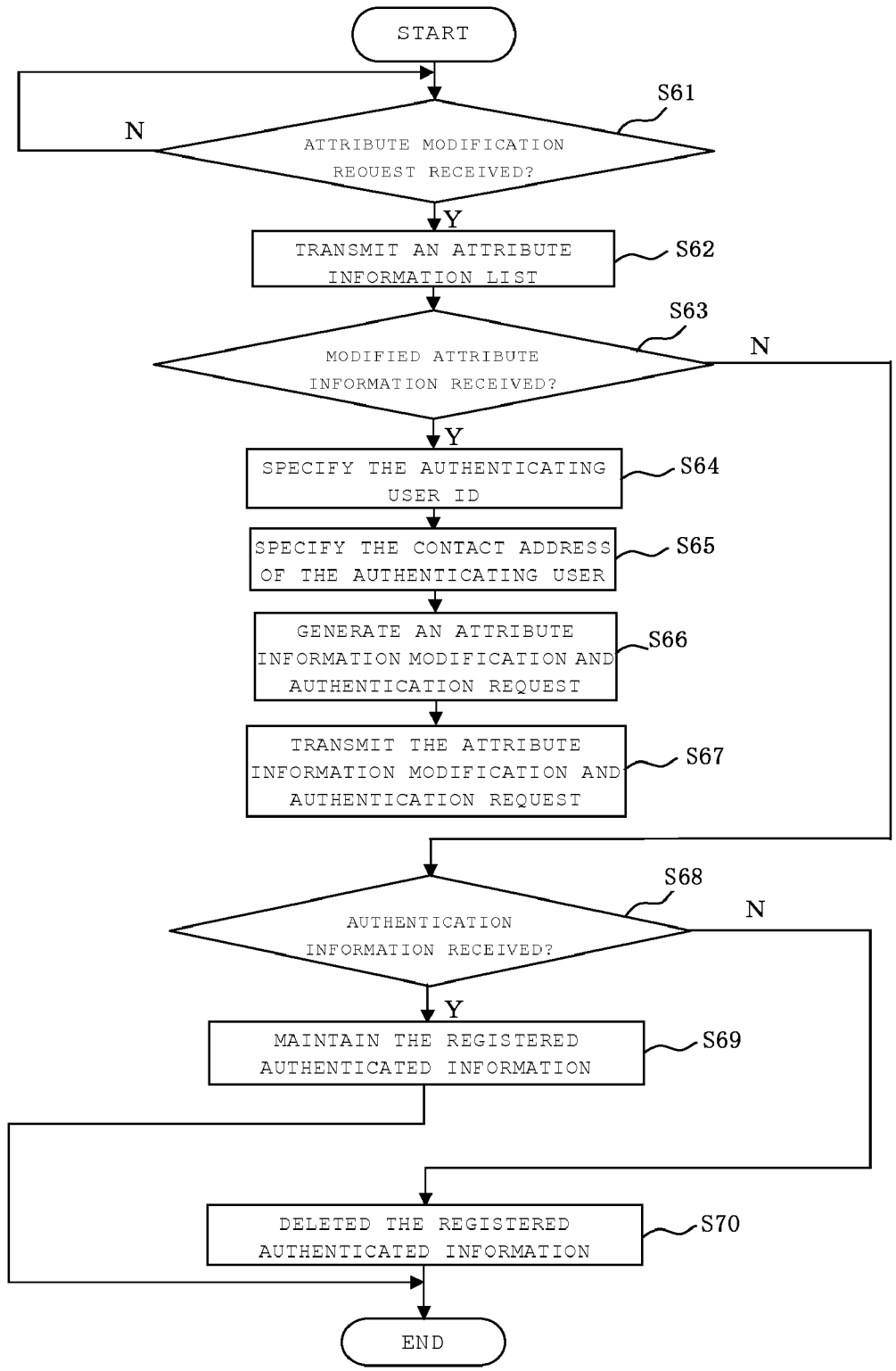
FIG. 24 is a flowchart showing an example of attribute information modification and authentication request processing in the attribute information authentication apparatus according to the present invention.
Figure 25:
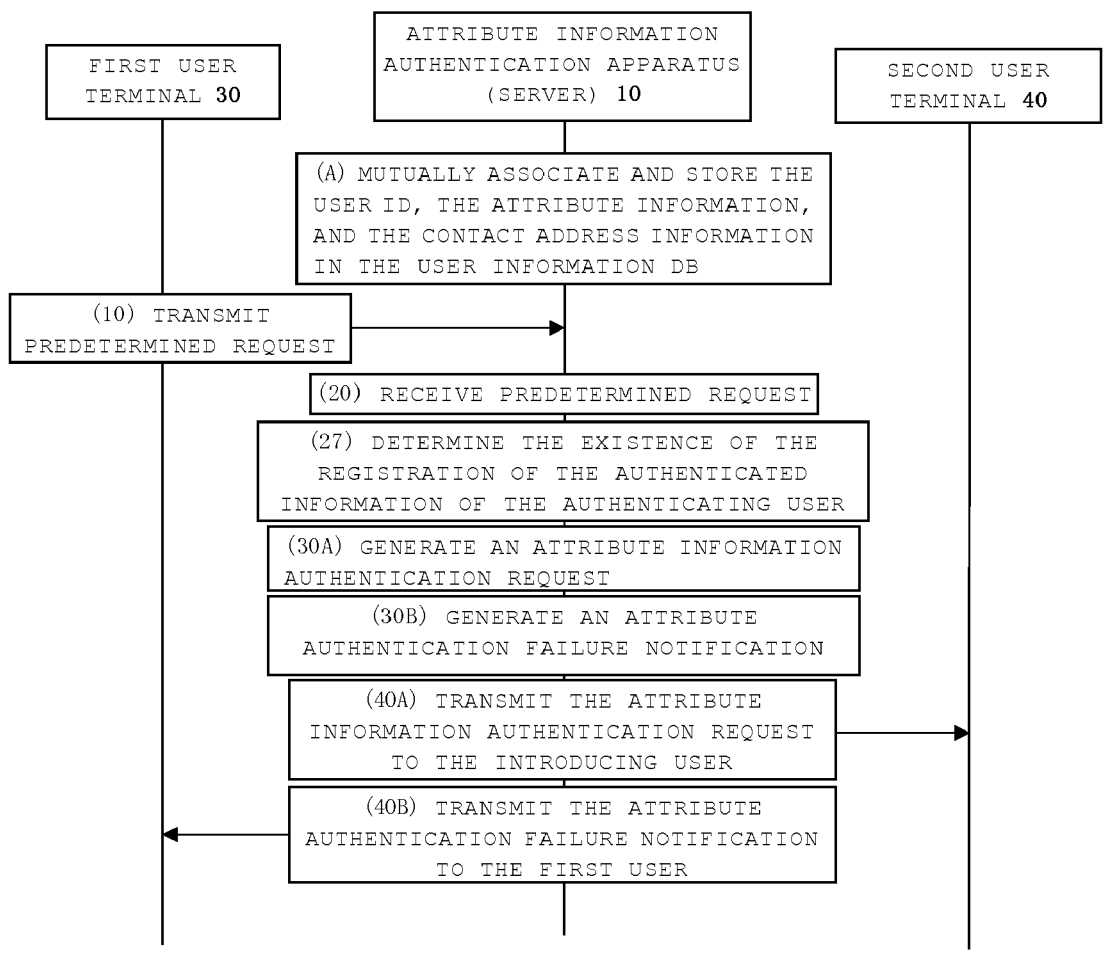
FIG. 25 is a sequence diagram showing the flow of the attribute information authenticator judging process in the attribute information authentication method according to the present invention.
Figure 26:
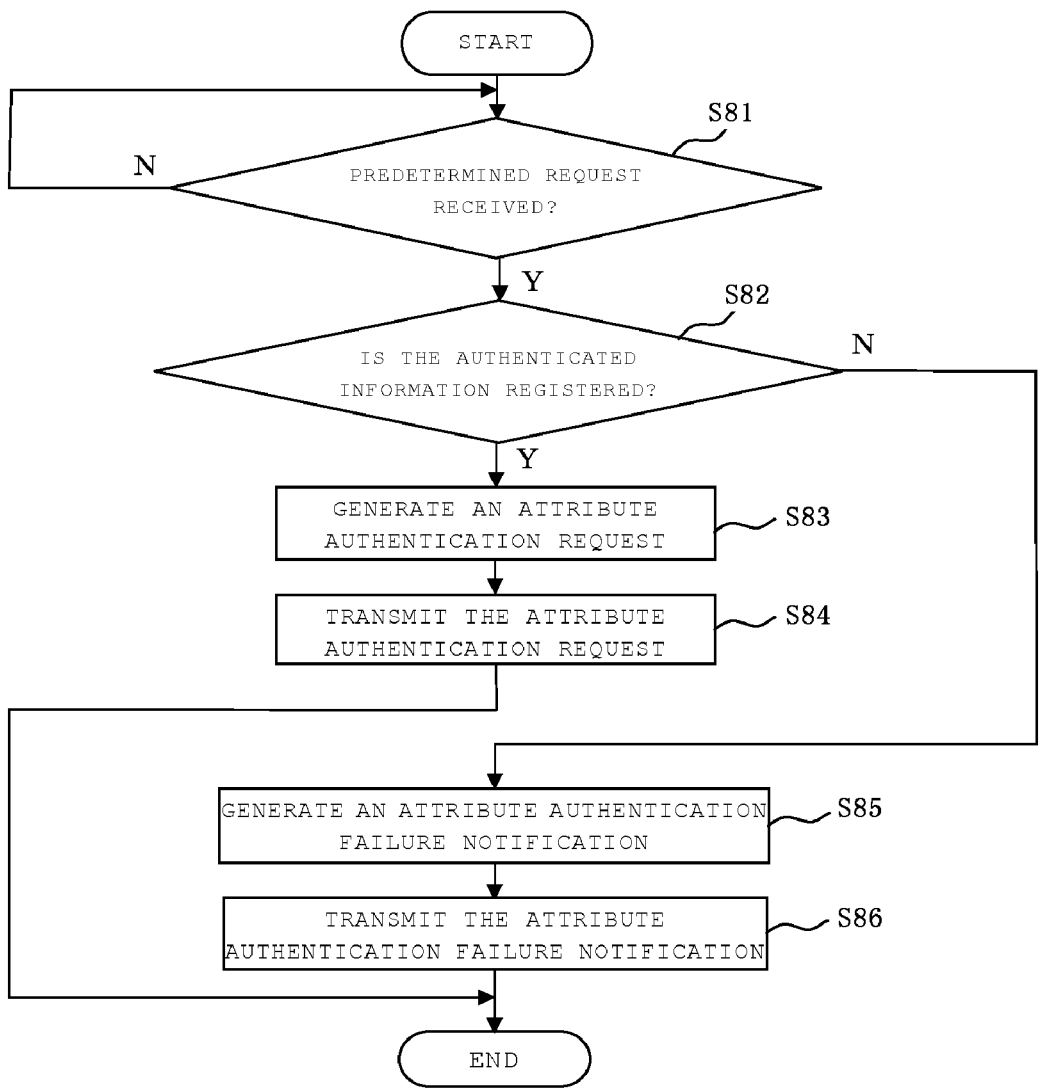
FIG. 26 is a flowchart showing an example of the attribute information authenticator judging process in the attribute information authentication apparatus according to the present invention.
Figure 27:
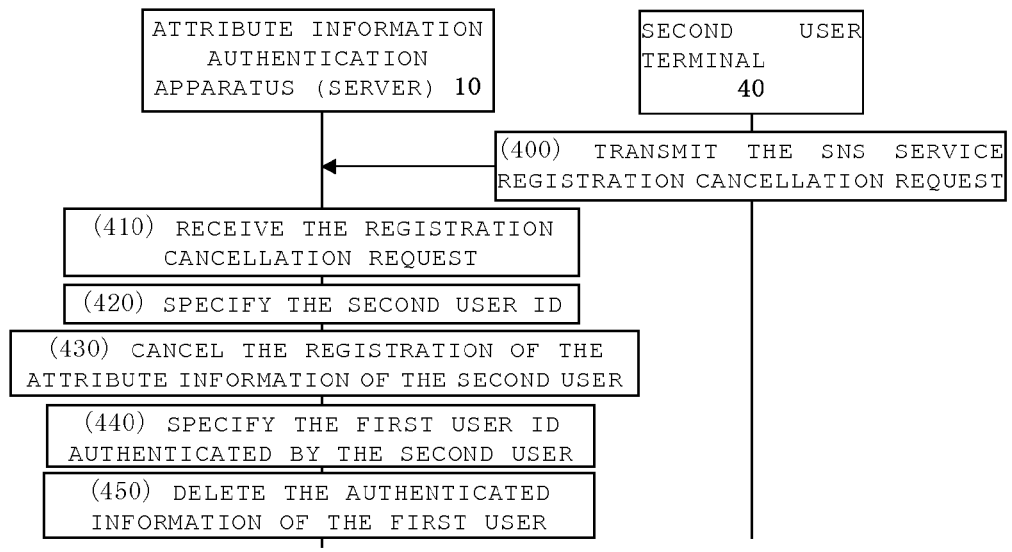
FIG. 27 is a sequence diagram showing the flow of registration cancellation processing in the attribute information authentication method according to the present invention.
Figure 28:
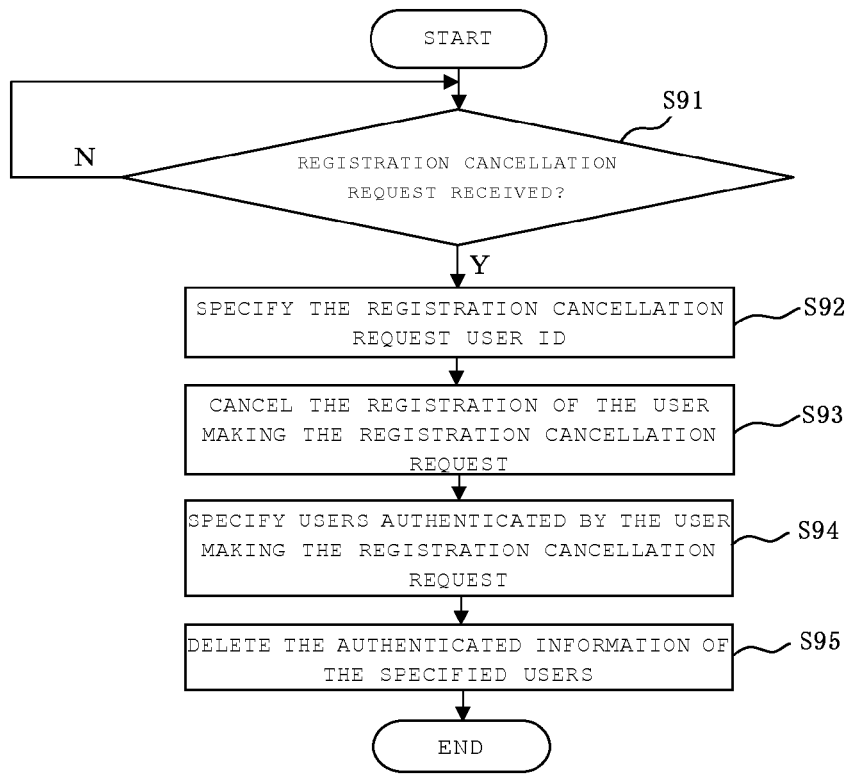
FIG. 28 is a flowchart showing an example of registration cancellation processing in the attribute information authentication apparatus according to the present invention.
Figure 29:
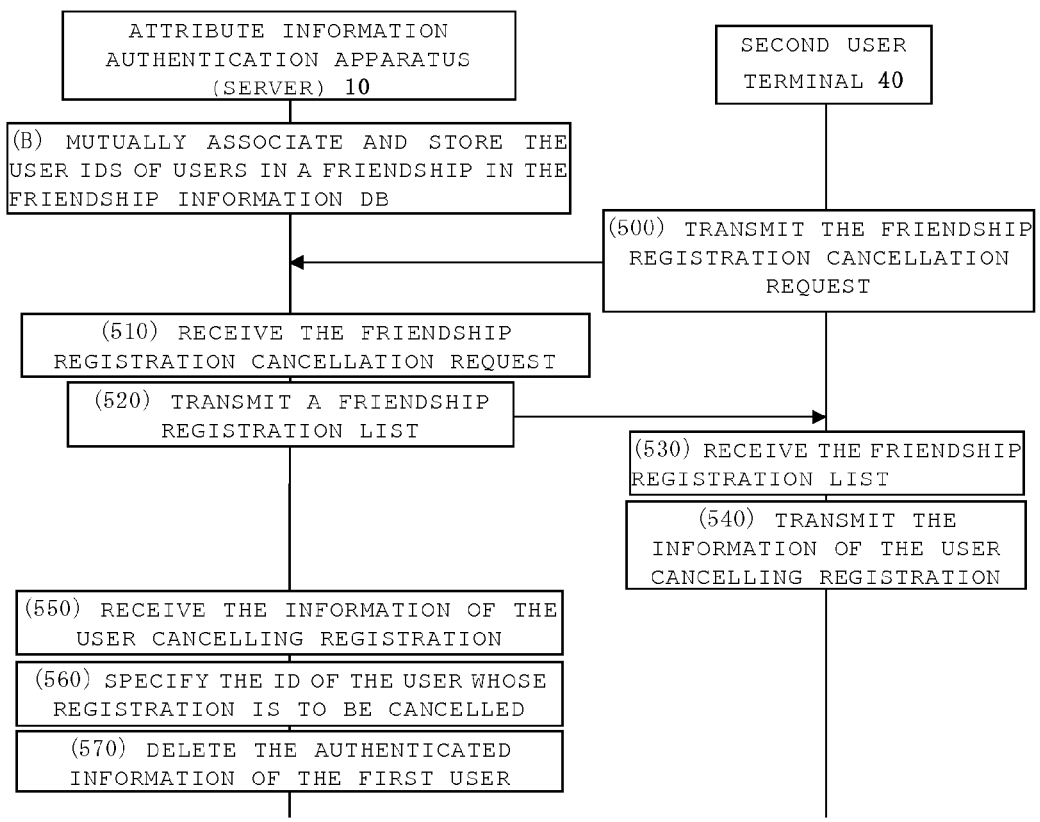
FIG. 29 is a sequence diagram showing the flow of friendship registration cancellation processing in the attribute information authentication method according to the present invention.
Figure 30:
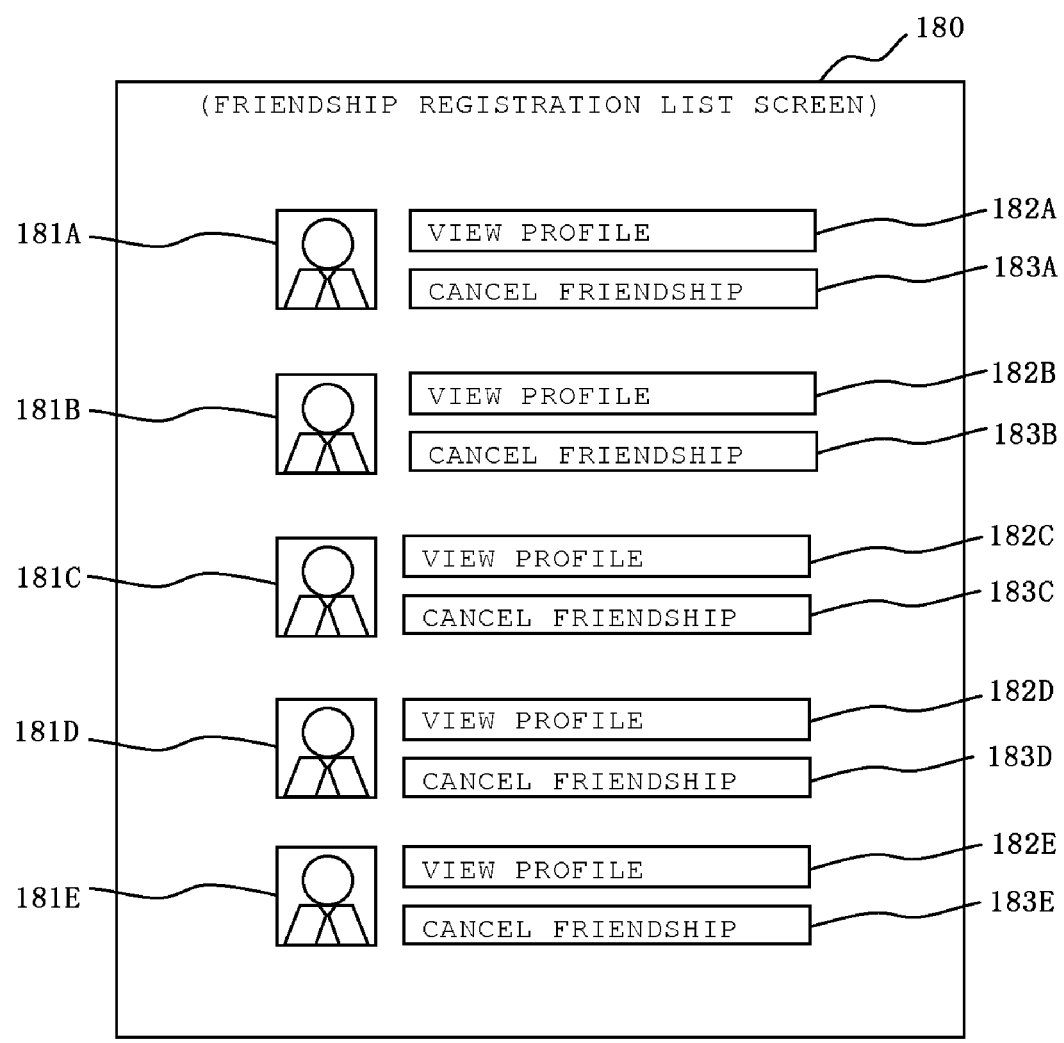
FIG. 30 is a schematic view showing an example of a friendship registration cancellation screen displayed on the display of the second user terminal connected to the attribute information authentication apparatus according to the present invention.
Figure 31:
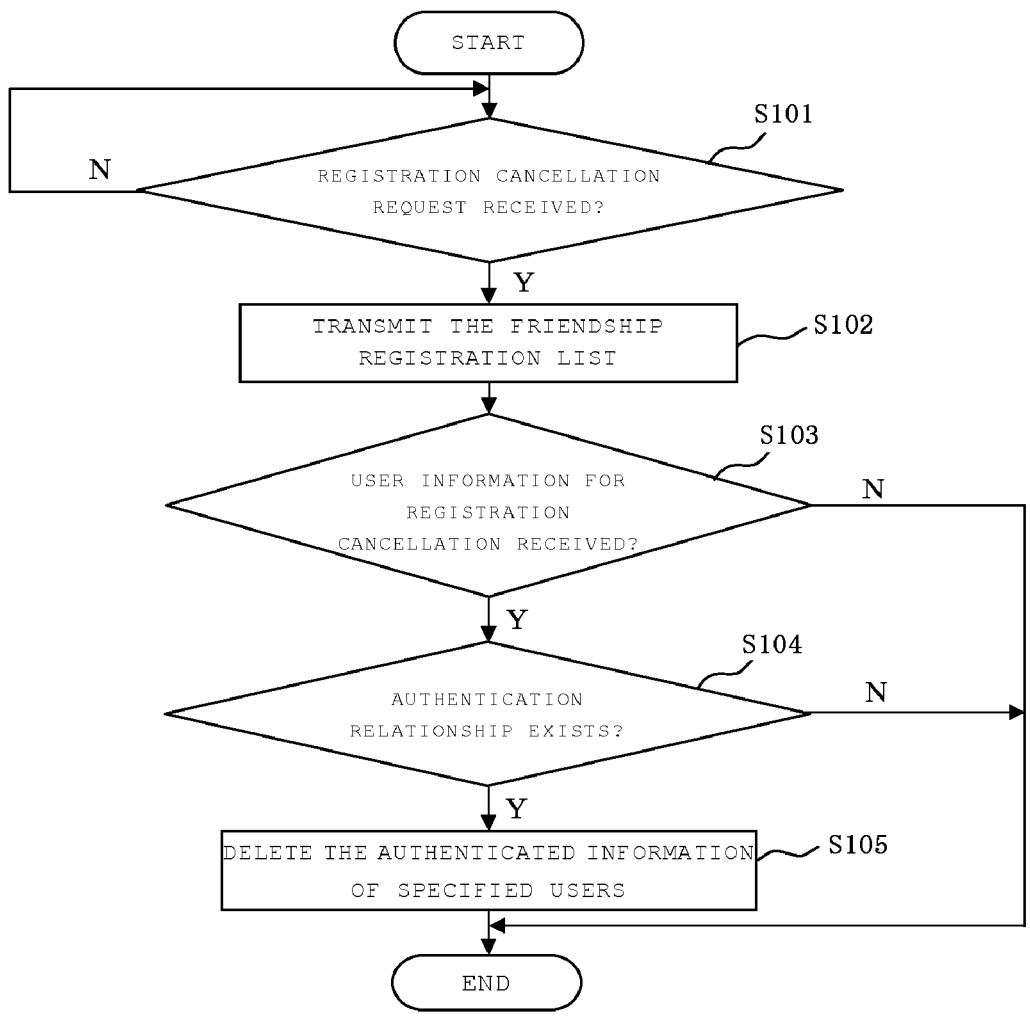
FIG. 31 is a flowchart showing an example of friendship registration cancellation processing in the attribute information authentication apparatus according to the present invention.
Figure 32:
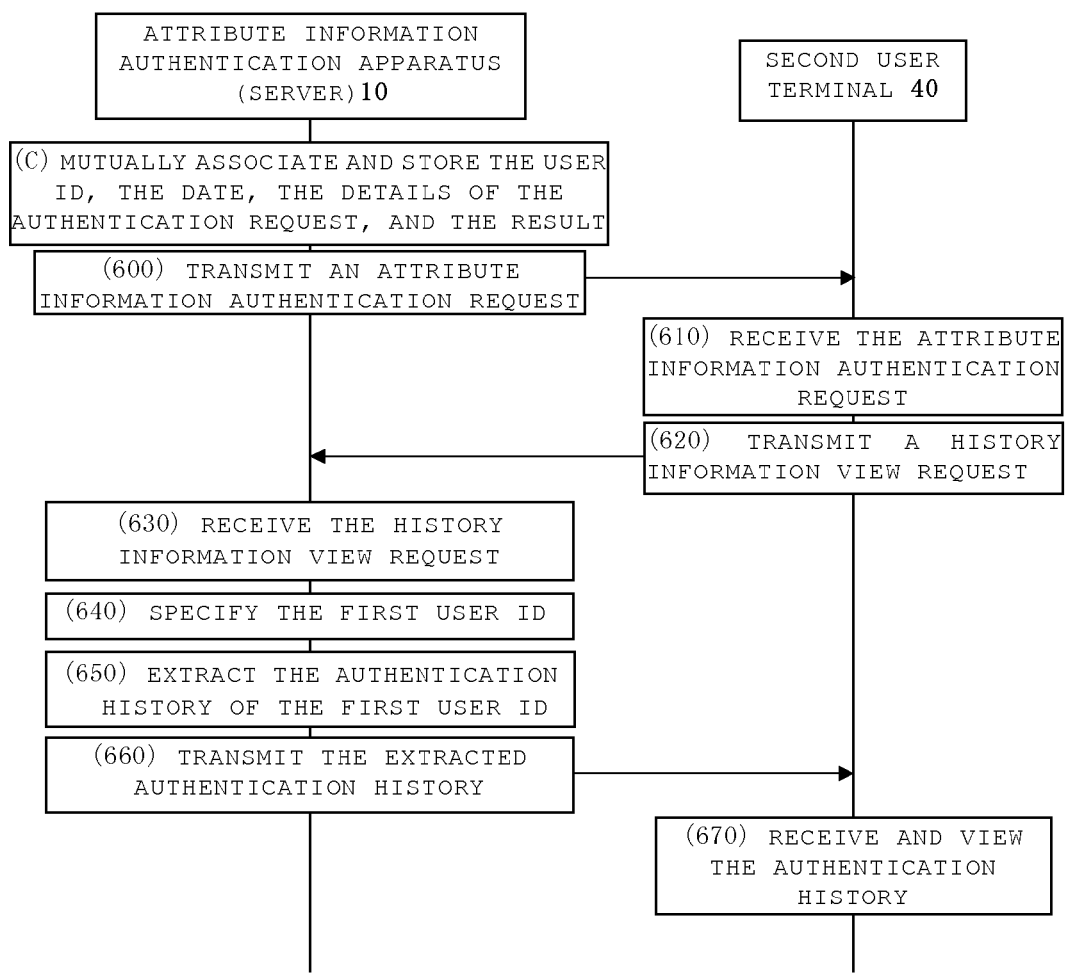
FIG. 32 is a sequence diagram showing the flow of authentication history view processing in the attribute information authentication method according to the present invention.
Figure 33:
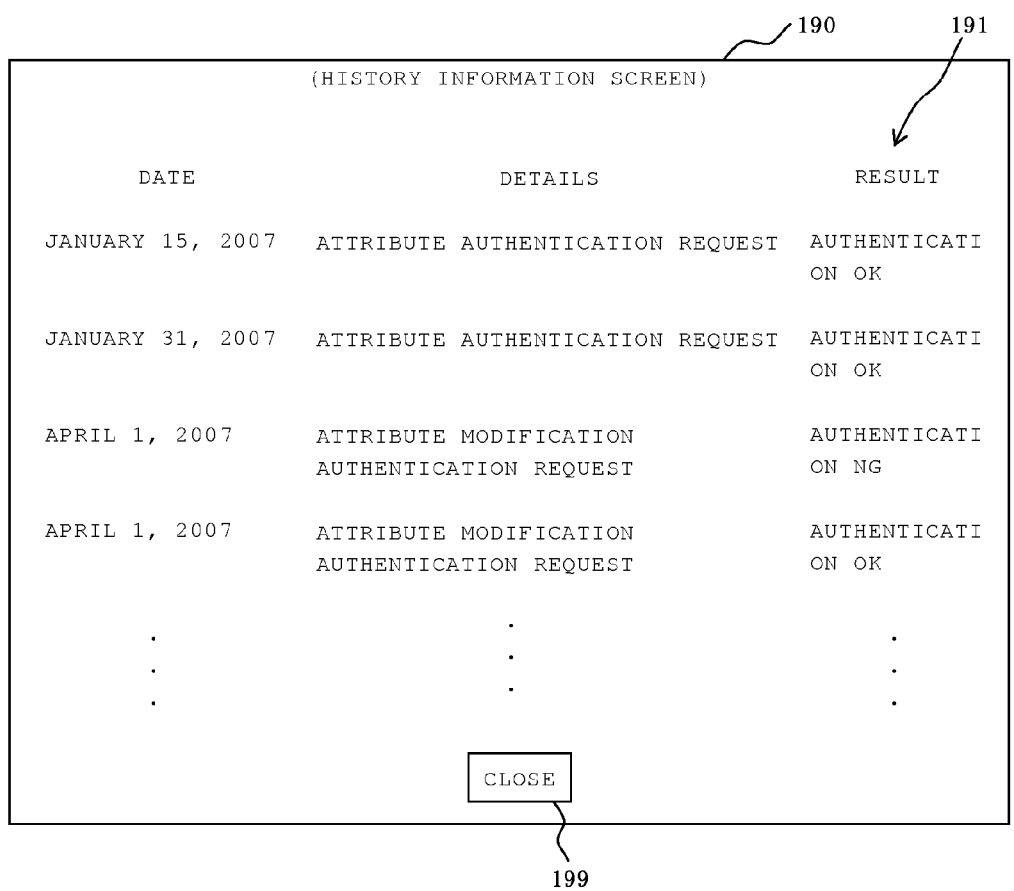
FIG. 33 is a schematic view showing an example of a history information screen displayed on the display of the second user terminal connected to the attribute information authentication apparatus according to the present invention.
Figure 34:
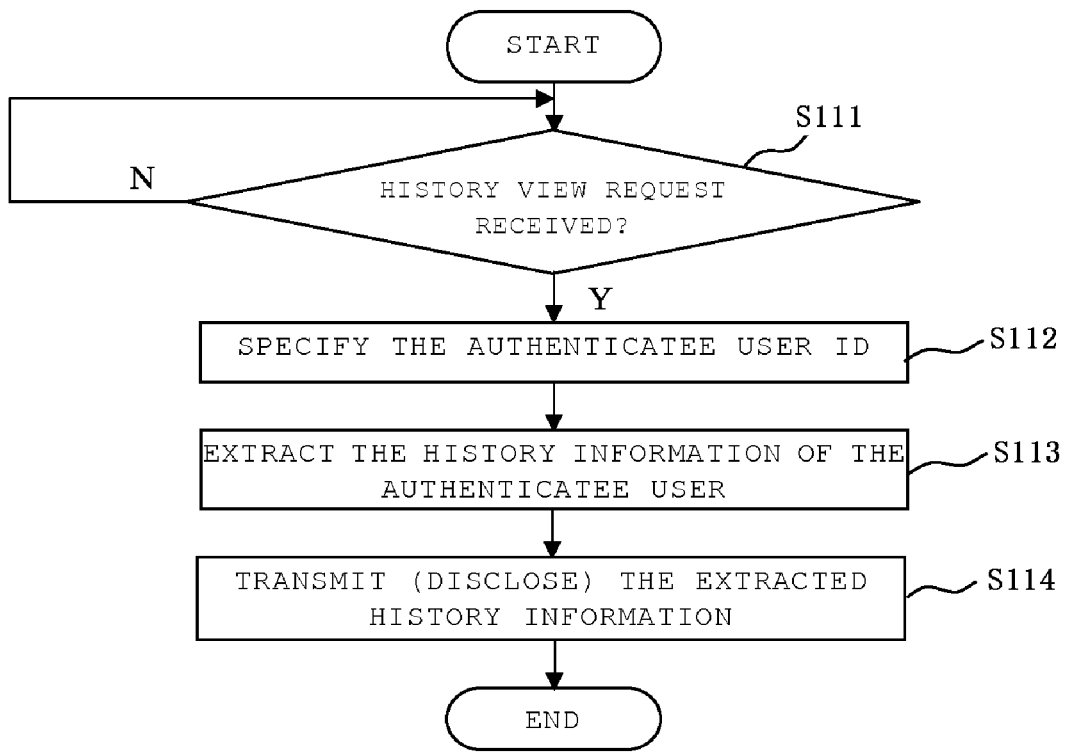
FIG. 34 is a flowchart showing an example of authentication history view processing in the attribute information authentication apparatus according to the present invention.
Figure 35:
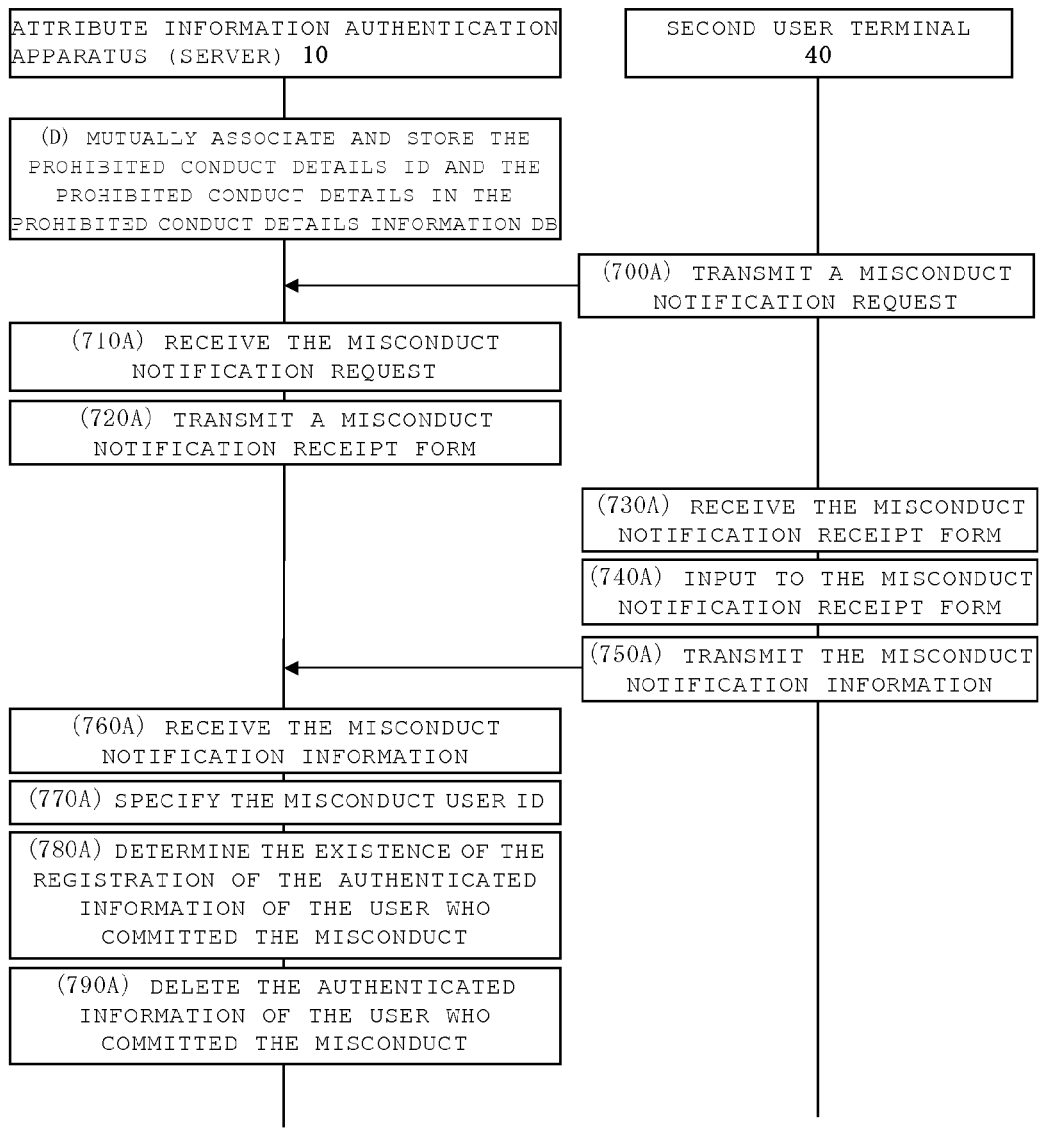
FIG. 35 is a sequence diagram showing the flow of first misconduct notification processing in the attribute information authentication method according to the present invention.
Figure 36:
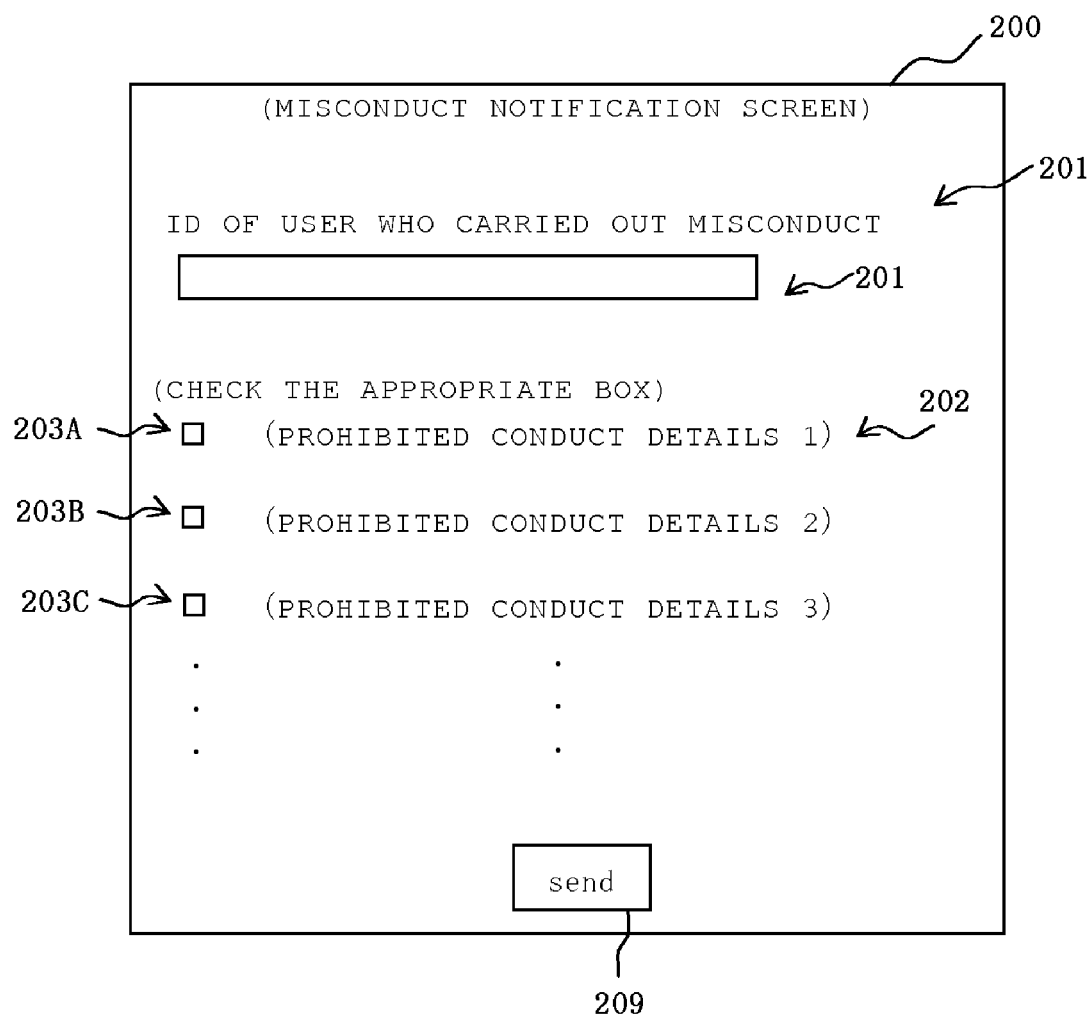
FIG. 36 is a schematic view showing an example of a misconduct notification screen displayed on the display of the second user terminal connected to the attribute information authentication apparatus according to the present invention.
Figure 37:
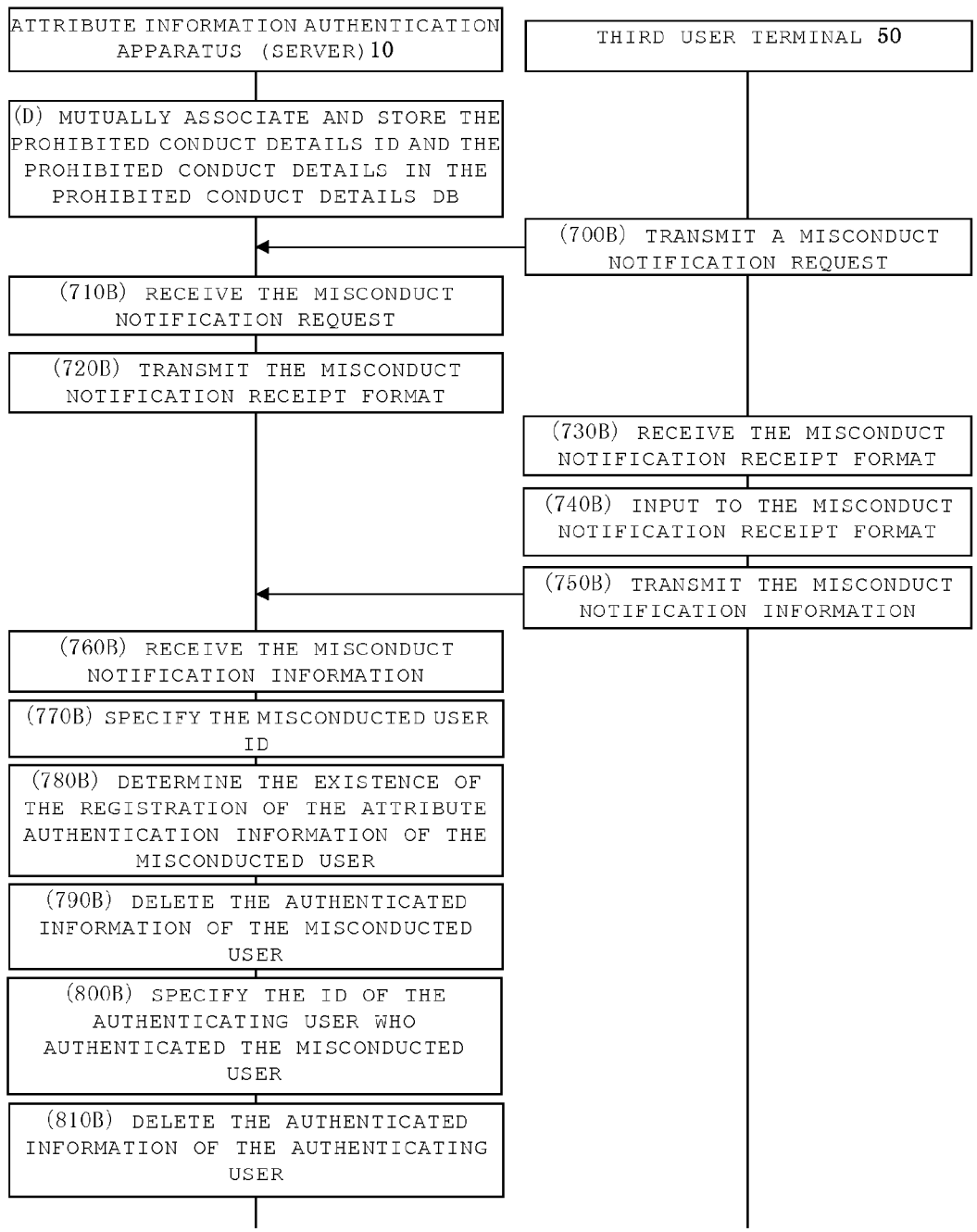
FIG. 37 is a sequence diagram showing the flow of second misconduct notification processing in the attribute information authentication method according to the present invention.
Figure 38:
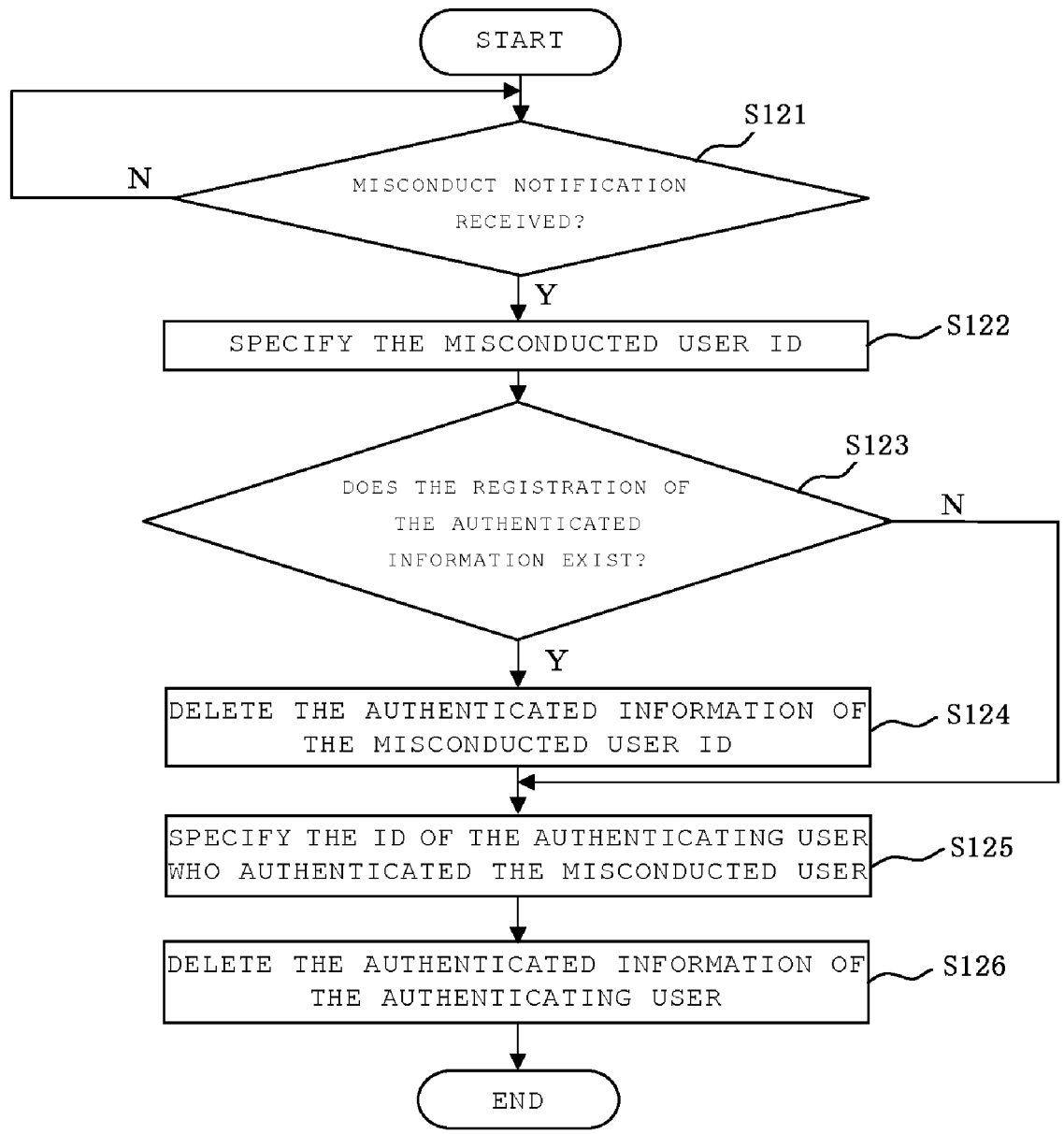
FIG. 38 is a flowchart showing an example of misconduct notification processing in the attribute information authentication apparatus according to the present invention.

DB1: user information database (first storage section), DB2: authentication relationship information database (second storage section), DB3: friendship information database (third storage section), DB4: authentication history information database (fourth storage section), DB5: prohibited conditions information database (fifth storage section), NW: communication network, 10: attribute information authentication apparatus (present server), 11: attribute information authentication request processing section, 12: attribute information authentication processing section, 13: attribute information view request processing section, 14: invitation information processing section, 15: attribute registration request receiving section, 16: attribute authentication request receiving section, 17: attribute modification request receiving section, 18: registration cancellation processing section, 19: registration cancellation processing section, 20: history information view section, 21: misconduct notification receiving section, 22: misconduct processing section, 30: first user terminal, 40: second user terminal, 50: third user terminal

The invention claimed is:

1. An attribute information authentication apparatus for a second user to authenticate attribute information of a first user, a plurality of user terminals being connected via a communication network and used by users, whose attribute information expressing the characteristics of the users is registered as a condition for using a network service website established on a communication network, the device comprising:
a first storage device capable of mutually associating and storing user identification information for identifying the user, attribute information having at least one item registered by the user, information for contacting the user terminal, and authenticated information expressing that the user has already been authenticated;
an attribute information authentication request processing device for transmitting, to the second user terminal used by the second user, attribute information registered by the first user and transmitted from the first user terminal used by the first user, as well as attribute information authentication request information for requesting authentication of the attribute information; and
an attribute information authentication processing device for registering authenticated information indicating that authentication information has been associated with the attribute information registered by the first user and received by the first storage device when the authentication information indicating that the attribute information registered by the first user has been authenticated has been received from the second user terminal in accordance with the transmission of the attribute information authentication request information via the attribute information authentication request processing device, wherein
the attribute information authentication request processing device
references the first storage device, and determines the existence of the authenticated information registered in association with the attribute information of the second user on the basis of second user identification information when attribute information authentication request information transmitted from the first user terminal has been received;
transmits the attribute information authentication request to the second user terminal when the authenticated information has been registered; and
otherwise transmits to the first user terminal an attribute authentication failure notification for providing notification that the second user does not have authorization to authenticate attribute information when the authenticated information has not been registered.

2. The attribute information authentication apparatus according to claim 1, further comprising:
attribute information view request processing device for
referencing the first storage device and extracting predetermined attribute information on the basis of the first user identification information, when an attribute information view request has been received for requesting viewing of the attribute information having at least one or more items among the attribute information registered by the first user and the first user identification information specified by the first user using any of the user terminals after the authenticated information has been registered via the attribute information authentication processing device;
determining the existence of authenticated information registered in association with the attribute information;
generating attribute authentication display information for visually and identifiably displaying on the user terminal the fact that the authenticated information exists, when the authenticated information has been registered;
transmitting to the user terminals the generated attribute authentication display information together with the extracted attribute information of the first user; and
conversely transmitting the extracted attribute information of the first user to the user terminals when the authenticated information is not registered.

3. The attribute information authentication apparatus according to claim 1, further comprising:
an invitation information processing device for
receiving from the second user terminal a new user invitation request that includes the second user identification information,
receiving invitation information that includes a message encouraging registration of attribute information in order to use the network service website, and information for contacting the user specified by the second user,
furthermore generating an invitation message and
transmitting the invitation message to the first user terminal on the basis of the information for contacting the first user, where the user specified by the second user is the first user; and
an attribute registration request receiving device for receiving as a predetermined request the registration request containing the first user attribute information from the first user terminal in accordance with the transmission of the invitation message via the invitation information processing device, wherein
the attribute information authentication request processing device references the first storage device, specifies the information for contacting the second user on the basis of the second user identification information received by the invitation information processing device, and furthermore transmits to the second user terminal the attribute information authentication request on the basis of the contact address information, when the registration request has been received.

4. The attribute information authentication apparatus according to claim 1, further comprising an attribute authentication request receiving device for receiving as the predetermined request a request for authenticating attribute information of the first user from the first user terminal, and receiving attribute information authentication instructions containing second user identification information in which the user specified by the first user is the second user from among the users already using the network service website, wherein
the attribute information authentication request processing device references the first storage device, specifies the information for contacting the second user on the basis of the second user identification information received by the attribute authentication request receiving device, and furthermore transmits the attribute information authentication request to the second user terminal on the basis of the contact address information, when the authentication request has been received.

5. The attribute information authentication apparatus according to claim 1, wherein the attribute information authentication request processing device transmits to the second user terminal the first user attribute information transmitted by the first user terminal and the attribute information authentication request information for requesting authentication of the attribute information, in accordance with the invitation of the second user to the first user, who is not registered on the network service website, to register on the network service website.

6. The attribute information authentication apparatus according to claim 1, wherein the attribute information authentication request processing device requests authentication of attribute information by transmitting to the second user the attribute information of the first user registered in the first storage device, and the attribute information authentication request transmitted from the first user terminal, in the case that the first user and the second user are already registered on the network service website.

7. The attribute information authentication apparatus according to claim 1, further comprising a registration cancellation processing device for receiving the second user identification information from the second user terminal and a registration cancellation request requested by the second user to cancel the registration of attribute information stored in the first storage section, and deleting the registration of the attribute information stored in the first storage section on the basis of the second user identification information, wherein
in accordance with the deletion of the attribute information via the registration cancellation processing device, the attribute information authentication processing device references the second storage device, specifies the first user identification information stored in association with the second user identification information, furthermore references the first storage device, and deletes the authenticated information registered in association with the attribute information registered by the first user on the basis of the first user identification information.

8. The attribute information authentication apparatus according to claim 1, further comprising:
a third storage device for mutually associating and storing identification information indicating a friendship between users; and a registration cancellation processing device for receiving from the second user terminal a friendship registration cancellation request containing the second user identification information and the first user identification information requesting registration cancellation of a friendship stored in the third storage section by the second user, and cancelling the registration of a friendship stored in the third storage section on the basis of the second user identification information, wherein
the attribute information authentication processing device, in accordance with the friendship cancellation via the registration cancellation processing device, references the third storage device, specifies the first user identification information stored in association with the second user identification information, furthermore references the first storage device, and deletes the authenticated information registered in association with the attribute information registered by the first user on the basis of first user identification information.

9. An attribute information authentication method for a second user to authenticate attribute information of a first user, by using a device having a first storage device capable of mutually associating and storing user identification information for identifying the user, attribute information having at least one or more items registered by the user, information for contacting the user terminal, and authenticated information indicating that the user has already been authenticated, a plurality of user terminals being connected via a communication network and used by users, whose attribute information expressing the characteristics of the users is registered as a condition for using a network service website established on a communication network, the method comprising the steps of:
transmitting to the second user terminal used by the second user, attribute information registered by the first user and transmitted from the first user terminal used by the first user, and attribute information authentication request information for requesting authentication of the attribute information;
registering the authenticated information indicating that the authentication information has been associated with the attribute information registered by the first user and received in the first storage device, when the authentication information indicating that the attribute information registered by the first user has been authenticated is received from the second user terminal; and
referencing the first storage device, determining the existence of the authenticated information registered in association with the attribute information of the second user on the basis of second user identification information when attribute information authentication request information transmitted from the first user terminal has been received, transmitting the attribute information authentication request to the second user terminal when the authenticated information has been registered, and otherwise transmitting to the first user terminal an attribute authentication failure notification for providing notification that the second user does not have authorization to authenticate attribute information when the authenticated information has not been registered.

10. A non-transitory storage medium for storing a computer program for causing a computer to function as an apparatus for a second user to authenticate attribute information of a first user, by using a computer having a first storage device capable of mutually associating and storing user identification information for identifying the user, attribute information having at least one or more items registered by the user, information for contacting the user terminal, and authenticated information indicating that the user has already been authenticated, a plurality of user terminals being connected via a communication network and used by users, whose attribute information expressing the characteristics of the users is registered as a condition for using a network service website established on a communication network, the apparatus comprising:

a device for transmitting to the second user terminal used by the second user, attribute information registered by the first user and transmitted by the first user terminal used by the first user, and attribute information authentication request information for requesting authentication of the attribute information;

a device for registering the authenticated information indicating that the authentication information has been associated with the attribute information registered by the first user and received in the first storage device, when the authentication information indicating that the attribute information registered by the first user has been authenticated is received from the second user terminal, in accordance with the transmission of the attribute information authentication request information; and a device for referencing the first storage device, determining the existence of the authenticated information registered in association with the attribute information of the second user on the basis of second user identification information when attribute information authentication request information transmitted from the first user terminal has been received, transmitting the attribute information authentication request to the second user terminal when the authenticated information has been registered, and otherwise transmitting to the first user terminal an attribute authentication failure notification for providing notification that the second user does not have authorization to authenticate attribute information when the authenticated information has not been registered.

\* \* \* \* \*